US005902115A

United States Patent [19]

Katayama

[11] Patent Number: 5,902,115

[45] Date of Patent: May 11, 1999

[54] RECORDING MEDIUM ON WHICH ATTRIBUTE INFORMATION ON THE PLAYBACK DATA IS RECORDED TOGETHER WITH THE PLAYBACK DATA AND A SYSTEM FOR APPROPRIATELY REPRODUCING THE PLAYBACK DATA USING THE ATTRIBUTE INFORMATION

[75] Inventor: Yoshitaka Katayama, Yokohama, Japan

[73] Assignee: Kabushiki Kaisha Toshiba, Kawasaki, Japan

[21] Appl. No.: 08/631,132

[22] Filed: Apr. 12, 1996

[30] Foreign Application Priority Data

Apr. 14, 1995 [JP] Japan .................................... 7-114015

[51] Int. Cl.$^{6}$ ........................................................ G10H 1/36

[52] U.S. Cl. ................................. 434/307 A; 434/307 R; 434/318; 386/97; 386/106; 360/135

[58] Field of Search ................................ 434/307 R–309, 434/318, 365; 84/477 R, 601–611, 615, 625, 645; 386/96, 97, 104, 106; 360/18, 32, 131–136

[56] References Cited

U.S. PATENT DOCUMENTS

| | | | |
|---|---|---|---|
| 4,774,596 | 9/1988 | Hashimoto | 434/167 X |
| 4,992,885 | 2/1991 | Yoshio | 386/97 |
| 5,233,438 | 8/1993 | Funahashi et al. | 386/97 |
| 5,383,063 | 1/1995 | Bannai et al. | 360/18 |
| 5,442,452 | 8/1995 | Ryu | 386/97 |
| 5,525,062 | 6/1996 | Ogawa et al. | 434/307 A |
| 5,548,451 | 8/1996 | Niki et al. | 360/32 |
| 5,555,098 | 9/1996 | Parulski | 386/104 |
| 5,574,570 | 11/1996 | Ohkuma et al. | 386/104 X |
| 5,576,843 | 11/1996 | Cookson et al. | 386/97 |
| 5,592,450 | 1/1997 | Yonemitsu et al. | 386/96 X |
| 5,652,824 | 7/1997 | Hirayama et al. | 386/97 X |
| 5,671,319 | 9/1997 | Ueda | 386/96 |
| 5,745,643 | 4/1998 | Mishina | 386/106 |
| 5,751,892 | 5/1998 | Hirayama et al. | 386/125 X |
| 5,778,142 | 7/1998 | Taira et al. | 386/97 |
| 5,781,683 | 7/1998 | Sakoguchi et al. | 386/97 X |
| 5,784,520 | 7/1998 | Takeda et al. | 386/104 X |

FOREIGN PATENT DOCUMENTS

| | | |
|---|---|---|
| 488 684 A1 | 6/1992 | European Pat. Off. . |
| 521 487 A1 | 1/1993 | European Pat. Off. . |
| 624 876 A2 | 11/1994 | European Pat. Off. . |

*Primary Examiner*—Joe H. Cheng
*Attorney, Agent, or Firm*—Pillsbury Madison & Sutro LLP

[57] ABSTRACT

Karaoke data to be reproduced is stored in an optical disk as a video title set together with management information for managing karaoke data and a video object set. In the video object set, a plurality of program chains having data items of karaoke songs stored therein are stored and the reproduction information thereof is stored in the management information. Information indicating that an object to be reproduced is karaoke is stored in the management information.

16 Claims, 38 Drawing Sheets

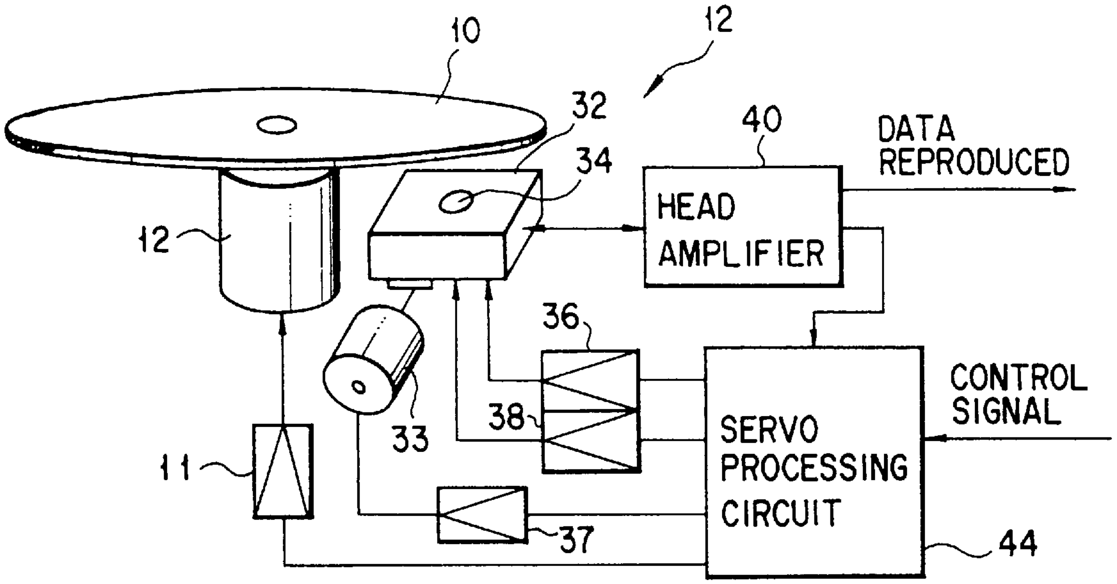
F I G. 2
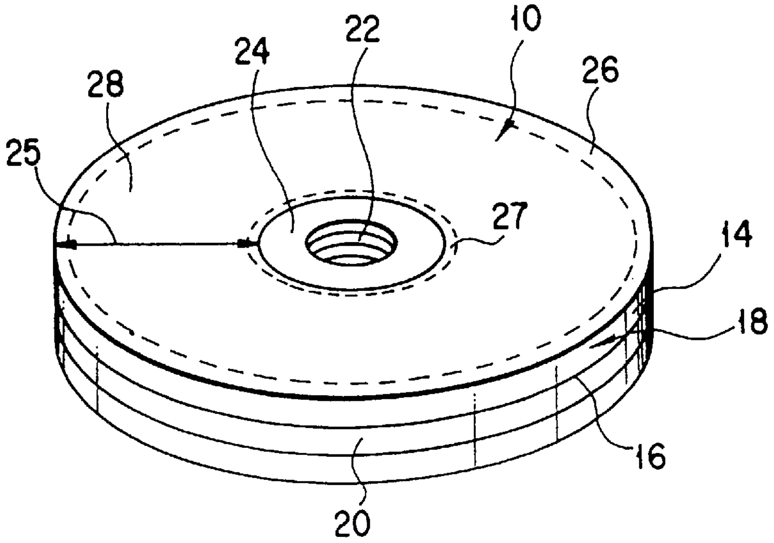
F I G. 3

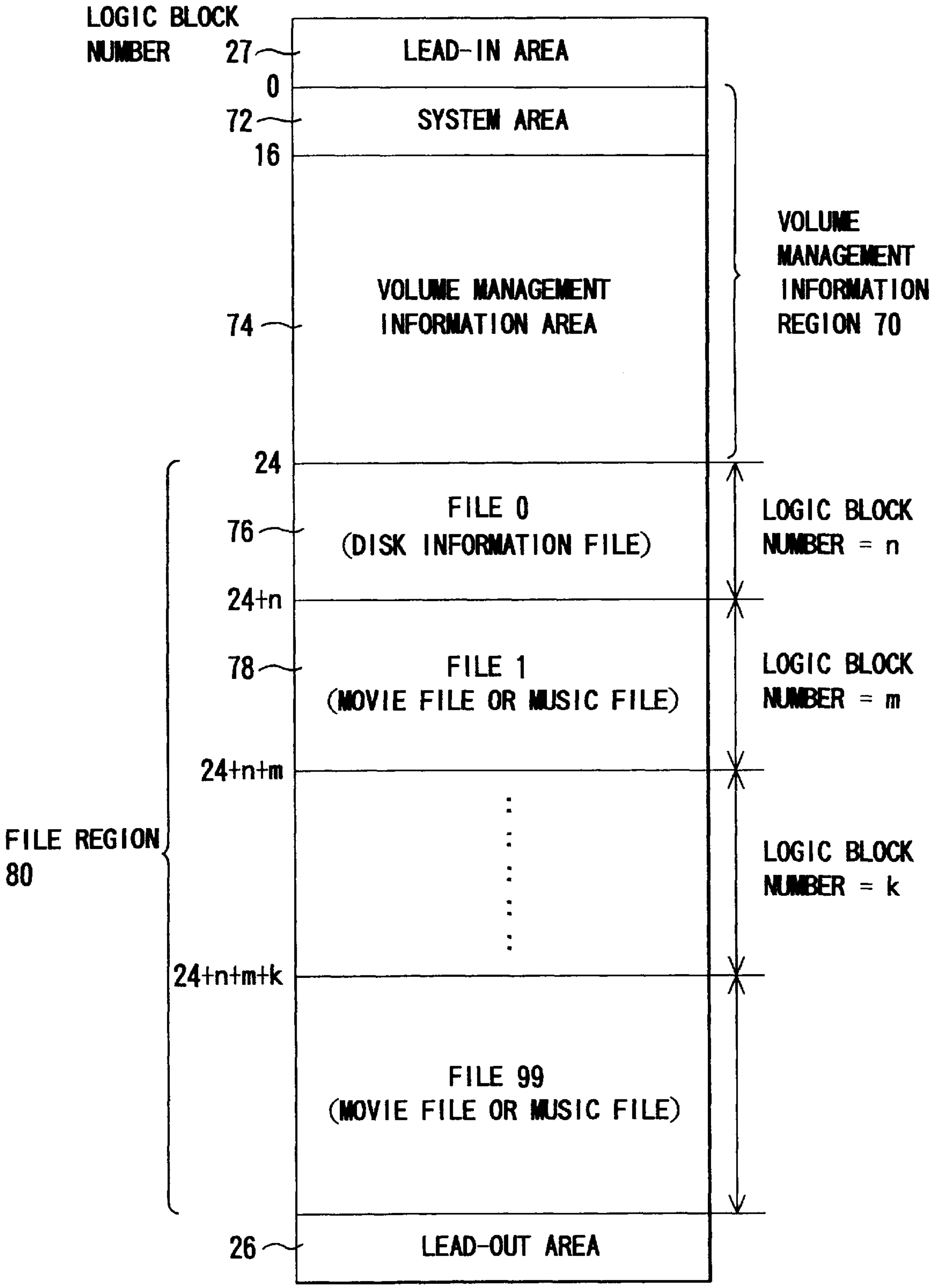
F I G. 4

CELL INFORMATION ( CI )

| PARAMETER | CONTENT |
|---|---|
| CCAT | CELL CATEGORY |
| CTIME | CELL REPRODUTION TIME |
| CNLBN | CELL STARTING LOGICAL BLOCK NUMBER |
| CNLB | STRUCTURE LOGICAL BLOCK NUMBER |

FIG. 9

SEQUENCE INFORMATION ( SI )

| PARAMETER | CONTENT |
|---|---|
| SCAT | SEQUENCE CATEGORY |
| SNPRG | NUMBER OF STRUCTURE PROGRAMS |
| SNCEL | NUMBER OF STRUCTURE CELLS |
| STIME | SEQUENCE REPRODUCTION TIME |
| SCINF | SEQUENCE CONTROL INFORMATION |

FIG. 10

FILE MANAGEMENT TABLE ( FMT )

| PARAMETER | CONTENT |
|---|---|
| FFNAME | FILE NAME |
| FFID | FILE IDENTIFIER |
| FNSQ | TOTAL NUMBER OF SEQUENCES |
| FNCEL | NUMBER OF CELLS |
| FSASIT | SIT START ADDRESS |
| FSACIT | CIT START ADDRESS |
| FSAESI | SEQUENCE INFORMATION START ADDRESS |
| FSADVD | VIDEO DATA START ADDRESS |
| FNAST | NUMBER OF AUDIO STREAMS |
| FAATR | AUDIO STREAM ATTRIBUTE |

FIG. 11

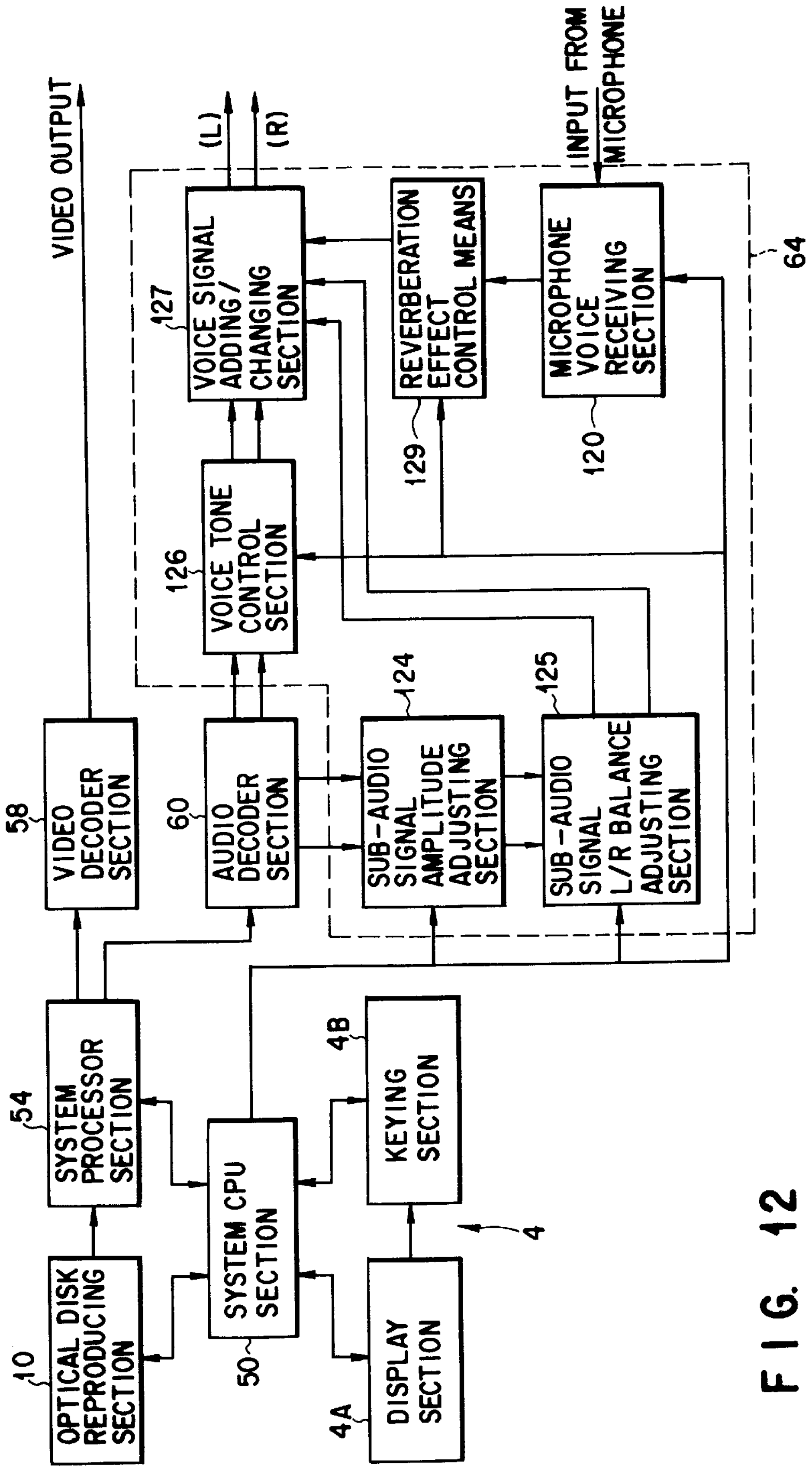
F I G. 12

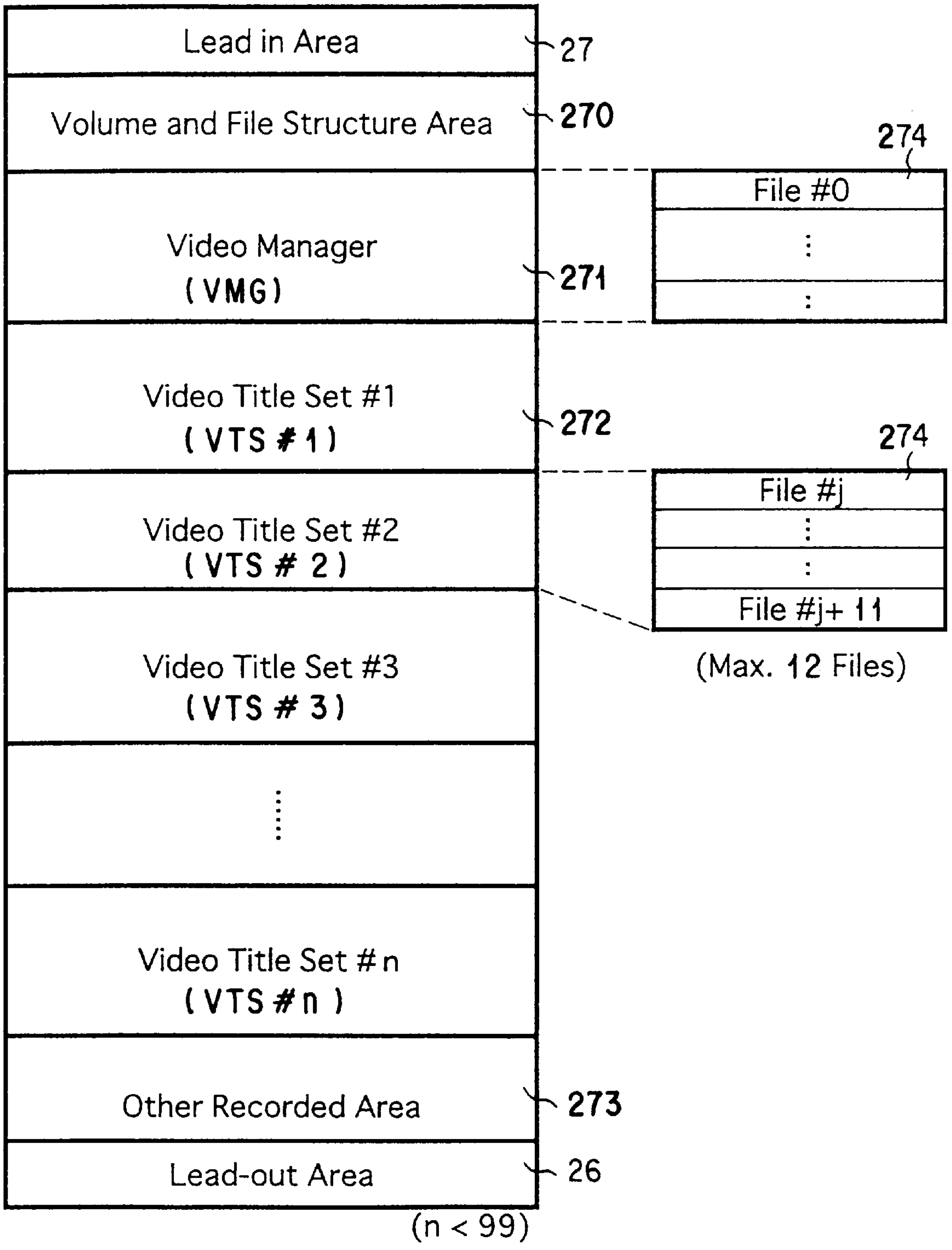
F I G. 15

Video Object Set (VOBS) — 282

Video Object (VOB_IDN1) — 283
Video Object (VOB_IDN2)
Video Object (VOB_IDNj)

Cell (C_IDN1) — 284
Cell (C_IDN2)
Cell (C_IDNj)

285

Video Object Unit (VOBU) — 286 (NAV Pack), 288 (V Pack), 290 (SP Pack), 291 (A Pack)
Video Object Unit (VOBU)
Video Object Unit (VOBU)
Video Object Unit (VOBU)

Packs (top to bottom): A Pack, ..., NAV Pack, V Pack, V Pack, V Pack, SP Pack, A Pack, ..., A Pack, SP Pack, V Pack, V Pack, V Pack, NAV Pack VMGI_MAT (Description order)

| | Content |
|---|---|
| VMG_ID | Video Manager Identifier |
| VMGI_SZ | Size of Video Manager Information |
| VERN | Version Number of DVD Video Specification |
| VMG_CAT | Video Manager Category |
| VLMS_ID | Volume Set Identifier |
| VTS_Ns | Number of Video Title Set |
| PVR_ID | Provider Unique ID |
| VMGI_MAT_EA | End Address of VMGI_MAT |
| VMGM_VOBS_SA | Video Manager Menu Video Object Set Start Address |
| TT_SRPT_SA | Start Address of TT_SRPT |
| **VMGM_PGCI_UT_SA** | **Start Address of VMGM_PGCI_UT** |
| VTS_ATRT_SA | Start Address of VTS_ATRT |
| VMGM_V_ATR | Video Attribute of VMGM |
| VMGM_AST_Ns | Number of Audio Stream of VMGM |
| VMGM_AST_ATR | Audio Stream Attribute of VMGM |
| VMGM_SPST_Ns | Number of Sub-picture Stream of VMGM |
| VMGM_SPST_ATR | Sub-picture Stream Attribute of VMGM |

FIG. 18

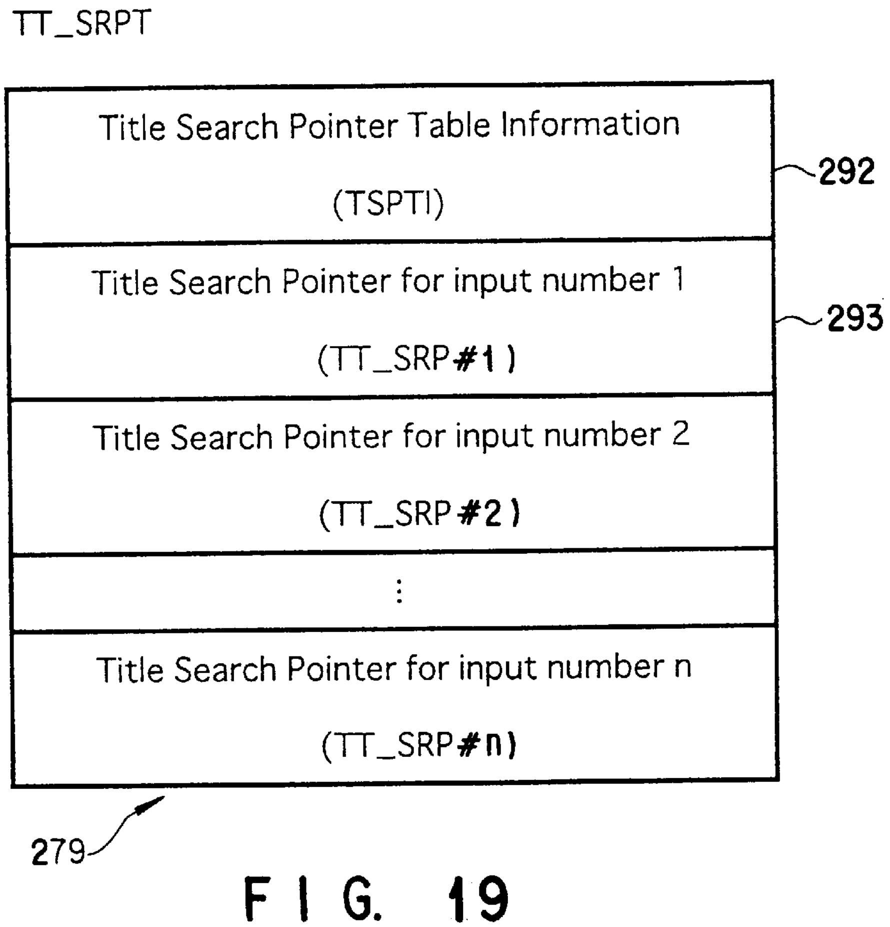
F I G. 19
| TT_SRPTI | (Description order) |
|---|---|
| | Content |
| EN_PGC_Ns | Number of Entry PGC |
| TT_SRPT_EA | End Address of TT_SRPT |
F I G. 20
| TT_SRP | (Description order) |
|---|---|
| | Content |
| VTSN | Video Title Set Number |
| PGCN | Program Chain Number |
| VTS_SA | Start Address of Video Title Set |
F I G. 21

VMGM_PGCI_UTI

| | Contents |
|---|---|
| VMGM_LU_Ns | Number of Video Maneger Menu Language Units |
| VMGM_PGCI_UT_EA | End Address of VMGM_PGCI_UT |

VMGM_LU_SRP

| | Contents |
|---|---|
| VMGM_LCD | Video Manager Menu Language Code |
| VMGM_LU_SA | Start Address of VMGM_LU |

VMGM_LUI

| | Contents |
|---|---|
| VMGM_PGCI_Ns | Number of VMGM_PGCIs |
| VMGM_LUI_EA | End Address of VMGM_LUI |

VMGM_PGCI_SRP

| | Contents |
|---|---|
| VMGM_PGC_CAT | VMGM_PGC Category |
| VMGM_PGCI_SA | Start Address of VMGM_PGCI |

VTS_ATRTI

| | Contents |
|---|---|
| VTS_Ns | Number of VTSs |
| VTS_ATRT_EA | End Address of VTS_ATRT |

VTS_ATR_SRP

| | Contents |
|---|---|
| (1) VTS_ATR_SA | Start Address of VTS_ATR |

VTS_ATR

| | Contents |
|---|---|
| VTS_ATR_EA | End Address of VTS_ATR |
| VTS_CAT | Video Title Set Category |
| VTS_ATRI | Video Title Set Attribute Information |

| VTSI_MAT | Contents |
|---|---|
| VTS_ID | VTS Identifier |
| VTSI_SZ | Size of the VTSI |
| VERN | Version Number of DVD Video Specification |
| VTS_CAT | VTS Category |
| VTSI_MAT_EA | End Address of VTSI_MAT |
| VTSM_VOBS_SA | Start Address of VTSM_VOBS |
| VTSTT_VOBS_SA | Start Address of VTSTT_VOB |
| VTS_PTT_SRPT_SA | Start Address of VTS_PTT_SRPT |
| VTS_PGCIT_SA | Start Address of VTS_PGCIT |
| VTSM_PGCI_UT_SA | Start Address of VTSM_PGCI_UT |
| VTS_TMAPT_SA | Start Address of VTS_TMAPT |
| VTS_C_ADT_SA | Start Address of Cell Address Table |
| VTS_VOBU_ADMAP_SA | Start Address of VOBU Address Map |
| VTSM_V_ATR | Video Attribute of VTSM |
| VTSM_AST_Ns | Number of Audio Streams of VTSM |
| VTSM_AST_ATR | Audio Stream Attribute of VTSM |
| VTSM_SPST_Ns | Number of Sub-Picture Streams of VTSM |
| VTSM_SPST_ATR | Sub-Picture Stream Attribute of VTSM |
| VTS_V_ATR | Video Attribute of VTS |
| VTS_AST_Ns | Number of Audio Stream of VTS |
| VTS_AST_ATR | Audio Stream Attribute of VTS |
| VTS_SPST_Ns | Number of Sub-Picture Streams of VTS |
| VTS_SPST_ATR | Sub-Picture Stream Attribute of VTS |
| VTS_MU_AST_ATR | Multichannel Audio Stream Attribute of VTS |

FIG. 34

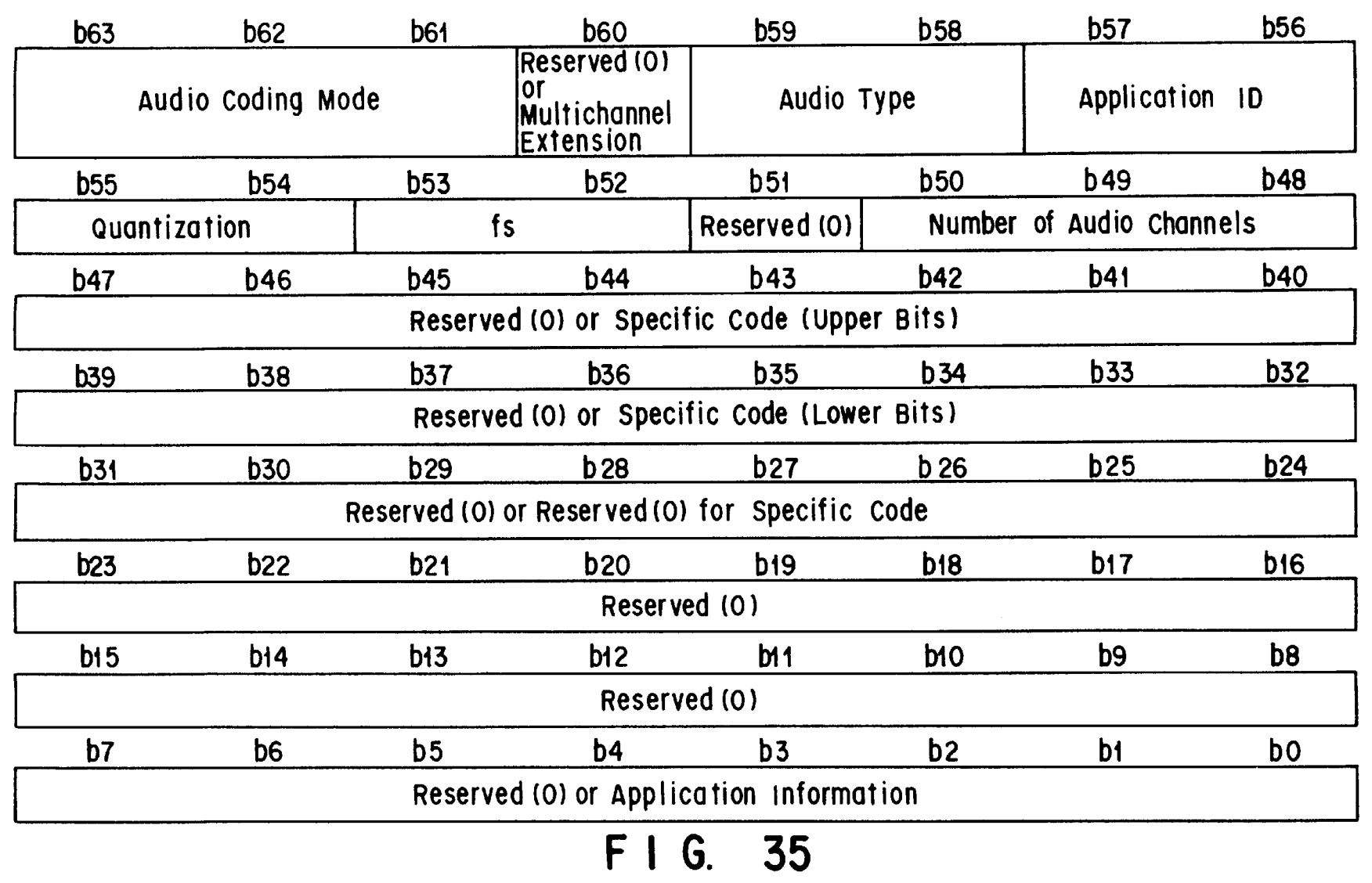

| b63 | b62 | b61 | b60 | b59 | b58 | b57 | b56 |
|---|---|---|---|---|---|---|---|
| Audio Coding Mode | | | Reserved (0) or Multichannel Extension | Audio Type | | Application ID | |
| **b55** | **b54** | **b53** | **b52** | **b51** | **b50** | **b49** | **b48** |
| Quantization | | fs | | Reserved (0) | Number of Audio Channels | | |
| **b47** | **b46** | **b45** | **b44** | **b43** | **b42** | **b41** | **b40** |
| Reserved (0) or Specific Code (Upper Bits) | | | | | | | |
| **b39** | **b38** | **b37** | **b36** | **b35** | **b34** | **b33** | **b32** |
| Reserved (0) or Specific Code (Lower Bits) | | | | | | | |
| **b31** | **b30** | **b29** | **b28** | **b27** | **b26** | **b25** | **b24** |
| Reserved (0) or Reserved (0) for Specific Code | | | | | | | |
| **b23** | **b22** | **b21** | **b20** | **b19** | **b18** | **b17** | **b16** |
| Reserved (0) | | | | | | | |
| **b15** | **b14** | **b13** | **b12** | **b11** | **b10** | **b9** | **b8** |
| Reserved (0) | | | | | | | |
| **b7** | **b6** | **b5** | **b4** | **b3** | **b2** | **b1** | **b0** |
| Reserved (0) or Application Information | | | | | | | |

FIG. 35

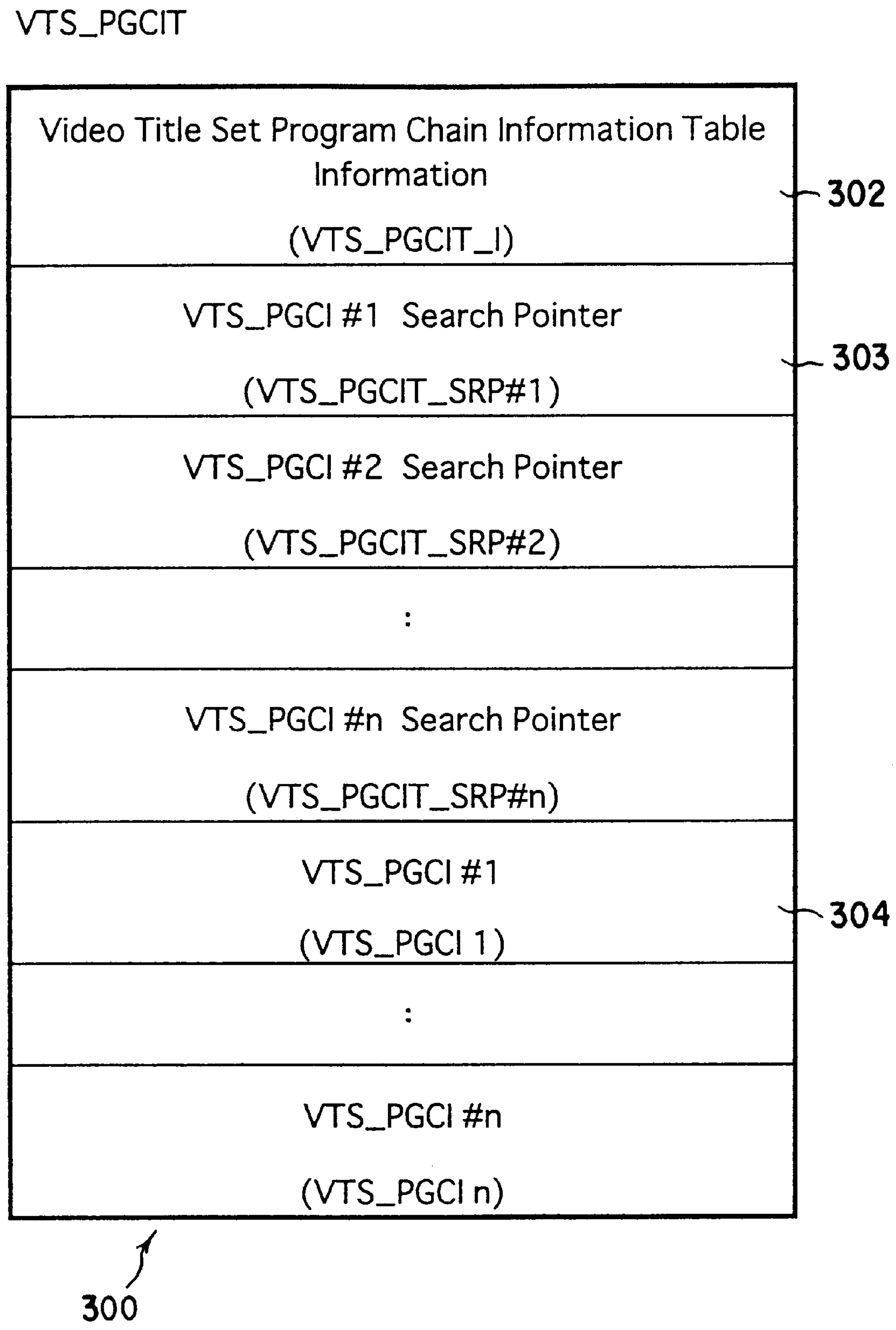
F I G. 36

VTS_PGCIT_I
(Description order)
| | Content |
|---|---|
| VTS_PGC_Ns | Number of VTS_PGCs |
| VTS_PGCIT_EA | End Address of VTS_PGCCIT |
F I G. 37
VTS_PGCIT_SRP
(Description order)
| | Content |
|---|---|
| VTS_PGC_CAT | Video Title Set PGC category |
| VTS_PGCI_SA | Start Address of VTS_PGC Information |
F I G. 38
VTS_PGCI
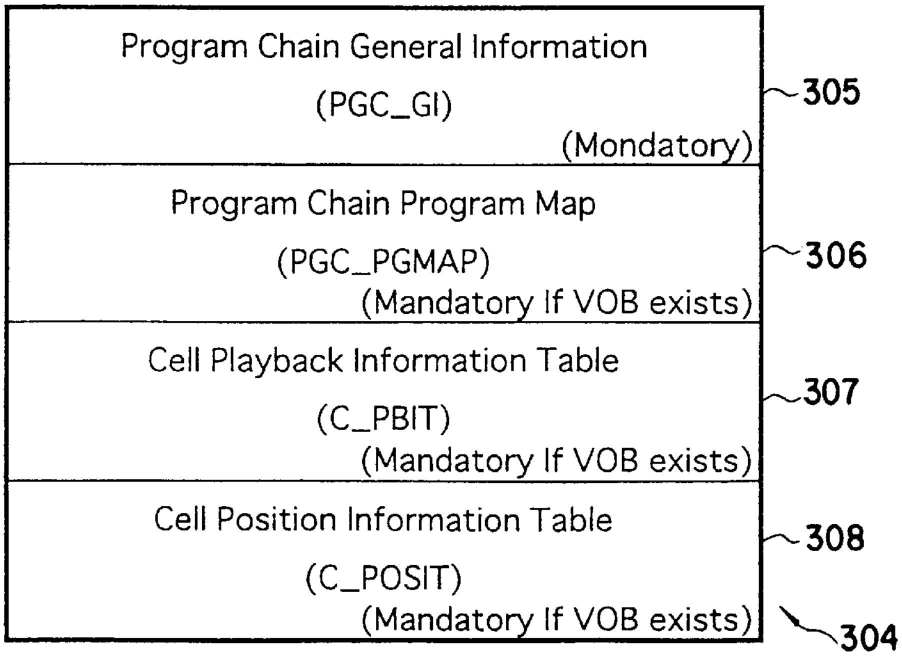
F I G. 39

PGC _GI (Description order)

| | Content |
|---|---|
| PGCI_CAT | PGC Category |
| PGC_CNT | PGC Content |
| PGC_PB_TIME | PGC Playback Time |
| PGC_SPST_CTL | PGC-Sub-picutre Stream Control |
| PGC_AST_CTL | PGC Audio Stream Control |
| PGC_SP_PLT | PGC Sub-picture Palette |
| PGC_PGMAP_SA | Start Address of PGC_PGMAP |
| C_PBIT_SA | Start Address of C_PBIT |
| C_POSIT_SA | Start Address of C_POSIT |

F I G. 40

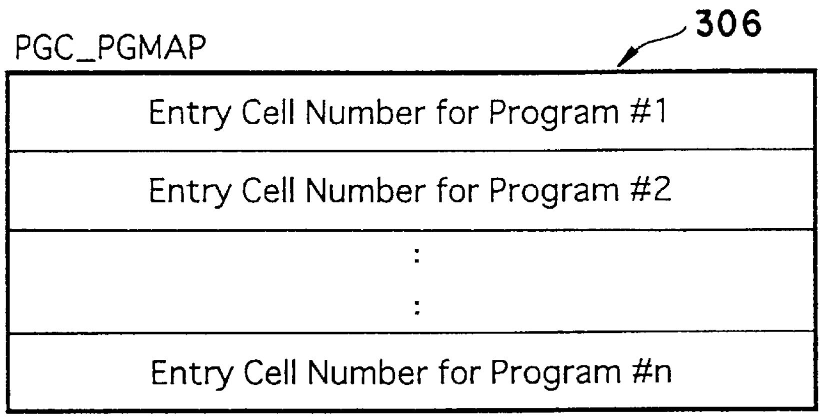

F I G. 41

Entry cell number

| | Content |
|---|---|
| ECELLN | Entry Cell Number |

F I G. 42

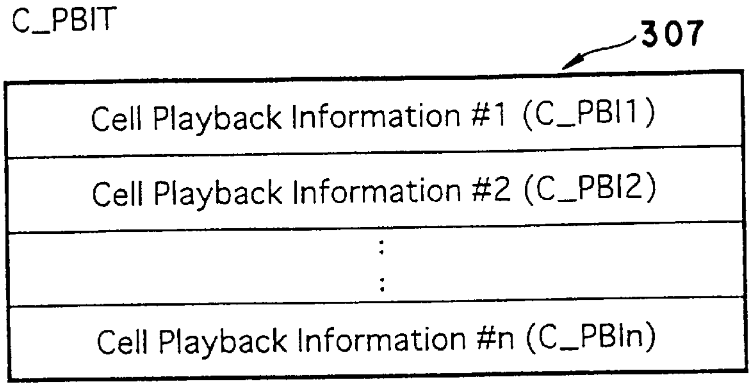
FIG. 43
C_PBI
| | Content |
|---|---|
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
FIG. 44
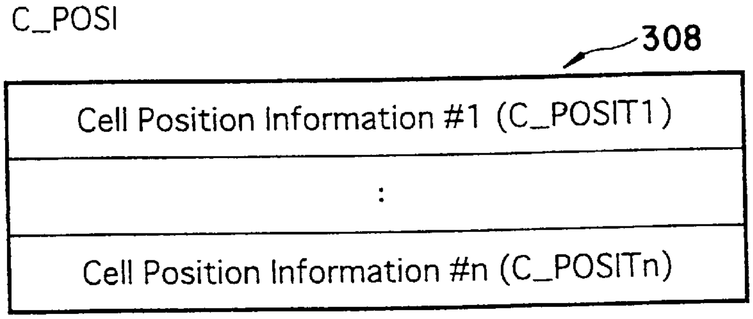
FIG. 45
C_POSI
| | Content |
|---|---|
| C_VOB_IDN | VOB ID Number of Cell |
| C_IDN | Cell ID Number of the Cell |
FIG. 46

VTSM_PGCI_UTI

| | Contents |
|---|---|
| VTSM_LU_Ns | Number of Video Title Set Menu Language Units |
| VTSM_PGCI_UT_EA | End Address of VTSM_PGCI_UT |

VTSM_LU_SRP

| | Contents |
|---|---|
| VTSM_LCD | Video Title Set Menu Language Code |
| VTSM_LU_SA | Start Address of VTSM_LU |

VTSM_LUI

| | Contents |
|---|---|
| VTSM_PGC_Ns | Number of VTSM_PGCs |
| VTSM_LU_EA | End Address of VTSM_LU |

VTSM_PGCI_SRP

| | Contents |
|---|---|
| VSTM_PGC_CAT | VTSM_PGC Category |
| VTSM_PGCI_SA | Start Address of VTSM_PGCI |

PCI

| | Content |
|---|---|
| PCI_GI | PCI General Information |
| NSMLS_ANGLI | Angle Information |

FIG. 55

PCI_GI

| | Content |
|---|---|
| NV_PCK_LBN | LBN of NV Pack |
| VOBU_CAT | Category of VOBU |
| VOBU_S_PTM | Start PTM of VOBU |
| VOBU_E_PTM | End PTM of VOBU |

FIG. 56

DSI

| | Content |
|---|---|
| DSI_GI | DSI General Information |
| SML_PBI | Seamless Playback Information |
| SML_AGLI | Angle Information |
| NV_PCK_ADI | Navigation Pack Address Information |
| SYNCI | Synchronus Playback Information |

FIG. 57

DSI_GI

| | Content |
|---|---|
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

FIG. 58

SYNCI

| | Content |
|---|---|
| A_SYNCA 0 to 7 | Target Audio Pack Address |
| SP_SYNCA 0 to 31 | VOBU Start Address of Target SP pack |

FIG. 59

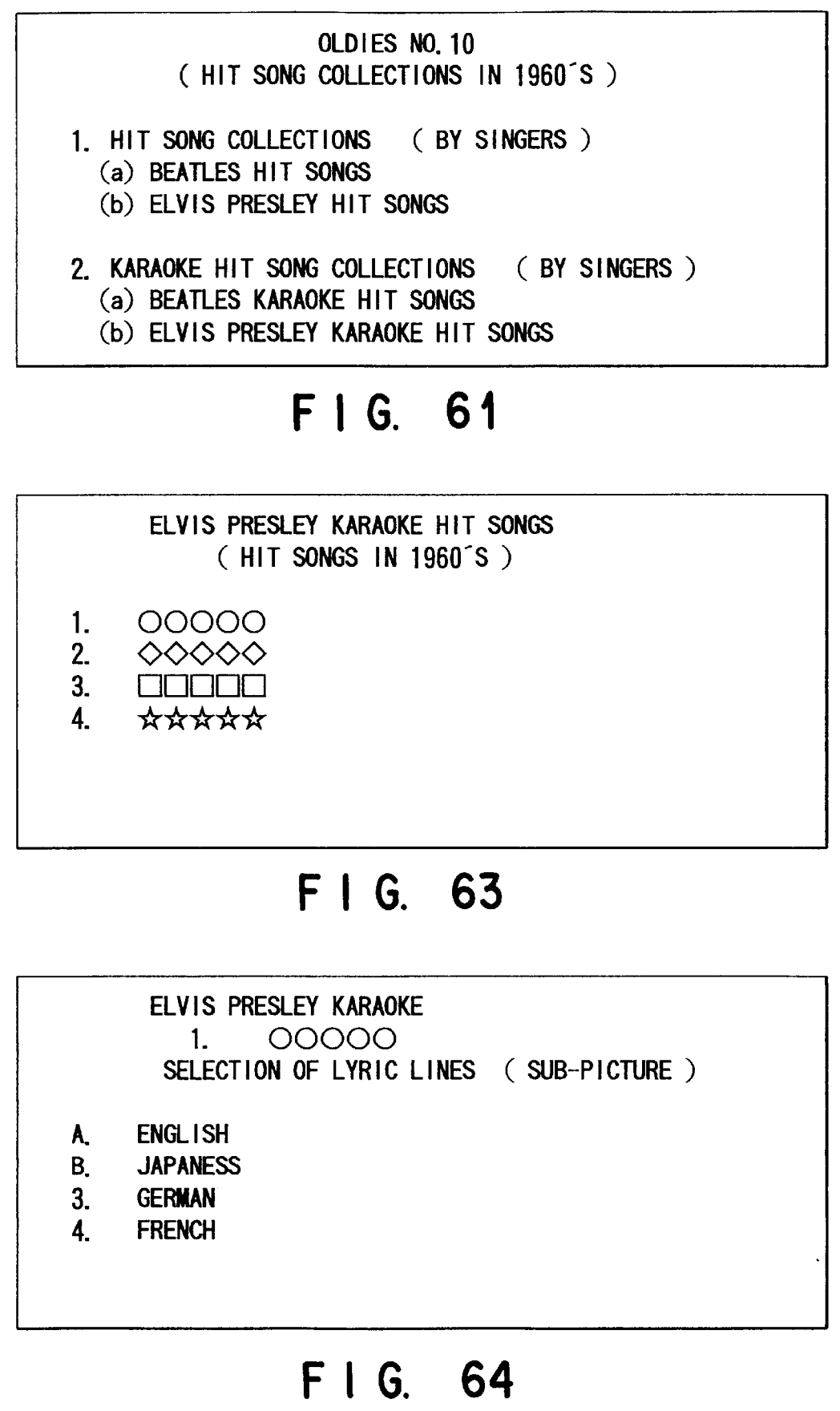

OLDIES NO. 10
( HIT SONG COLLECTIONS IN 1960'S )

1. HIT SONG COLLECTIONS ( BY SINGERS )
(a) BEATLES HIT SONGS
(b) ELVIS PRESLEY HIT SONGS

2. KARAOKE HIT SONG COLLECTIONS ( BY SINGERS )
(a) BEATLES KARAOKE HIT SONGS
(b) ELVIS PRESLEY KARAOKE HIT SONGS

FIG. 61

ELVIS PRESLEY KARAOKE HIT SONGS
( HIT SONGS IN 1960'S )

ELVIS PRESLEY KARAOKE
1. ○○○○○
SELECTION OF LYRIC LINES ( SUB-PICTURE )

A. ENGLISH
B. JAPANESS
3. GERMAN
4. FRENCH

FIG. 64

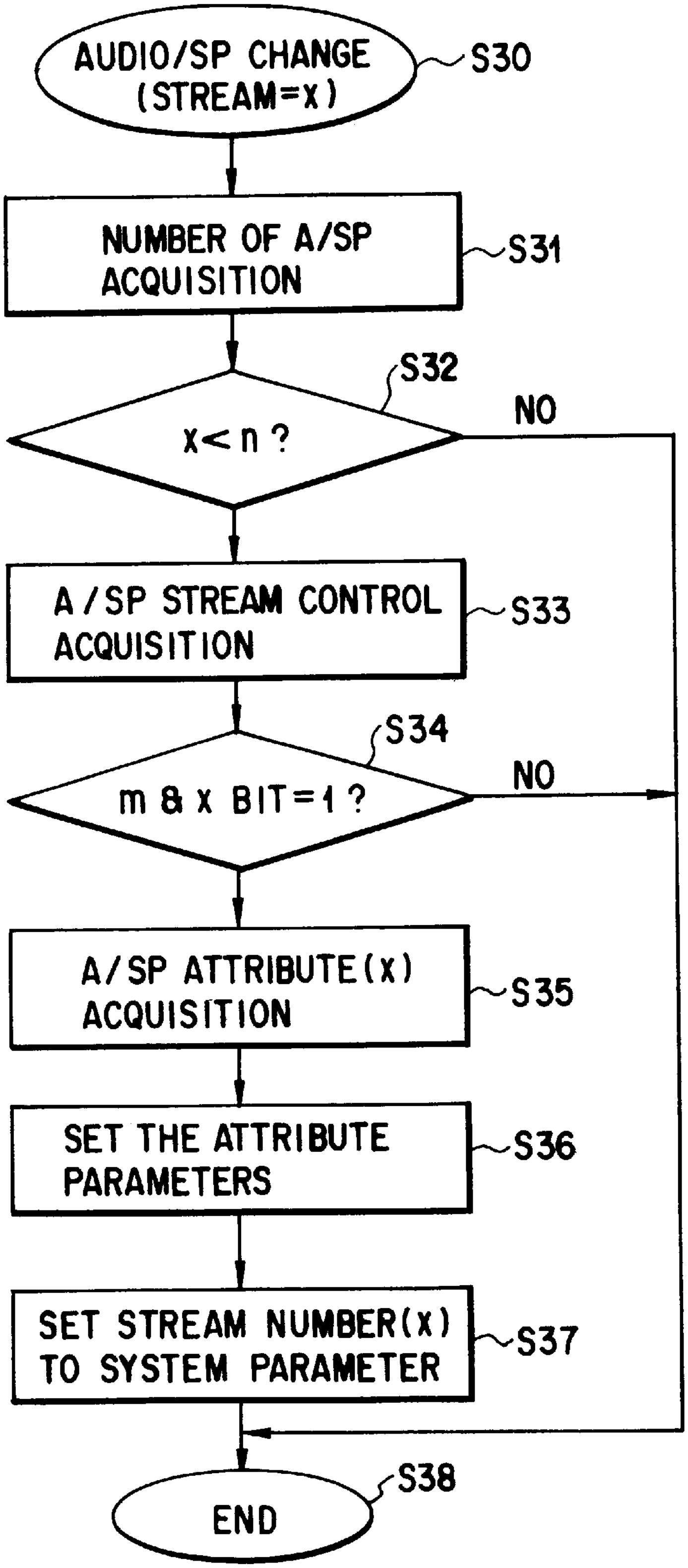
F I G. 65

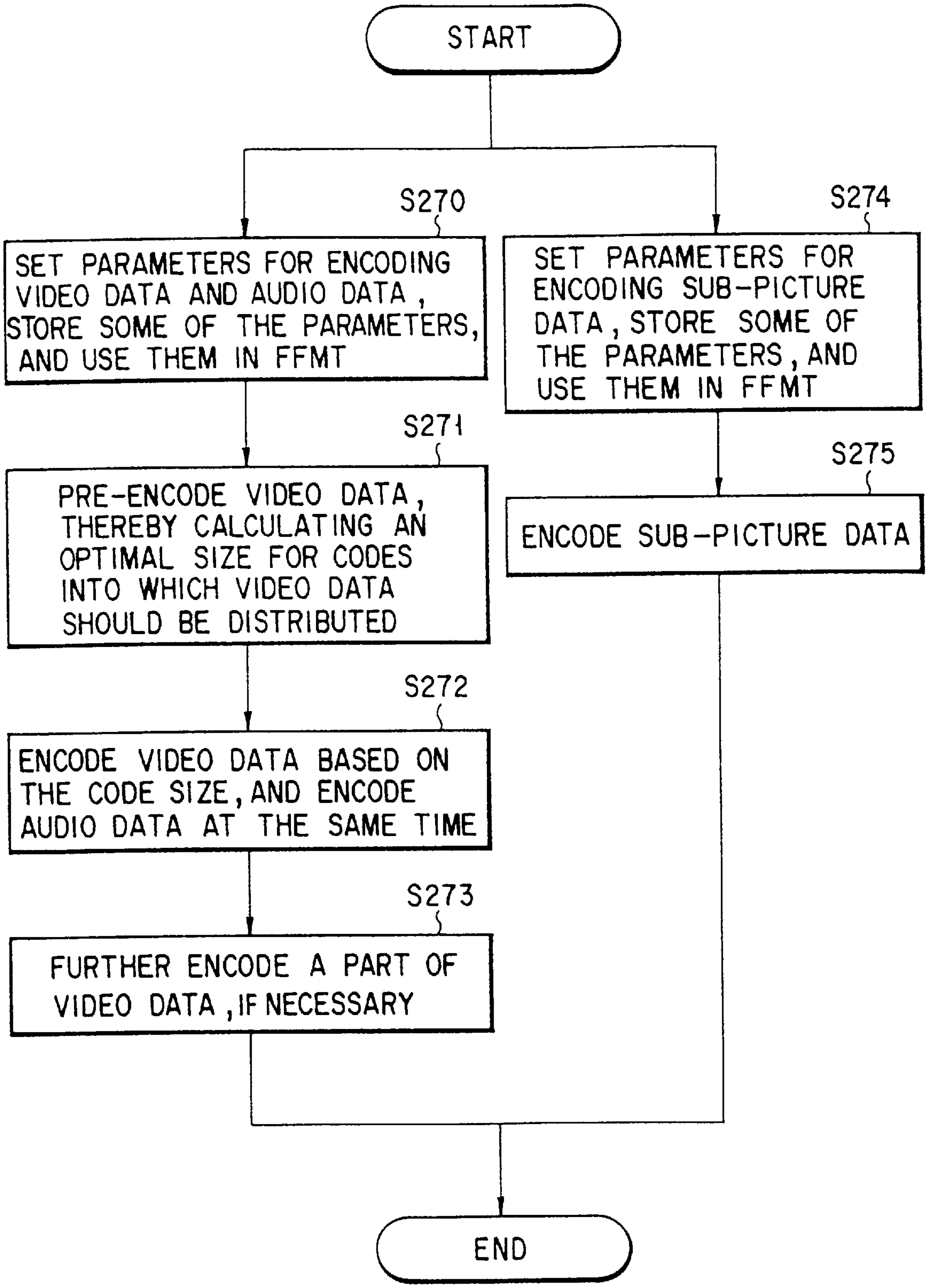
F I G. 67

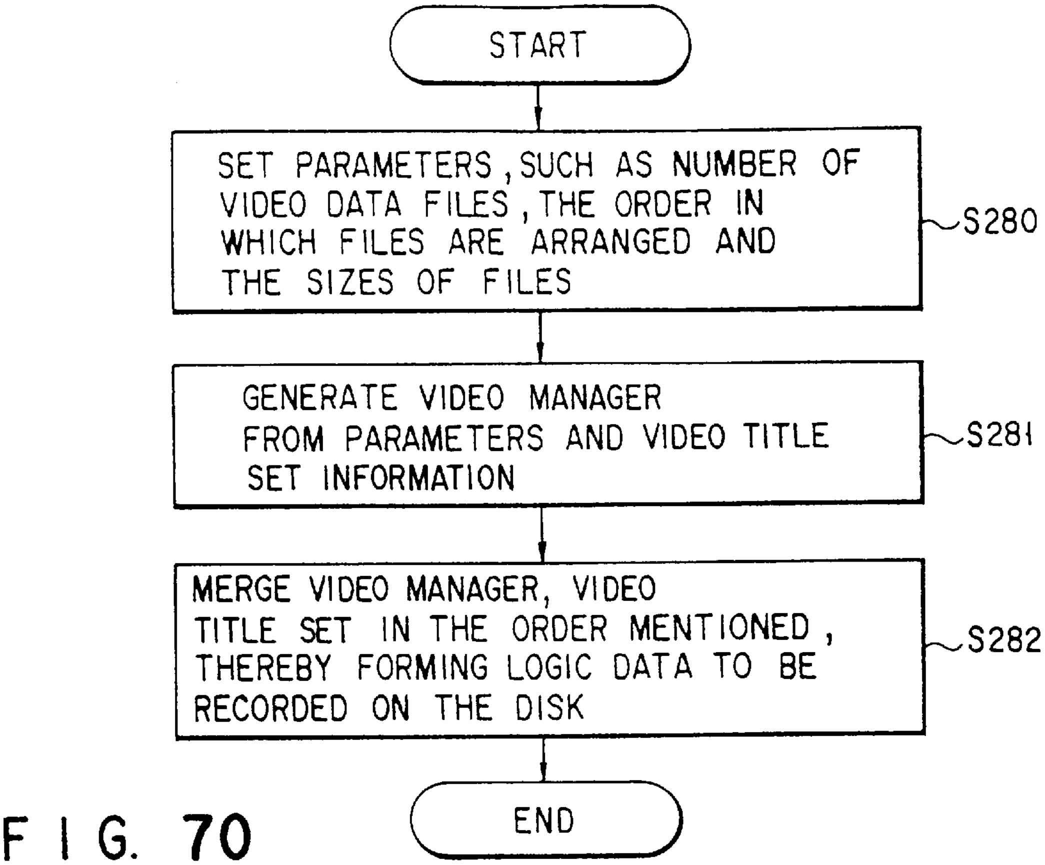
F I G. 70
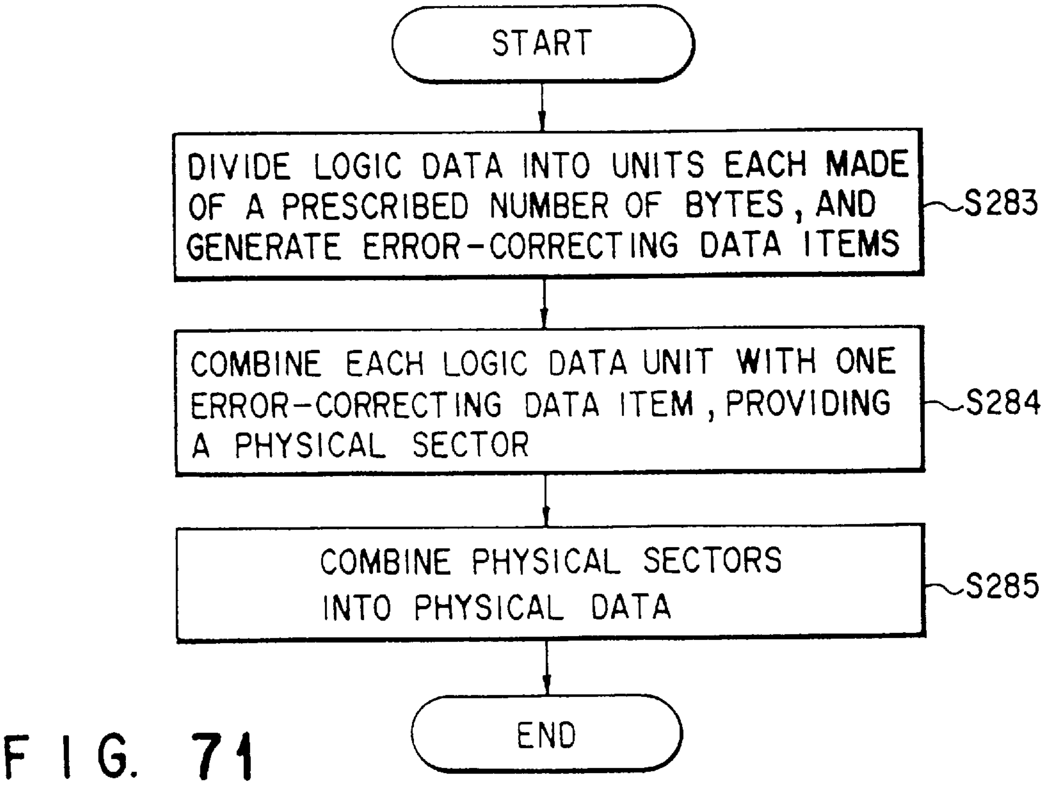
F I G. 71

RECORDING MEDIUM ON WHICH ATTRIBUTE INFORMATION ON THE PLAYBACK DATA IS RECORDED TOGETHER WITH THE PLAYBACK DATA AND A SYSTEM FOR APPROPRIATELY REPRODUCING THE PLAYBACK DATA USING THE ATTRIBUTE INFORMATION

BACKGROUND OF THE INVENTION

1. Field of the Invention

This invention relates to a karaoke recording medium, a method and apparatus for reproducing karaoke data from a karaoke recording medium, and a method and apparatus for recording karaoke data on a recording medium.

2. Description of the Related Art

Recently, an optical disk reproducing apparatus for moving picture for reproducing data from an optical disk on which data such as an video image (video data) and voice (audio data) are recorded in a digital form has been developed and is widely used as a reproducing apparatus for movie software, karaoke and the like, for example. Karaoke is a general term which indicates music data containing a music for accompaniment and permitting a person to sing to an accompaniment obtained by reproducing the music data for accompaniment and a reproducing apparatus for reproducing the music data (the above karaoke is hereinafter referred to simply as karaoke).

Recently, various specifications for applications of CDs as media have been proposed and formally adopted, but the specification for CD comes to its limit in the data storage capacity. Various systems for reducing the track pitch to half of that of CD, or reducing the minimum pit length, for example, are proposed to enhance the density of CD. With an increase in the density, the applicability of CD is widened and it becomes substantially no more impossible to record digital-compressed moving picture data with voice for two hours on one side of CD. By utilizing the feature that moving picture data and voice can be recorded on one side of CD, the CD can be used not only as a movie disk but also as a karaoke disk.

However, concrete means in a disk reproducing apparatus for karaoke is not provided although various types of high-density recording media and theoretical data formats are proposed, and it is desired to propose a system suitable for reproduction of karaoke.

SUMMARY OF THE INVENTION

An object of this invention is to provide a reproducing apparatus suitable for high-density recording medium which is formed on the assumption that it will be used for karaoke.

An object of this invention is to provide a reproducing method suitable for high-density recording medium which is formed on the assumption that it will be used for karaoke.

An object of this invention is to provide a high-density recording medium which is formed on the assumption that it will be used for karaoke.

An object of this invention is to provide a recording apparatus for recording recording data on a high-density recording medium which is formed on the assumption that it will be used for karaoke.

An object of this invention is to provide a recording method for recording recording data on a high-density recording medium which is formed on the assumption that it will be used for karaoke.

According to this invention, there is provided a recording medium comprising a data area on which a data array containing an array of a plurality of unit data items each of which corresponds to one musical composition and is specified by using at least one cell having karaoke data stored therein, and management information containing classification information indicating that the classification of the data array is karaoke and reproduction information for specifying a reproducing order of the cells of the unit data items in the data array are recorded.

According to this invention, there is provided a recording method comprising the steps of preparing a data array containing an array of a plurality of unit data items each of which corresponds to one musical composition and is specified by use of at least one cell having karaoke data stored therein; preparing management information containing classification information indicating that the classification of the data array is karaoke and reproduction information for specifying a reproducing order of the cells of the unit data items in the data array; and recording the management information and data array on a data recording area of a recording medium.

Further, according to this invention, there is provided a recording apparatus for recording karaoke data on a recording medium, comprising data creating means for creating a data array containing an array of a plurality of unit data items each of which corresponds to one musical composition and is specified by using at least one cell having karaoke data stored therein; management information creating means for creating management information containing classification information indicating that the classification of the data array is karaoke and reproduction information for specifying a reproducing order of the cells of the unit data items in the data array; and recording means for recording karaoke data on the recording medium.

Further, according to this invention, there is provided a reproducing apparatus comprising reproducing means for reproducing a data array and management information from a recording medium on which the data array containing an array of a plurality of unit data items each of which corresponds to one musical composition and is specified by use of at least one cell having karaoke data stored therein and the management information containing classification information indicating that the classification of the data array is karaoke and reproduction information for specifying a reproducing order of the cells of the unit data items in the data array are recorded; and control means for extracting a data cell from the data array under the control of the management information, converting the extracted data cell into a reproducing signal and outputting the reproducing signal.

Further, according to this invention, there is provided a reproducing method comprising the steps of reproducing a data array and management information from a recording medium on which the data array containing an array of a plurality of unit data items each of which corresponds to one musical composition and is specified by using at least one cell having karaoke data stored therein and the management information containing classification information indicating that the classification of the data array is karaoke and reproduction information for specifying a reproducing order of the cells of the unit data items in the data array are recorded; and extracting a data cell from the data array under the control of the management information, converting the extracted data cell into a reproducing signal and outputting the reproducing signal.

In this invention, karaoke data is recorded on the recording medium as management information. Therefore, audio data can be reproduced in various modes as karaoke by referring to the management information.

BRIEF DESCRIPTION OF THE DRAWINGS

FIG. 2 is a block diagram showing in detail the mechanism portion of a disk drive device shown in FIG. 1;

FIG. 3 is a perspective view schematically showing the structure of an optical disk loaded on the disk drive device shown in FIG. 1;

FIG. 4 is an explanatory diagram showing the structure of a logic format according to the initial version of the optical disk shown in FIG. 3;

FIG. 9 is an explanatory diagram showing parameters described in a cell information table of a file management information area shown in FIG. 6;

FIG. 10 is an explanatory diagram showing parameters described in a sequence information table of the file management information area shown in FIG. 6;

FIG. 11 is an explanatory diagram showing parameters described in a file management table of the file management information area shown in FIG. 6;

FIG. 12 is a block diagram showing in detail a voice control circuit for audio in a D/A & reproduction processing section shown in FIG. 1;

FIG. 15 shows the structure of a logic format of an optical disk accociated with an improved one of the initial version of the logic format of the optical disk of FIG. 4;

FIG. 18 shows the parameters in the volume manager information management table (VMGI_MAT) in the video manger (VMGI) of FIG. 15 and the description thereof;

FIG. 19 shows the structure of the title search pointer table (TSPT) in the video manger (VMGI) of FIG. 16;

FIG. 20 shows the parameters for title search pointer table information (TSPTI) in the title search pointer table (TSPT) of FIG. 19 and the description thereof;

FIG. 21 shows the parameters for the title search pointers (TT_SRP) corresponding to the entry numbers of the title search pointer table (TSPT) of FIG. 19 and the description thereof;

FIG. 34 shows the parameters in the video title set information management table (VTSI_MAT) for the video title set information (VTSI) of FIG. 33 and the description thereof;

FIG. 35 is a bit map table of the audio stream attributes (VTS_AST_ATR) described in the table (VTSI_MAT) of FIG. 33;

FIG. 36 shows the structure of the video title set program chain information table (VTS_PGCIT) of FIG. 33;

FIG. 37 shows the parameters for pieces of information (VTS_PGCITI) in the video title set program chain information table (VTS_PGCIT) of FIG. 36 and the description thereof;

FIG. 38 shows the parameters for search pointers (VTS_PGCIT_SRP) of the video title set program chain information table (VTS_PGCIT) of FIG. 36 and the description thereof;

FIG. 39 shows the structure of the program chain information (VTS_PGCI) for the video title set corresponding to a program chain in the video title set program chain information table (VTS_PGCIT) of FIG. 36;

FIG. 40 shows the parameters for pieces of general information (PGC_GI) on a program chain in the program chain information (VTS_PGCI) of FIG. 39;

FIG. 41 shows the structure of a program chain map (PGC_PGMAP) in the program chain information (VTS_PGCI) of FIG. 39;

FIG. 42 shows the parameters for the entry cell numbers (ECELLN) of the programs written in the program chain map (PGC_PGMAP) of FIG. 41 and the description thereof;

FIG. 43 shows the structure of a cell playback information table (C_PBIT) in the program chain information (VTS_PGCI) of FIG. 39;

FIG. 44 shows the parameters for pieces of cell playback information (C-PBI) in the cell playback information table (C_PBIT) of FIG. 43 and the description thereof;

FIG. 45 shows the structure of cell position information (C_POSI) in the program chain information (VTS_PGCI) of FIG. 39;

FIG. 46 shows the parameters for the cell position information (C_POSI) of FIG. 45 and the description thereof;

FIG. 55 shows the parameters for presentation control information (PCI) in the navigation pack of FIG. 53 and the description thereof;

FIG. 56 shows the parameters for general information (PCI_GI) in the presentation control information (PCI) of FIG. 55 and the description thereof;

FIG. 57 shows the parameters for disk search information (DSI) in the navigation pack of FIG. 53 and the description thereof;

FIG. 58 shows the parameters for DSI general information (DSI_GI) in the disk search information (DSI) of FIG. 57 and the description thereof;

FIG. 59 shows the parameters for synchronous playback information (SYNCI) on the video object (VOB) OF FIG. 57 and the description thereof;

FIG. 61 shows an example of the video manager menu;

FIG. 63 shows an example of the video title set menu;

FIG. 64 shows another example of the video title set menu;

FIG. 65 is a flowchart for illustrating the selecting operation of the audio stream and sub-picture stream;

FIG. 67 is a flowchart for the encoding process of FIG. 66;

FIG. 70 is a flowchart for creating logic data to be recorded on the disk in the disk formatter of FIG. 54; and FIG. 71 is a flowchart for creating from logic data physical data to be recorded on the disk.

DETAILED DESCRIPTION OF THE PREFERRED EMBODIMENTS

Hereinafter, referring to the accompanying drawings, an optical disk and an optical disk reproducing apparatus according to an embodiment of the present invention will be explained.

Figure 1:
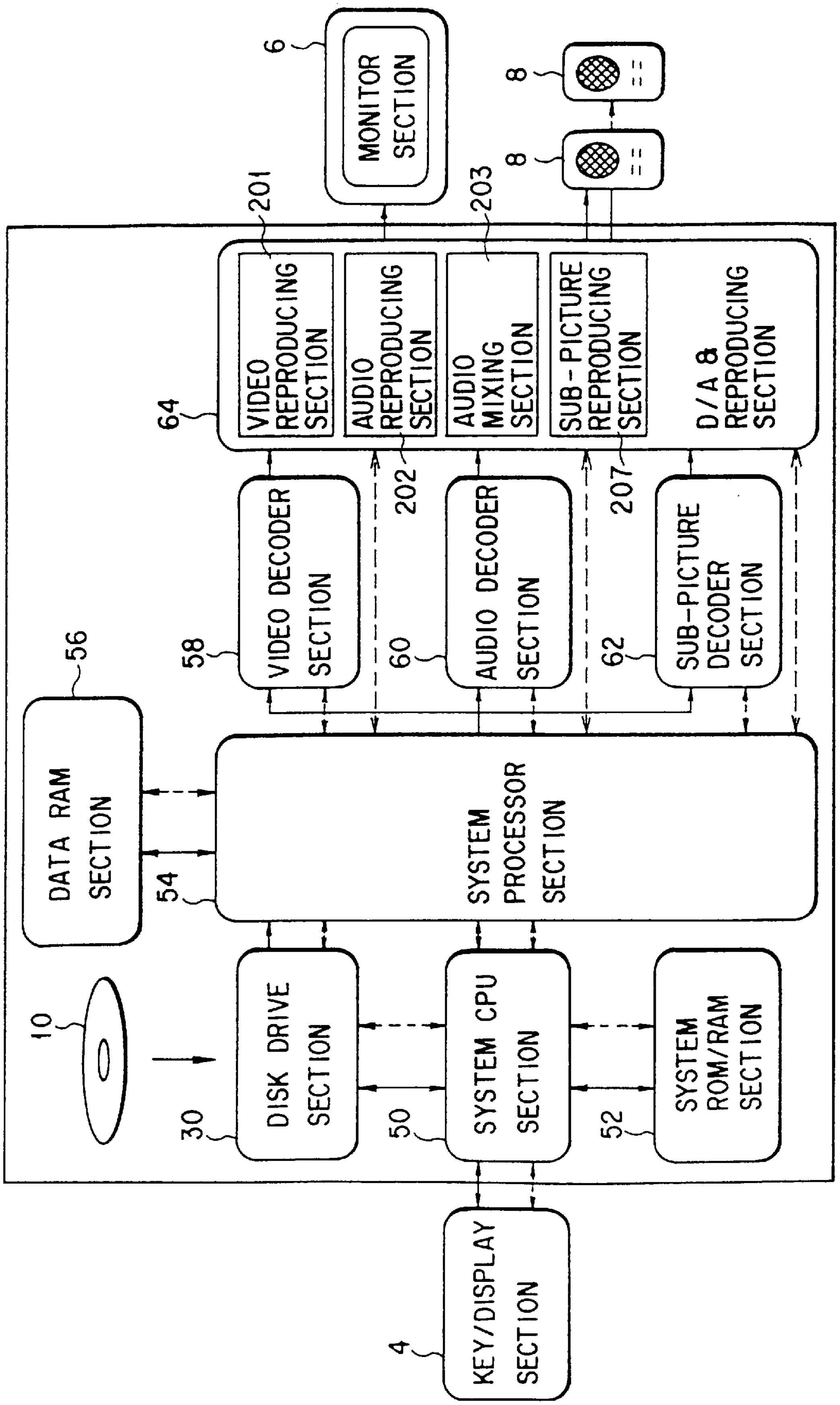
FIG. 1 is a block diagram showing the schematic construction of an optical disk apparatus according to one embodiment of this invention.

FIG. 1 is a block diagram of an optical disk reproducing apparatus that reproduces the data from an optical disk associated with an embodiment of the present invention. FIG. 2 is a block diagram of the disk drive section that drives the optical disk shown in FIG. 1. FIGS. 3 and 4 show the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the audio signals and the speaker section 8 generates sound according to the audio signals.

The optical disk 10 has been available with various structures. For instance, one type of the optical disk 10 is a read-only disk on which data is recorded at a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues clamped to the clamping areas 24.

As shown in FIG. 3, the optical disk 10 has an information area 25 around the clamping area 24 on each side, on which areas the information can be recorded. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which playback data, video data, sub-picture data, and audio data are recorded in the form of pits (that is, in the form of changes in the physical state) as explained later. With the read-only optical disk 10, a train of pits is previously formed on the transparent substrate 14 by a stamper, a reflecting layer is formed by evaporation on the surface of the transparent substrate 14 on which the pit train has been formed, and the reflecting layer serves as the recording layer 16. On the read-only optical disk 10, no groove is normally provided as a track and the pit train on the surface of the transparent substrate 14 serves as a track.

The optical disk apparatus 12, as shown in FIG. 1, further comprises a disk drive section 30, a system CPU section 50, a system ROM/RAM section 52, a system processor section 54, a data RAM section 56, a video decoder 58, an audio decoder section 60, a sub-picture decoder section 62, and a D/A and data reproducing section 64.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The motor 33 is driven by the driving signal and moves in and out the optical head 32 radially over the optical disk 10. The optical head 32 is provided with an object lens 34 positioned so as to face the optical disk 10. The object lens 34 is moved according to the driving signal supplied from the focus circuit 36 so as to move along its optical axis.

To reproduce the data from the aforementioned optical disk 10, the optical head 32 projects a laser beam on the optical disk 10 via the object lens 34. The object lens 34 is traversed minutely over the optical disk 10 according to the driving signal supplied from the tracking circuit 38. Furthermore, the object lens 34 is moved minutely along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, the object lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to trace the pit train at a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to traverse over the optical disk 10. Then, the optical head 32 accesses a specific sector formed at the recording layer 16 of the optical disk 10. The playback data is reproduced from the specific sector by the optical head 32, which then supplies it to the head amplifier 40. The head amplifier 40 amplifies the reproduced data, which is outputted at the disk drive section 30.

The reproduced data is stored in the data RAM section 56 by the system processor section 54 under the supervision of the system CPU section 50 controlled by the programs stored in the system ROM/RAM section 52. The stored reproduced data is processed at the system processor section 54, which sorts the data into video data, audio data, and sub-picture data, which are supplied to the video decoder section 58, audio decoder section 60, and sub-picture decoder section 62, respectively, and are decoded at the respective decoders. The D/A and data-reproducing section 64 converts the decoded video data, audio data, and sub-picture data into an analog video signal, an analog audio signal, and an analog sub-picture signal and supplies the resulting video signal to the monitor 6 and the resulting audio signal to the speaker 8. Then, on the basis of the video signal and sup-picture signal, images are displayed on the monitor section 6 and according to the audio signal, sound is simultaneously reproduced at the speaker section 8.

Next, the structure of the logic format of the optical disk apparatus shown in FIG. 1 is explained. At present, the logic format of the optical disk apparatus is available in two versions; an initial version and a new version which is an improved version of the initial version. First, the logic format of the initial version is explained with reference to FIGS. 4 to 11, and the new version which is an improved version of the initial version is explained with reference to FIGS. 15 to 59. Further, the operation of the optical disk apparatus shown in FIG. 1 is explained in detail later together with the logic formats for the initial version of the optical disk 10 and the new version which is an improved version of the initial version.

In FIG. 4, the structure of the logic format for the initial version is shown. That is, the data recording area 28 from the lead-in area 27 to the lead-out area 26 of the optical disk 10 shown in FIG. 1 has a volume structure which conforms to ISO9660 as shown in FIG. 4 as the logic format. The volume structure is constructed by a volume management information area 70 of hierarchical structure and file area 80. The volume management information area 70 has logical block numbers "0" to "23" determined in conformity to ISO9660 and a system area 72 and volume management area 74 are allotted therein. The system area 72 is normally used as a freely available area and the content thereof is not determined but, for example, the area is provided for the editor who edits data to be recorded on the optical disk 10, and a system program for realizing the operation of the optical disk apparatus which satisfies the intention of the editor is stored therein as required. Further, in the volume management area 74, volume management information for managing a disk information file 76 of the file area 80 (which is hereinafter simply referred to as a disk information file 76) and files 78 such as movie files or music files, that is, the recording positions, recording capacities, and file names of all of the files and the like are stored. In the file area 80, the files 76, 78 from the file number "0" to the file number "99" specified by the logical block number "24" and succeeding logical block numbers are arranged, and the file 76 of the file number "0" is allotted as the disk information file 76 and the files 78 of the file number "1" to the file number "99" are allotted as movie files, that is, video files, or music files.

Figure 5:
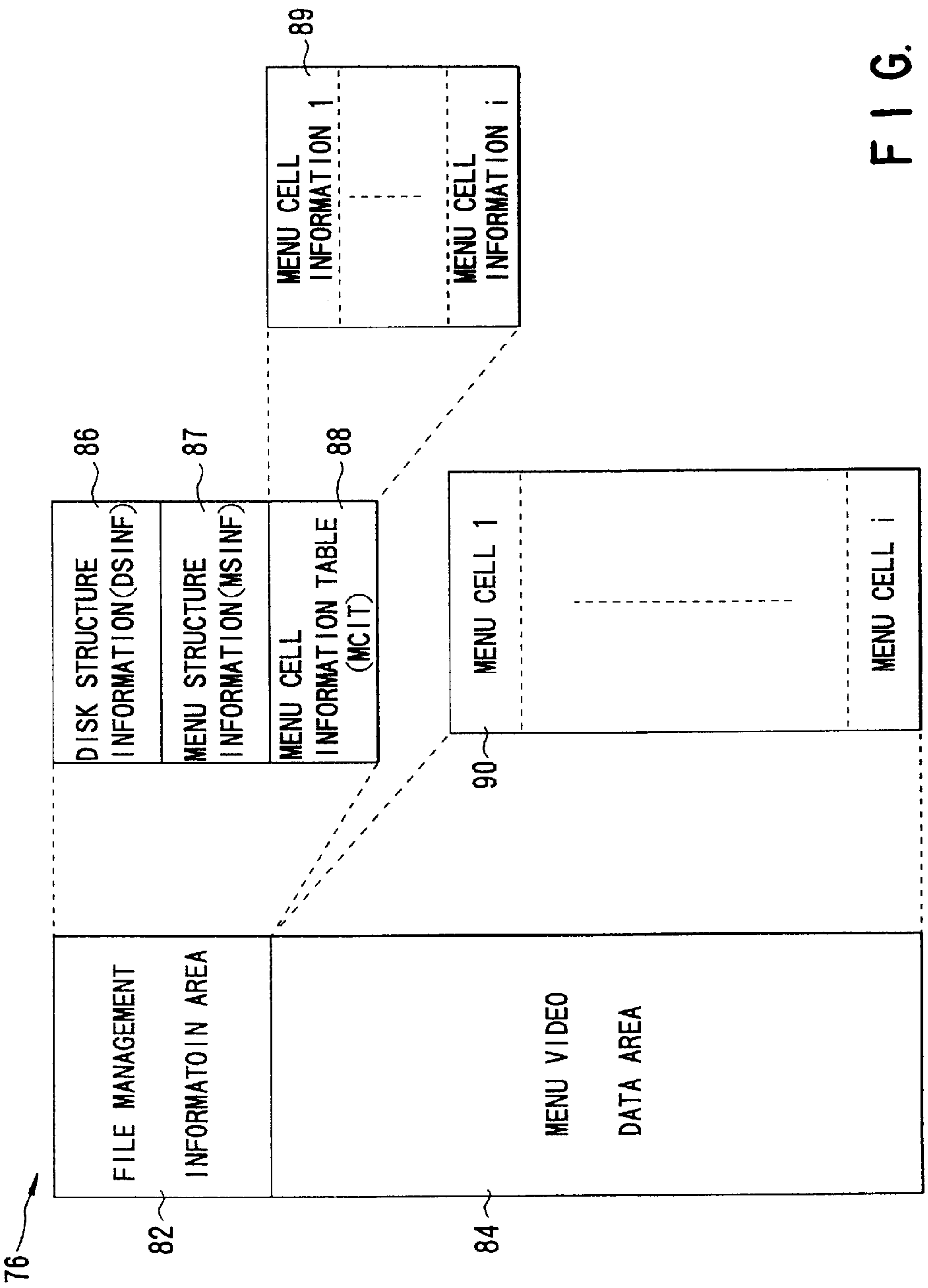
FIG. 5 is an explanatory diagram showing the structure of a disk information file shown in FIG. 4.

As shown in FIG. 5, the disk information file 76 is constructed by a file management information area 82 and a menu video data area 84, and in the file management information area 82, selectable sequences recorded on the entire portion of the optical disk 10, that is, file management information for selecting the title of video or audio is described. Particularly, in the karaoke optical disk 10 for business use, the sequence corresponds to the genre of karaoke, for example, ENKA (Japanese popular ballad), pops and rock-'n'-roll, and a program used as the species of the sequence which will be explained later corresponds to the specific title of a musical composition. Further, in the karaoke optical disk 10 containing a small number of musical compositions, the sequence may be set to directly specify the title of a musical composition.

In the menu video data area 84, image data on the menu display screen for displaying a selection menu for selecting the title, for example, the genre of the titles of musical compositions of karaoke and the titles of the musical compositions of the genre is stored as menu data cells 90 in the unit of cell. Menu video data of the menu video data area 84 is divided into units of adequate magnitudes necessary for serving the purpose as will be described later and defined as i menu cells 90 to which successive numbers starting from #1 are allotted in an order of data recording into the menu video data area 84 of the disk 10. In the menu cell 90, video data, sub-picture data or audio data relating to selection of the titles of movie or audio, or selection of programs of the titles is stored.

As shown in FIG. 5, the file management information area 82 has three types of information areas including a disk structure information area 86 for storing disk structure information (DSINF), a menu structure information area 87 for storing menu structure information (MSINF), and a menu cell information table (MCIT) 88 for storing cell information and they are arranged in this order.

In the disk structure information area 86, the movie file and music file mainly recorded on the file area 80 of the main disk 10, that is, structure information relating to the files on the disk such as title information (described as a parameter TSINF) relating to the number of programs and audio information (described as a parameter FCINF) relating to the number of audio streams (described as a parameter FNAST), a code (described as a parameter FACODE) for specifying the audio stream, the number of reproduction files 78 (described in the range of "1" to "99" as a parameter DSINF) and the number of sequences lying in the individual files 78 (which correspond to a series of data groups of video data containing video, audio and sub-picture as described before, which are hereinafter referred to simply as sequences and which are described as parameters FSINF) is described.

In the menu structure information (MSINF) area 87, information such as the number of menu cells 90 (described as a parameter NOMCEL) of the menu video data area 84 recorded in the disk information file 76 and a starting cell number (described as a parameter TMSCEL) of the title menu cells 90 constructing a series of menu video data items for selecting the titles lying in the disk (the selection items on the menu display screen for specifying the genre of music are treated as titles in the case of karaoke as will be described later) is described. Further, in the menu structure information (MSINF), an audio menu starting cell number (ADMSCEL) for specifying the starting number of the audio menu is described. In the audio menu specified by the starting number, information relating to the microphone volume, the magnitude of echo, the tone level, the audio level of sub-audio, and the balance on the right and left sides is displayed as will be described later and the characteristics of respective portions in the reproduction processing section 64 can be adjusted by specifying the corresponding audio reproduction characteristics according to the display. Further, in the menu structure information (MSINF), a program menu starting cell number (PMSCEL) specified by the starting cell number of the program menu (the program corresponds to a musical composition of karaoke and the title of the musical composition is specified by specifying the program on the menu display screen in the case of karaoke as will be described later) is described.

In the menu cell information table 88, a set of i cell information areas 89 in which cell information items necessary for reproduction of the respective menu cells 90 are described in an order of the cell numbers is defined. In the cell information table 88, information such as the position (described by the offset logical block number from the head of the file as a parameter MCSLBN) of the cell 90 in the file 76 and the size (described by the number of logical blocks as a parameter MCNLB) is described. The disk structure information (DSINF) and menu structure information (MSINF) are successively described in the file management information area 82 and the menu cell information table (MCIT) 88 is aligned with the boundary between the logical blocks.

In the karaoke optical disk, a menu display screen for selecting a musical composition is created by use of the menu file 76. That is, a main menu cell for displaying ENKA, pops and rock-'n'-roll and a plurality of sub-menu cells for displaying the titles of musical compositions in the genre selected by use of the main menu are prepared.

Figure 6:
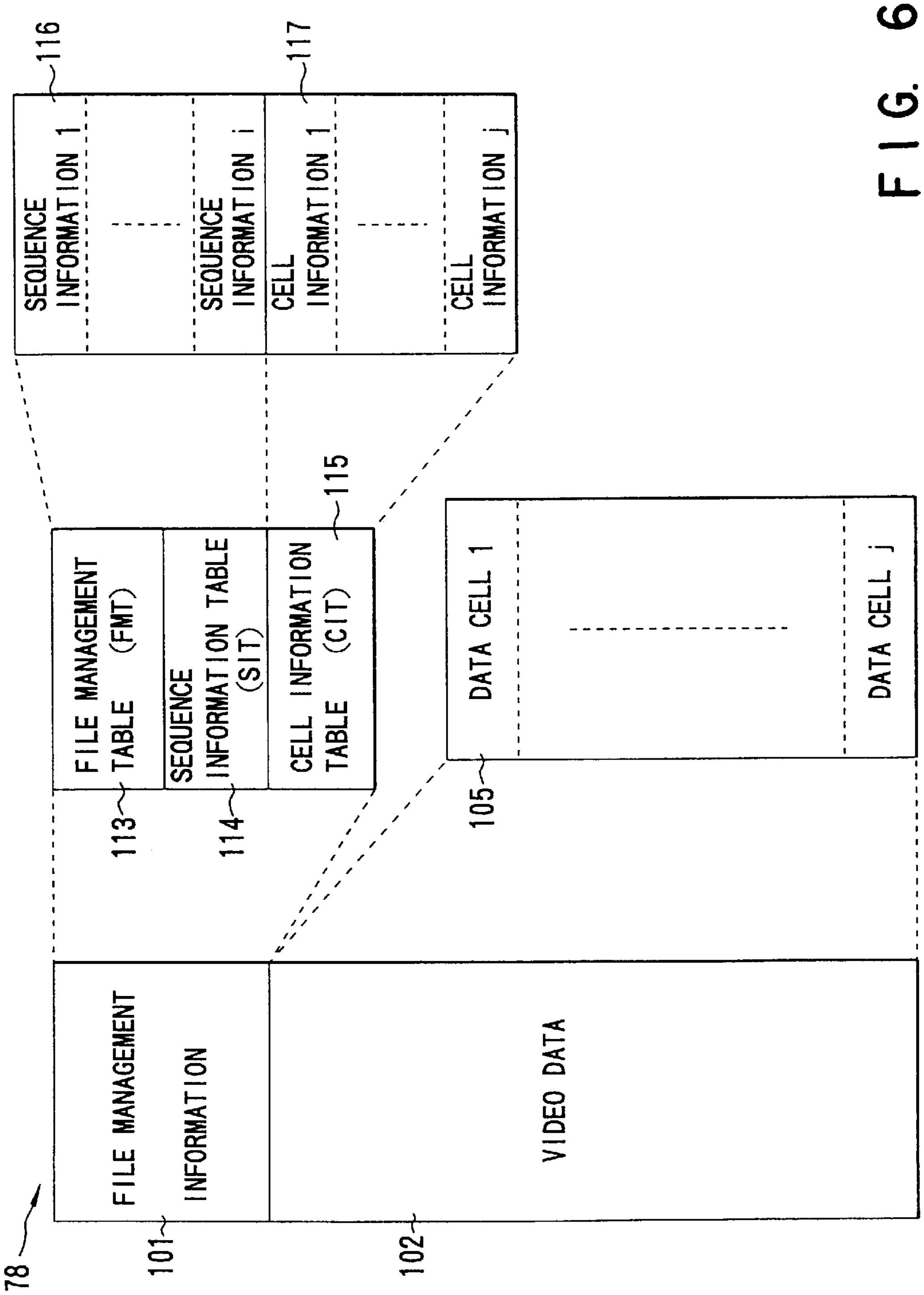
FIG. 6 is an explanatory diagram showing the structure of a file such as a movie file and music file shown in FIG. 4.

Music data items or movie data items of one of more titles are stored in the movie file and music file 78 corresponding to the file number "1" to the file number "99". In the karaoke optical disk, music data of a plurality of titles is stored in the music file. The music file 78 has a file structure constructed by a file management area 101 in which item information for data contained in the file 78 as shown in FIG. 6, that is, management information (for example, address information and presentation control information) is described and a video data area 102 in which video data (in this case, video, audio and sub-picture data are referred to simply as video data) of the file 78 is described. Like the case of the menu cell 90 of the disk information file 76, in the video data area 102, video data is divided into cell units and is arranged as j video data cells 105. As already explained, the file is movie data corresponding to the story of a movie of one title in the case of movie data, and the file corresponds to one reel among a karaoke series in the case of karaoke. The disk information file 76 corresponds to control data used when the movie or karaoke is reproduced and control information is arranged in a hierarchical configuration according to a preset format.

Figure 7:
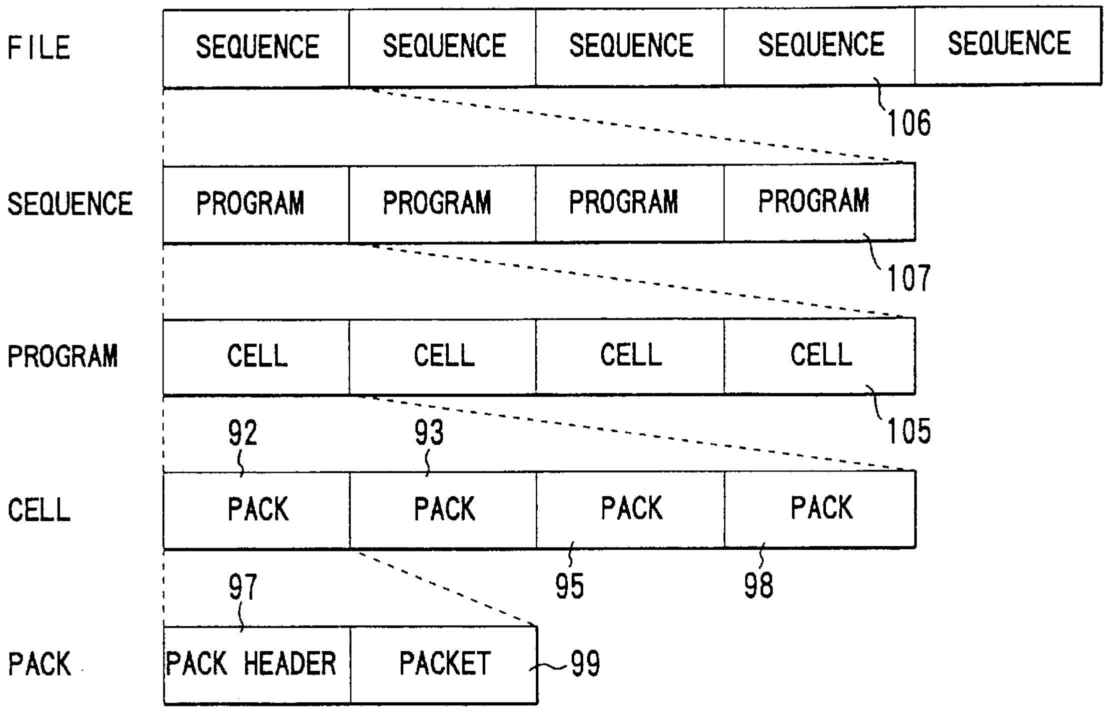
FIG. 7 is an explanatory diagram showing the hierarchical structure of a video data area of the file shown in FIG. 6.
Figure 8:
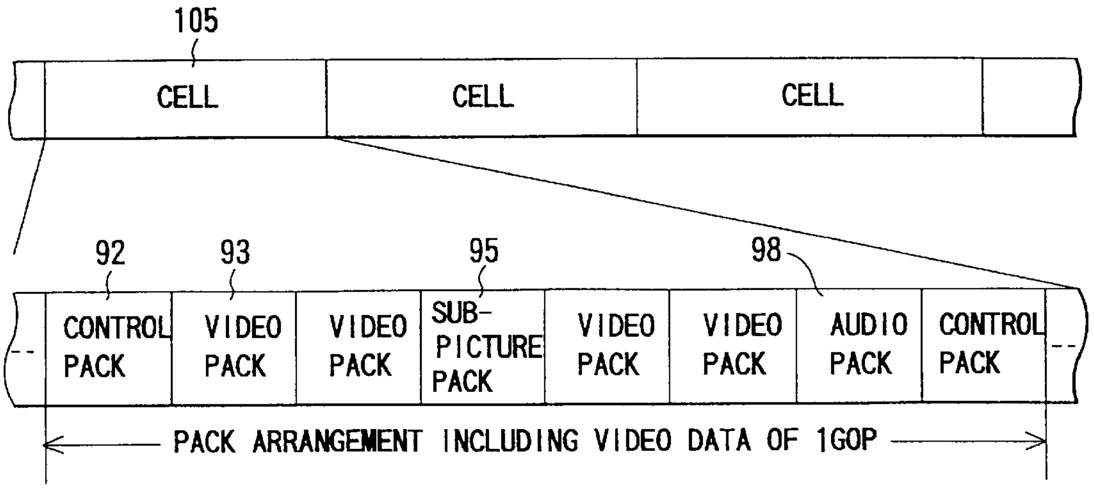
FIG. 8 is an explanatory diagram showing one GOP constructing a video cell shown in FIG. 7.

Generally, movie data or audio data of a certain title is represented as a set of successive sequences 106. For example, the story of the movie is represented by the successive sequences 106 corresponding to the "opening part", "succeeding part", "developing part" and "ending part". Therefore, the video data area 102 of each file 78 is defined as a set of sequences 106 as shown in FIG. 7. Further, in the karaoke optical disk for business use, the sequence corresponds to the genre of music. Each sequence 106 is constructed by a plurality of programs. The respective programs correspond to various scenes of the movie story in the case of movie and correspond to karaoke data of a sub-picture for lyric lines, video and audio of the title of a musical composition in the case of karaoke. In the case of home-use karaoke having a small number of musical compositions stored in the file 78, the sequence may be set to directly specify the musical composition of karaoke. Further, each video program 107 is constructed by a plurality of video data cells 105. As shown in FIG. 8, each video cell 105 is constructed by a plurality of groups of pictures (GOP) each of which is constructed by a combination of a control pack (DSI) 92, video pack 93, sub-picture pack 95 and audio pack 98. The structure of the video cell 105 is substantially the same as that of the menu cell 90 and data such as the moving picture (movie), voice (audio) and sub-picture included in the video data 102 and compressed according to the compression specification, for example, the specification of MPEG (Moving Picture Expert Group) is recorded in the data format for a system player of MPEG2. That is, the video data 102 is a program streamer specified by the MPEG specification. Further, each pack 92, 93, 95, 98 has a pack structure constructed by a pack header 97 and a packet 99 corresponding to the pack. In this example, it is supposed that karaoke of a type in which lyric lines are displayed on the image of background while playing a tune is used, but karaoke of a type in which the image of the background is a still picture and the lyric lines are displayed as the sub-picture while playing a tune, or karaoke of a type in which the lyric lines are displayed, the sound is reproduced and the video image is not displayed may be used.

The file management information area 101 is constructed by a file management table (FMT) 113, sequence information table (SIT) 114, cell information table (CIT) 115 and the like. The video data cells in the video data area 102 are allotted with successive numbers starting from #1 in an order of data recording into the disk and the cell number and information relating to the cell corresponding to the cell number are described in the cell information table 115. That is, a set of areas 117 in which j cell information items (CI) in which information items necessary for reproduction of the video data cell are described in an order of the cell number are stored is defined in the cell information table 115 and information of the position, size and reproduction time of the cell in the file 78 is described in the cell information (CI). In the case of karaoke, the file 78 may be so formed that a cell in the file 78 may correspond to the sub-picture, video and audio data corresponding to the first lyric lines of a musical composition, a next cell may correspond to the sub-picture, video and audio data corresponding to the second lyric lines of the musical composition, and a third cell may correspond to the sub-picture, video and audio data corresponding to the third lyric lines of the musical composition.

In FIG. 9, the content of cell information (CI) stored in the cell information table 115 is shown. The contents such as the starting position and size of video cells obtained by dividing video data into units according to the purpose thereof in the cell information 117 are described by use of parameters. That is, the cell information (CI) includes cell classification information (CCAT) indicating the content of the video cell, for example, indicating that the video data is one of the movie, karaoke and interactive menu, cell reproduction time (CTIME) indicating the total reproduction time of the video cell, cell starting position information (CSLBN) indicating the starting position, that is, starting address of the video cell, and size information (CNLB) indicating the size of the structure of the video cell.

The sequence information table 114 is defined as a set of areas 116 in which i sequence information items (SI) describing the order for selecting and reproducing cells 105 in the range specified for each sequence 106 are stored, and in each sequence information (SI), the reproduction order of the video cells 105 recorded in the sequence 106 and presentation control information relating to the reproduction are described. The number of the sequence information is defined as one of the sequence numbers "1" to "i" and the starting position information items thereof are written in the file management information table 113.

In FIG. 10, the content of one sequence information (SI) stored in the sequence information table 114 in the file management information area 101 shown in FIG. 6 is shown. As shown in FIG. 10, the reproduction order of the video cell and sequence information are described in the sequence information area 116. The number of the sequence information (SI) coincides with the sequence number and the sequence information is allotted in the numerical order in the sequence information table 114. The sequence information includes sequence classification information (SCAT), the number of structure programs (SNPRG), sequence reproduction time (STIME), connection sequence number information (SNCSQ), sequence number list information (SCSQN) and sequence control information (SCINF). In the sequence classification information (SCAT), information indicating whether the type of the sequence is movie or karaoke is described. In the number of structure programs (SNPRG), the number of programs constructing the sequence is described, and in the sequence reproduction time (STIME), the total reproduction time of the sequence is described. In the sequence control information (SCINF), the reproduction order of the cells constructing the sequence, the cells constructing the program in the sequence and the program number specifying the program are described. The program in the sequence corresponding to a musical composition of karaoke permits the head cell of the program to be specified by referring to the sequence control information (SCINF) and karaoke data can be reproduced based on the cell. It is also possible to display a plurality of next candidates selected by using the last cell in a plurality of cells constructing each program as a menu cell and permit selection of the next candidates.

The file management table (FMT) 113 shown in FIG. 11 indicates item information relating to the video file 78. As shown in FIG. 11, in the file management table 113, the file name (FFNAME) and the file identifier (FFID) for identifying whether or not the file can be reproduced by an optical disk apparatus having an optical disk loaded thereon are described. In the file identifier (FFID), for example, an identifier for identifying that the file is a movie file is described. Further, in the file management table 113, the starting addresses (FSASIT, FSACIT) of the sequence information table (SIT) 114 and cell information table (CIT) 115, the numbers (FNSQ, FNCEL) of sequence information items (SI) and cell information items (CI) described in the respective tables, the starting address (FSAESI) of the sequence 116 indicated by the relative distance from the head of the sequence information table (SIT) 114 and the starting address (FSADVD) for starting video data of the video data area 102, and data attributes as information for reproducing data are described. In this example, in the starting address (FSASIT) of the sequence information table 114, the starting address of the sequence information table 114 from the head of the file 78 to which the file management table 113 belongs is described by use of offset block logical numbers, and in the sequence information starting address (FSAESI), the starting address of each sequence information in the sequence information table 114 and the size thereof are described in the order of description of the sequences by the number of the sequences. The starting address is described by use of the offset byte number from the head of the sequence information table 114.

Further, in the file management table (FMT) 113, the audio stream number (FNAST) in which the number of audio streams is described and the audio stream attribute (FAATR) relating to the attribute of the audio stream are described. The audio stream is a stream of audio data items, and in the case of movie data, it includes a master stream corresponding to the background sound and a slave stream corresponding to an audio portion of the movie, and in the slave stream, an English voice, Japanese voice or other language can be prepared. Further, in the case of karaoke, the master stream corresponds to audio data containing a musical performance by an orchestra or the like and the slave stream corresponds to audio data relating to a male vocal voice or female vocal voice. The audio compression mode, for example, Dolby AC3 or linear PCM audio is described as the audio stream attribute (FAATR), the audio mode, for example, monaural or stereo is described, and the audio classification, for example, a case wherein no specification is made or a case wherein a language is used is described. Further, in the audio stream attribute (FAATR), MIX relating to mixing, master stream number and specified code are described. In MIX, information indicating that the audio stream is an independent stream, that is, it is a master stream which cannot be used for mixing, that the audio stream is a stream which can be used for mixing and can be independently reproduced, that is, it is a master stream, or that the audio stream is a stream which can be used for mixing but cannot be independently reproduced, that is, it is a slave stream is described. In the master stream number, the number of an audio stream of the master stream to be mixed is described when the audio stream is the slave stream, and information indicating that a target audio stream is not available is described in the case of independent stream or master stream. Further, in the specified code, code numbers indicating languages described in the language table separately determined, for example, English, Japanese, German or the like are described when information indicating the languages for the respective audio classifications or indicating that the stream is an audio stream is described.

Next, the operation of reproducing karaoke data from the optical disk 10 having the logic formats shown in FIGS. 4 to 11 is explained with reference to FIG. 1. In FIG. 1, arrows indicated by solid lines indicate data buses and arrows indicated by broken lines indicate control buses.

In the optical disk apparatus shown in FIG. 1, when the power supply switch is turned ON, the CPU section 50 reads out an initialization program from the system ROM and RAM 52 and drives the disk drive section 30. Therefore, the disk drive section 30 starts the readout operation from the lead-in area 27 and reads out volume management information from the volume management information area 74 of the volume management area 70 following the lead-in area 27. That is, in order to read out volume management information from the volume management information area 74 recorded in a preset position of the disk 10 set in the disk drive section 30, the system CPU section 50 issues a read command to the disk drive section 30 to read out the content of the volume management information and temporarily store the same into the data RAM section 56 via the system processor section 54. The system CPU section 50 extract information of the recording position and recording capacity of each file and other information necessary for the management from a data string of the volume management information stored in the data RAM section 56, transfers the information to a preset location of the system ROM & RAM section 52 and stores the same therein.

Next, the system CPU section 50 acquires the disk information file 76 corresponding to the file number "0" from the system ROM & RAM section 52 by referring to the information of the recording position and recording capacity of each file which has been previously acquired. That is, the system CPU section 50 issues a read command to the disk drive section 30 by referring to the information of the recording position and recording capacity of each file which has been previously acquired, reads out file management information of the disk information file 76 having a file number "0" from the system ROM & RAM section 52 and stores the same into the data RAM section 56 via the system processor section 54. The system CPU section also transfers the acquired information to a preset location of the system ROM & RAM 52 and stores the same therein.

The system CPU section 50 reproduces the sequence (title) selection menu of the menu video data 84 by use of the disk structure information 86, menu structure information 87 and cell information table 88 of the file management information of the disk information file 76 and displays the menu on the image plane as will be described later. That is, a main menu display screen displaying the genre of karaoke is displayed, and when a genre is specified on the main menu display screen by use of the key operating and displaying section 4, the sequence number thereof is specified. After this, a sub-menu display screen displaying the titles of musical compositions, and when the title of a musical composition is specified on the sub-menu display screen, the program number thereof is specified. Thus, the file number and sequence information corresponding to the selected sequence and a program in the sequence are specified.

Next, an operation from a step of acquiring the specified video file 78 to a step of reproducing the video data 102 is explained. In order to acquire sequence information for the specified sequence number, a program to be reproduced, that is, the file management information 101 of the video file 78 to which the sequence is attributed is first read out in the same manner as in the case wherein the disk information file 76 is acquired by use of the recording position and recording capacity of each video file 78 derived from the volume management information 74 and then stored into the data RAM section 56.

The system CPU section 50 acquires sequence information to which the specified program belongs from the sequence information table 114 of the file management information 101 stored in the data RAM section 56 and transfers the data and cell information 117 in the cell information table 115 necessary for reproducing the program of the sequence to the system ROM & RAM 52 and stores the same therein.

Cell information to be first reproduced is acquired according to the cell reproducing order information of the program in the thus acquired sequence information and a read command from a target address is issued to the disk drive section 30 based on the size and video data reproduction starting address in the cell information. The disk drive section 30 drives the optical disk 10 in response to the read command and reads out data at the target address from the optical disk 10 and then transfers the readout data to the system processor section 54. The system processor section 54 temporarily stores supplied data into the data RAM section 56, determines the classification (video, audio, sub-picture, reproduction information or the like) of the data based on header information attached to the data, and transfers data to the decoder section 58, 60, 62 corresponding to the determined classification.

Each of the decoder sections 58, 60, 62 decodes data according to the data format thereof and supplies the decoded data to the D/A & reproduction processing section 64. The D/A & reproduction processing section 64 converts a digital signal obtained as the result of decoding into an analog signal, subjects the analog signal to the mixing process, and outputs the thus obtained signal to the monitor section 6, speaker section 8.

In the process of determination of data classification, if data is reproduction information indicating the reproducing position of video data, the reproduction information is not transferred to the decoder, but the reproduced data is stored into the data RAM section 52. The reproduction information is referred to by the system CPU section 50 as required and used for monitoring when video data is reproduced.

When reproduction of one cell is completed, cell information to be next reproduced is acquired from the cell reproducing order information in the sequence information and is successively reproduced in the same manner as described above.

Further, a circuit for the audio control operation for audio data in the D/A & reproduction processing section 64 is explained in detail with reference to FIG. 12. In FIG. 12, the key operating and displaying section 4 is divided into a display section 4A and a keying section 4B.

As described before, video data optically detected by the optical disk 10, that is, an RF signal is divided into video data and audio data by the system processor section 58, and the video data is decoded by the video decoder section 58 and output as a video reproduction signal. On the other hand, the audio data is input to the audio decoder section 60, decoded into an audio signal and divided into a main audio signal corresponding to the master stream and a sub-audio signal corresponding to the slave stream which are separately output. The tone of the main audio signal is adjusted by a voice tone control section 126 and then the main audio signal is input to a voice adding/changing section 127. Further, the sub-audio signal is adjusted to have an adequate signal amplitude by a sub-audio signal amplitude adjusting section 124 and then input to a sub-audio signal L/R balance adjusting section 125 so as to adjust the volume balance between the L (left) side and the R (right) side. A microphone voice signal is input to a voice receiving section 120 from a microphone (not shown), an external voice signal from the voice receiving section 120 is input to a reverberation effect control section 129 and is subjected to the echo process in the reverberation effect control section 129. The external voice signal subjected to the echo process is output to the voice adding/changing section 127 which is supplied with a main audio signal output from the voice tone control section 126 and a sub-audio signal output from the sub-audio signal L/R balance adjusting section 125. In the voice adding/changing section 127, the main audio signal and sub-audio signal and the external voice signal are added together, selectively changed as required, and finally output as a stereo audio signal. The respective portions of the circuit shown in FIG. 12 are controlled by the system CPU section 50 and connected to the display section 4A for displaying the operation state and the keying section 4B for receiving an instruction from the user via the system CPU section 50.

Figure 13A:
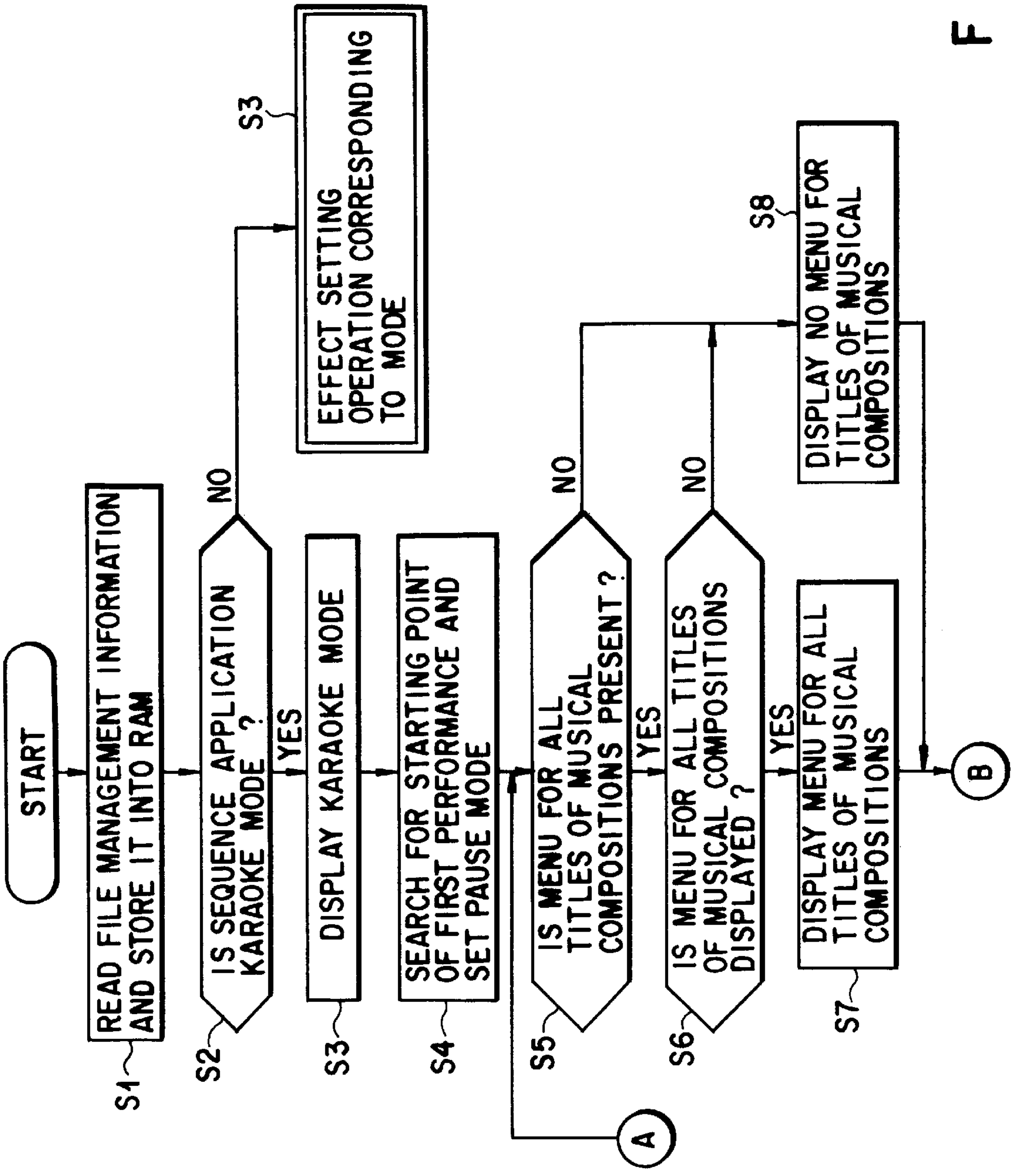
FIGS. 13A and 13B are flowcharts for illustrating the operation of a reproducing apparatus in a karaoke mode in a system shown in FIG. 1.
Figure 13B:
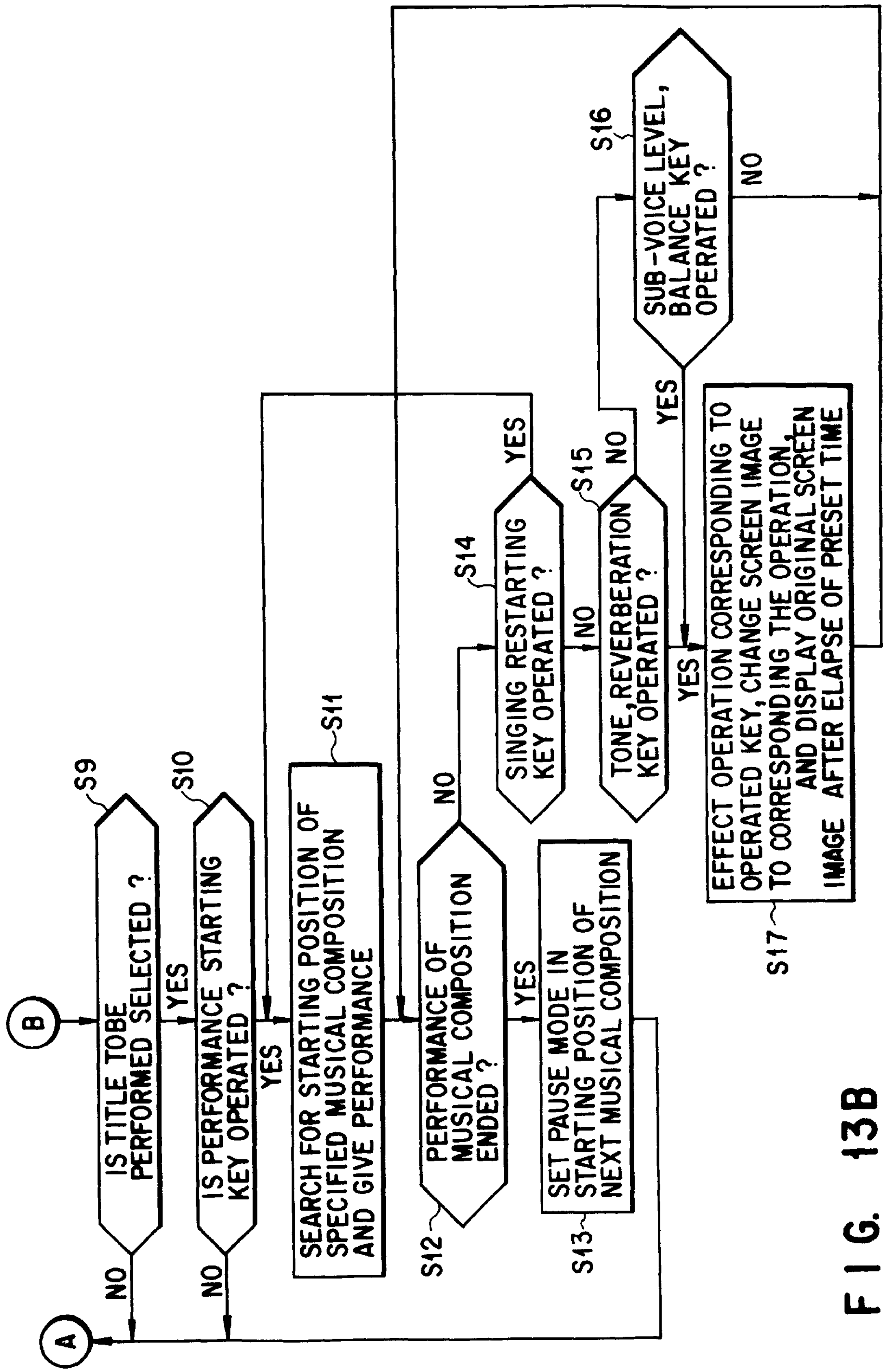

The operation of the circuit shown in FIG. 12 is explained with reference to the flowchart shown in FIGS. 13A and 13B. As described before, the system CPU section 50 reads out file management information recorded in the preset area of the disk via the system processor section 54 to acquire all the information necessary for the musical performance including sequence application. The readout information is stored in the system ROM & RAM 52 until the power supply switch of the reproducing apparatus is turned OFF (step S1).

When data is reproduced from the disk, the sequence application (SCAT) is first analyzed and whether the karaoke mode is selected or not is determined. If a mode other than the karaoke mode is set, the operation of the disk device is set according to the set mode (steps S2, S3).

Figure 14A:
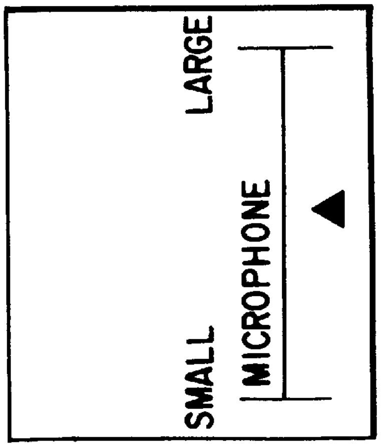
FIGS. 14A to 14F are explanatory diagrams showing examples of display on an image plane obtained by the key operation in the system shown in FIG. 1.
Figure 14B:
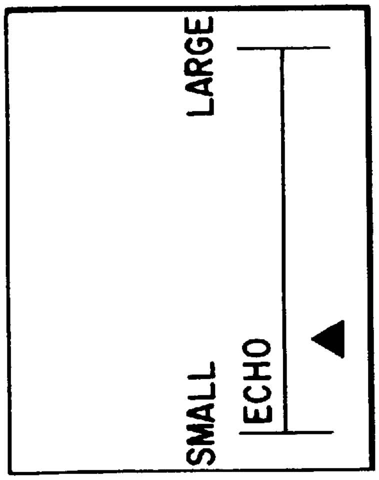
Figure 14C:
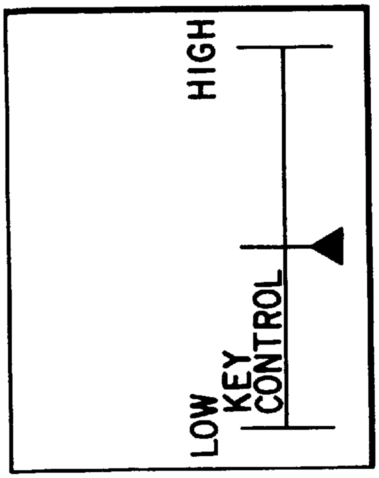
Figure 14D:
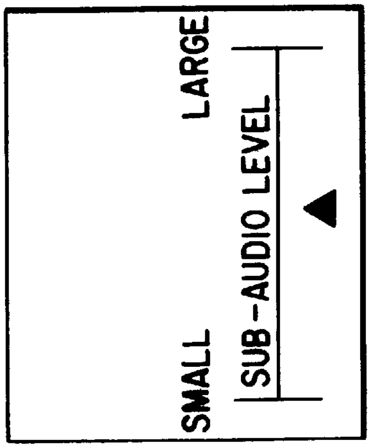
Figure 14E:
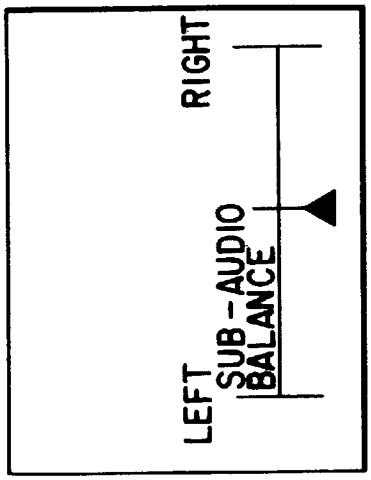
Figure 14F:
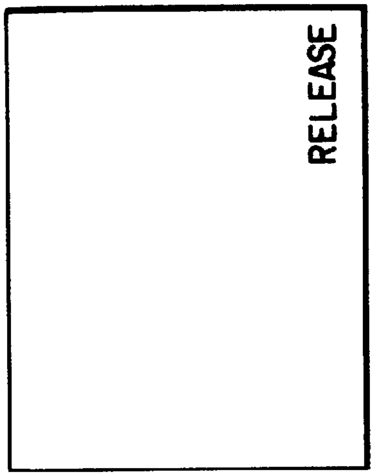

If the karaoke mode is set, information indicating that the karaoke mode is set is displayed by means of an LED, for example, on the display section 4A, and at the same time, the starting point of the first musical performance is searched for and the pause mode is set in the starting position (steps S3, S4). In this case, an adjustment display screen such as a microphone volume adjustment display screen as shown in FIGS. 14A, 14B or 14C can be displayed on the monitor 6 by operating the keying section 4B. That is, if the microphone volume is adjusted while observing the adjustment display screen of FIG. 14A, an adjustment command thereof is supplied to the microphone voice receiving section 120 via the keying section 4B and the amplification factor for the received microphone voice signal is changed, and if the echo is adjusted while observing the adjustment display screen of FIG. 14B, an adjustment command thereof is supplied to the reverberation effect control means 129 via the keying section 4B and the echo of the received microphone voice signal is changed. Further, if the key control corresponding to the pitch as shown in FIG. 14C is adjusted, an adjustment command thereof is supplied to the voice tone control section 126 via the keying section 4B and the tone of the main audio signal is changed. Further, if the level of the sub-audio and the right-left balance thereof are adjusted while observing the adjustment display screens of FIGS. 14D, 14E, adjustment commands thereof are supplied to the sub-audio signal amplitude adjusting section 124 and sub-audio signal L/R balance adjusting section 125 via the keying section 4B and the reproduced audio level of the sub-audio and the right-left balance thereof are adjusted. In order to cope with a case wherein the adjustment is erroneously effected, a display screen as shown in FIG. 14F for releasing the adjustment is displayed, a reset command is supplied to the microphone voice receiving section 120, reverberation effect control means 129, voice tone control section 126, sub-audio signal amplitude adjusting section 124 and sub-audio signal L/R balance adjusting section 125 according to the releasing operation, and the microphone voice receiving section 120, reverberation effect control means 129, voice tone control section 126, sub-audio signal amplitude adjusting section 124 and sub-audio signal L/R balance adjusting section 125 are returned to the standard states set before the adjustment. After the adjustment, whether menu information, particularly, a menu for all of the titles of musical compositions is present or not is determined (step S5), and if the menu information is present, whether the menu for all of the titles of musical compositions is displayed as a menu display screen or not is determined (step S6). When the menu for all of the titles of musical compositions is displayed (step S7), the menu is displayed and the title of a musical composition is selected from the menu (step S9). In this case, it is clearly understood that the menu for all of the titles of musical compositions can be constructed by a main menu and a plurality of sub-menus as described before. If the title of a musical composition is not selected, the step S5 is effected again. Further, if it is determined in the step S5 that no menu is present or if non-display of the menu is selected in the step S6, the menu of the titles of musical compositions is not displayed and the title of a musical composition is selected by specifying the title by use of a code on the list of the titles (steps S8, S9). As described before, selection of the title of a musical composition to be performed corresponds to selection of a program in a certain sequence, and the head cell in the program is searched for by specification of the program. Thus, the operation of interactive karaoke can be effected in the pause mode. If the title of a musical composition to be performed is selected, whether the performance starting key is operated or not is determined (step S10), and if the performance starting key is not operated, the step S5 is effected again. If the performance starting key is operated, the specified title of the musical composition is searched for and the musical performance is started (step S11). After this, when the performance is ended, the pause mode is set and kept in the starting position of the next musical composition and the step S5 is effected again (step S13). The end of the performance is the end of the selected program as described before and corresponds to reproduction of cell data in the program. At the time of end of the performance, an adjustment command set before the performance is reset if a hold key for holding the adjusting operation is not operated on the keying section 4B. That is, at the time of end of the performance, a reset command is generated from the keying section 4B, the reset command is supplied to the microphone voice receiving section 120, reverberation effect control means 129, voice tone control section 126, sub-audio signal amplitude adjusting section 124 and sub-audio signal L/R balance adjusting section 125, and the microphone voice receiving section 120, reverberation effect control means 129, voice tone control section 126, sub-audio signal amplitude adjusting section 124 and sub-audio signal L/R balance adjusting section 125 are returned to the standard states set before the adjustment. The reset command may be generated when the title of a musical composition to be next sung is selected on the next menu display screen, or the hold state may be maintained between the musical compositions of the selected genre and a reset command may be generated when the genre is changed.

If the musical performance is not ended and when a singing restarting key is operated (step S14) because a person wants to stop singing in the course of performance and start singing from the beginning, for example, the step S11 is effected again. In the singing restarting mode, the head cell of the selected program is specified as a reproducing cell and data cells are successively reproduced. Further, if the person's song is out of tune with the musical performance and the tone or reverberation key is operated in the course of performance, a process corresponding to the operated key is effected and the display screen is changed to a corresponding display screen, and then after an elapse of preset time, the original display screen set during the performance is displayed, that is, the step S12 is effected again. When the sub-audio level or balance key is operated (step S15), a process corresponding to the operated key is effected and the display screen is changed to a corresponding display screen, and then after an elapse of preset time, the original display screen set during the performance is displayed (step S16), that is, the step S12 is effected again.

In the above menu display screen, not only the main audio of the musical performance corresponding to the title but also a sub-audio can be selected. For example, only the orchestra may be used as the main audio corresponding to the master stream and a vocal of model singing corresponding to the sub-audio may be selected as the slave stream in addition to the master stream. By this selection, the performance of only karaoke or the performance of vocal voice mixed with a voice guidance can be selected.

Further, if a male vocal is allotted to the L (left) side of the vocal voice and a female vocal is allotted to the R (right) side and when one man sings a duet song alone, for example, he can sing the song with a vocal voice mixed with the orchestra only on the R (right) side. On the other hand, if one lady sings a duet song alone, only the male vocal on the L (left) side may be mixed. The above setting can be realized by selecting the slave stream in addition to the master stream from the menu display screen.

Further, in the karaoke mode, the tone (key) of the audio signal of the orchestra can be adjusted and the reverberation effect (echo) can be added to the external input voice from the microphone, and at the same time, the sound volume of the microphone, reverberation level, tone, sub-audio level, and balance thereof are displayed in a symbolized form on the image plane according to the above key operation. In addition, a singing restarting function which is particularly necessary in the case of karaoke and permits a person to sing the song from the beginning again is provided and the function is to set the musical performance back to the head of the musical composition which is now performed and reproduce the musical composition immediately after the singing resetting key is operated.

A theoretical format for a new version which is different from the initial version shown in FIGS. 4 to 11 and is obtained by improving the initial version is explained with reference to FIGS. 15 to 59. The detail operation of the optical disk apparatus shown in FIG. 1 based on the theoretical format for the new version is explained after the theoretical format for the new version which is obtained by improving the initial version is explained.

FIG. 15 shows the structure of the theoretical format for the new version which is obtained by improving the initial version. That is, the data recording area 28 between the lead-in area 27 and the lead-out area 26 on the optical disk of FIG. 1 has a volume and file structure as shown in FIG. 15. The structure has been determined in conformity to specific logic format standards, such as micro UDF or ISO 9660. The data recording area 28 is physically divided into a plurality of sectors as described earlier. These physical sectors are assigned serial numbers. In the following explanation, a logical address means a logical sector number (LSN) as determined in micro UDF or ISO 9660. Like a physical sector, a logical sector contains 2048 bytes. The numbers (LSN) of logical sectors are assigned consecutively in ascending order as the physical sector number increments.

As shown in FIG. 15, the volume and file structure is a hierarchic structure and contains a volume and file structure area 270, a video manager (VMG) 271, at least one video title set (VTS) 272, and other recorded areas 273. These areas are partitioned at the boundaries between logical sectors. As with a conventional CD, a logical sector is defined as a set of 2048 bytes. Similarly, a logical block is defined as a set of 2048 bytes. Therefore, a single logical sector is defined as a single logical block.

The file structure area 270 corresponds to a management area determined in micro UDF or ISO 9660. According to the description in the management area, the video manager 271 is stored in the system ROM/RAM section 52. As explained with reference to FIG. 16, the information used to manage video title sets is written in the video manager 271, which is composed of a plurality of files 274, starting with file #0. In each video title set (VTS) 272, compressed video data, compressed audio data, compressed sub-picture data, and the playback information about these data items are stored as explained later. Each video title set is composed of a plurality of files 274. The number of video title sets 272 is limited to 99 maximum. Furthermore, the number of files 274 (from File #j to File #j+9) constituting each video title set is determined to be 10 maximum. These files are also partitioned at the boundaries between logical sectors.

In the other recorded areas 273, the information capable of using the aforementioned video title sets 272 is recorded. The other recorded areas 273 are not necessarily provided.

In the karaoke optical disk 10, karaoke with moving picture, that is, video, audio and sub-picture data containing lyric lines displayed as a sub-picture together with the accompaniment are stored in video title sets 272 as video object sets 282 to be reproduced as will be explained later. Therefore, in the case of karaoke, title sets 272 can be provided as the video title sets 272 classified by generations, by singers, or by genres. The relation between the classification of karaoke and the format is explained later in detail.

Figure 16:
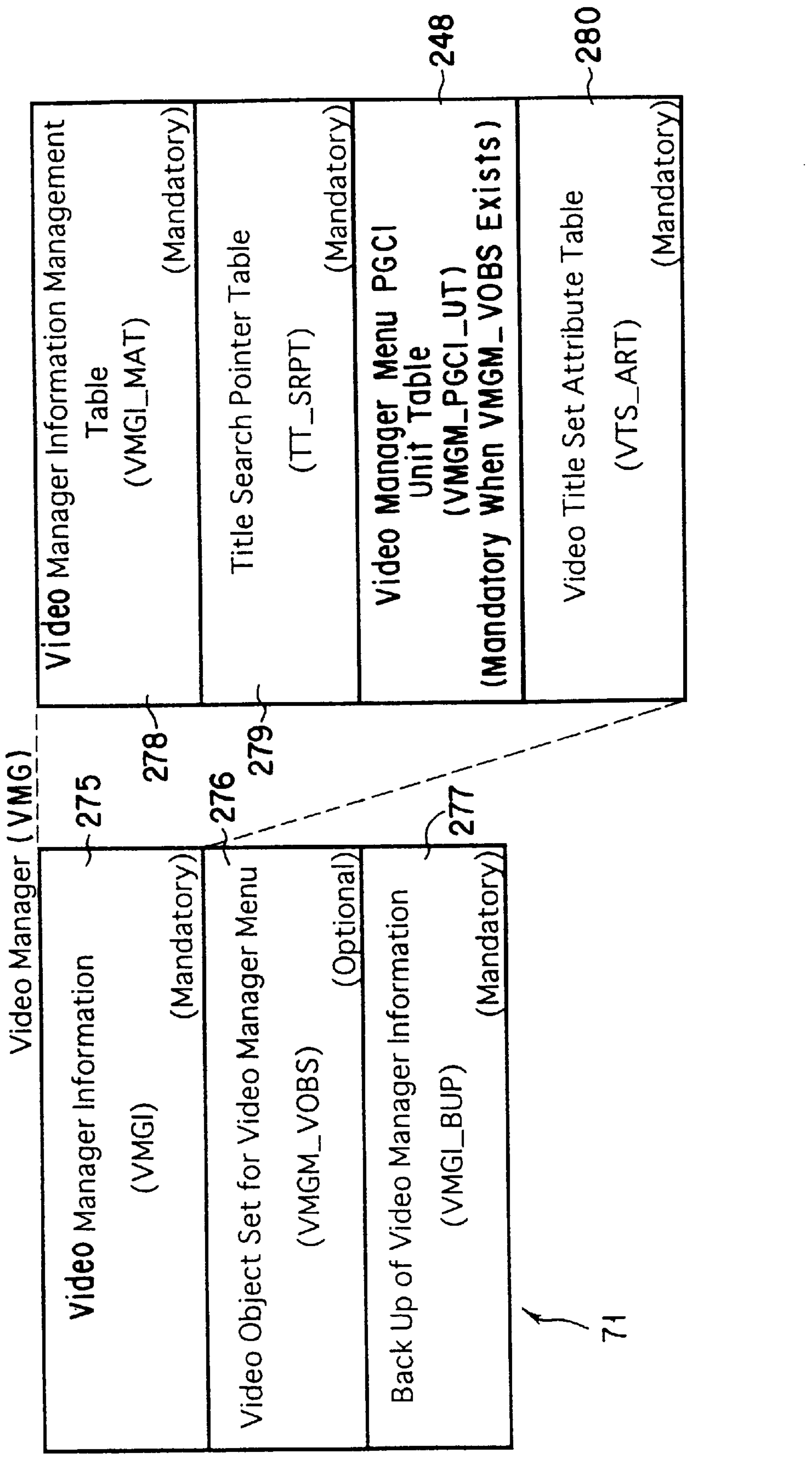
FIG. 16 shows the structure of the video manager of FIG. 15.

As shown in FIG. 16, the video manager 271 contains at least three items each corresponding to individual files 274. Specifically, the video manager 271 is made up of video manager information (VMGI) 275, a video object set (VMGM_VOBS) 276 for video manager menu, and backup (VMGI_BUP) 277 of video manager information. Here, the volume manager information (VMGI) 275 and the backup (VMGI_BUP) 277 of video manager information are determined to be indispensable items, and the video object set (VMGM_VOBS) 276 for video manager menu is determined to be an optional item. In the video object set (VMGM-VOBS) 276 for VMGM, the video data, audio data, and sup-picture data for a menu of the volumes of the optical disk managed by the video manager 271 are stored.

Like the case of video reproduction which will be explained later, the volume name of the optical disk and the explanation of audio and sub-picture accompanied by the display of the volume name are displayed by the video object set (VMGM_VOBS) 276 for VMGM and selectable items are displayed by the sub-picture. For example, information indicating that the optical disk contains karaoke data relating to collections of hit songs of a certain generation, that is, the volume names of collections of pops hit songs in the 1960's and images of the singers who produced hit songs in the 1960's are reproduced by use of video data by the video object set (VMGM_VOBS) 276 for VMGM, an introduction of the hit song is reproduced with audio, and the name of the hit song is displayed by the sub-picture. Further, the names of the singers who produced hit songs in the 1960's are displayed as selectable items and an inquiry about selection of one of the singers is made.

Figure 17:
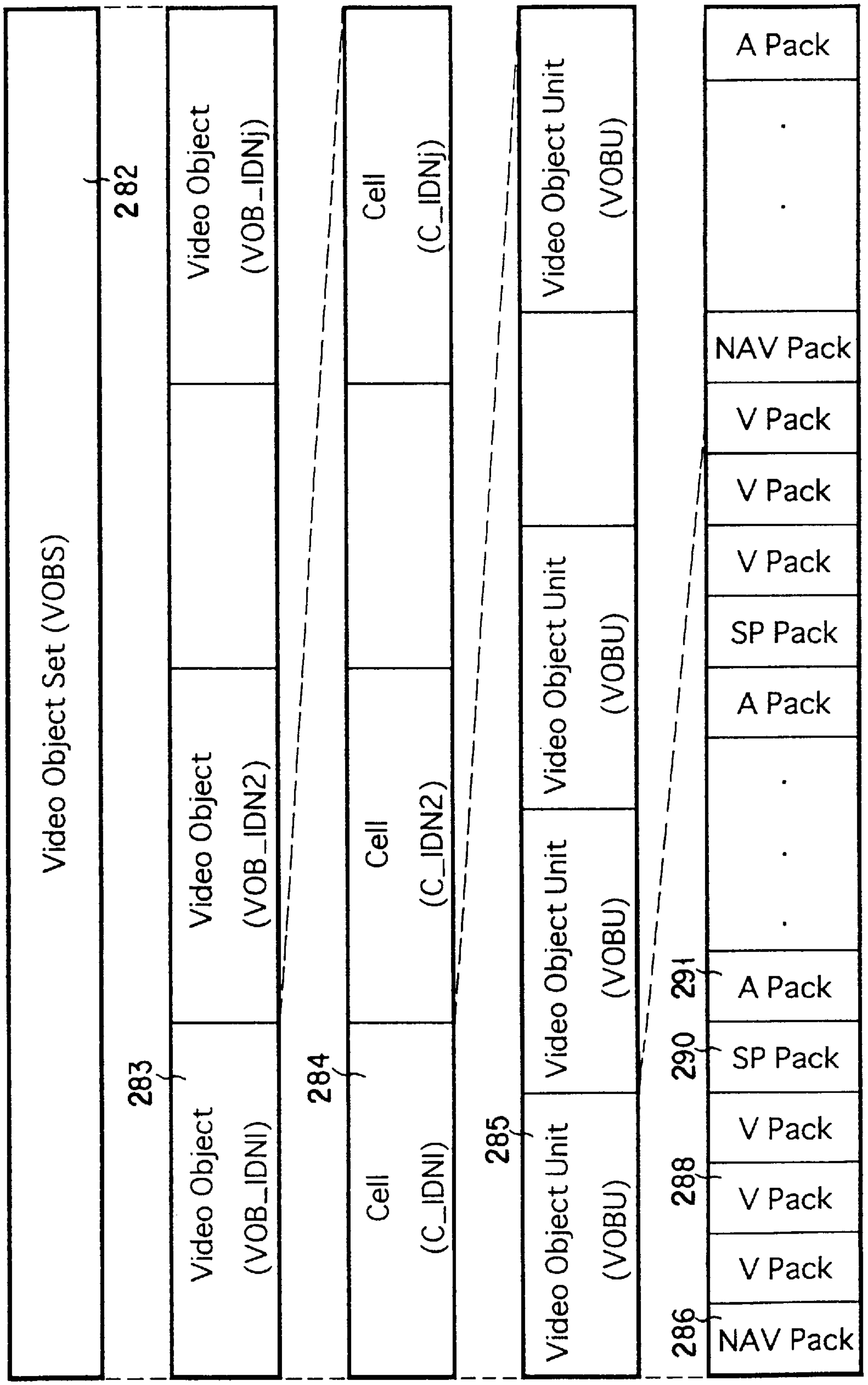
FIG. 17 shows an example of the structure of the video object set (VOBS) of FIG. 15.

Here, the structure of a video object set (VOBS) 82 will be described with reference to FIG. 17. FIG. 17 shows an example of a video object set (VOBS) 82. The video object set (VOBS) 282 comes in three types 276, 295, 296 for two menus and a title. Specifically, in the video object set (VOBS) 282, a video title set (VTS) 272 contains a video object set (VTSM_VOBS) 295 for a menu of video title sets and a video object set (VTSTT_VOBS) 296 for the titles of at least one video title set, as explained later. Each video object 282 set has the same structure except that their uses differ.

As shown in FIG. 17, a video object set (VOBS) 282 is defined as a set of one or more video objects (VOB). The video objects 283 in a video object set (VOBS) 282 are used for the same application. A video object set (VOBS) 282 for menus is usually made up of a single video object (VOB) 283 and stores the data used to display a plurality of menu screens. In contrast, a video object set (VTSTT_VOBS) 282 for title sets is usually composed of a plurality of video objects (VOB) 283.

The video object (VOB) 283 corresponds to video data of a collection of hit songs of a certain singer in a case wherein karaoke data in the collection of the hit songs in the 1960's is taken as an example. Further, menu data of the titles of the songs of the singer is stored in the menu video object set (VTSM_VOBS) 295 of the video title set 272 and the specific title of the song can be specified according to the display of the menu.

An identification number (IDN#j) is assigned to a video object (VOB) 283. By the identification number, the video object (VOB) 283 can be identified. A single video object (VOB) 283 is made up of one or more cells 284. Although a usual video stream is made up of a plurality of cells, a menu video stream, or a video object (VOB) 283 may be composed of one cell 284. A cell is likewise assigned an identification number (C_IDN#j). By the identification number (C_IDN#j), the cell 284 is identified.

As shown in FIG. 17, each cell 284 is composed of one or more video object units (VOBU) 285, normally a plurality of video object units (VOBU) 285. Here, a video object unit (VOBU) 285 is defined as a pack train having a single navigation pack (NV pack) 286 at its head. Specifically, a video object unit (VOBU) 285 is defined as a set of all the packs recorded, starting at a navigation pack 286 to immediately in front of the next navigation pack. The playback time of the video object unit (VOBU) corresponds to the playback time of the video data made up of one or more GOPs contained in the video object unit (VOBU). The playback time is determined to be 0.4 or more second and less than one second. In the MPEG standard, a single GOP is determined to be normally 0.5 second long and be compressed screen data for reproducing about 15 screens during that duration.

When a video object unit includes Karaoke video data as shown in FIG. 17, more than one GOP composed of video packs (V packs) 288, a sup-picture pack (SP pack) 290, and an audio pack (A pack) 291 all determined in the MPEG standard, are arranged to produce a video data stream. Regardless of the number of GOPs, a video object (VOBU) 283 is determined on the basis of the playback time of a GOP. The video object always has a navigation pack (NV pack) 286 at its head. Even when the playback data consists only of audio and/or sub-picture data, it will be constructed using the video object unit as a unit. Specifically, even if a video object unit is constructed only of audio packs, the audio packs to be reproduced within the playback time of the video object unit to which the audio data belongs will be stored in the video object unit, as with the video object of video data.

The video manager 271 will be explained with reference to FIG. 16. The video management information 275 placed at the head of the video manager 271 contains information on the video manager itself, the information used to search for titles, the information used to reproduce the video manager menu, and the information used to manage the video title sets (VTS) 272 such as the attribute information on video titles. The video management information contains four tables 278, 279, 280, 281 in the order shown in FIG. 16. Each of these tables 278, 279, 280 is aligned with the boundaries between logical sectors. A first table, a volume manger information management table (VMGI_MAT) 278, is a mandatory table, in which the size of the video manager 271, the start address of each piece of the information in the video manger 271, and the start address of and the attribute information about the video object set (VMGM_VOBS) 276 for a video manager menu are written. The attribute information includes the video attribute information, the audio attribute information, and the sub-picture attribute information. According to these pieces of attribute information, the modes of the decoders 58, 60, 62 are changed, thereby enabling the video object set (VMGM_VOBS) 276 to be reproduced in a suitable mode.

Further, a start address of the video title set contained in the volume of the optical disk 10 which can be selected according to the entry of a title number from the key operating and displaying section 4 of the apparatus is described in the title search pointer table (TT_SRPT) 279 which is the second table of the video manager 271.

The video manager menu PGCI unit table (VMGM_PGCI_UT) 248 which is the third table of the video manager 271 is provided as a mandatory item when the video object (VMGM_VOB) 276 for video manager menu is present. In the video object (VMGM_VOB) 276 for video manager menu, program chains corresponding to various languages are provided and information relating to the program chains for menu corresponding to the respective languages is described.

In a fourth table of the video manager 271, a video title set attribute table (VTS_ATRT) 280, the attribute information determined in the video title set (VTS) 272 in the volumes of the optical disk is written. Specifically, in this table, the following items are written as attribute information: the number of video title sets (VTS) 272, video title set (VTS) 272 numbers, video attributes, such as a video data compression scheme, audio stream attributes, such as an audio coding mode, and sub-picture attributes, such as the type of sup-picture display.

The details of the contents of the volume management information management table (VMGI_MAT) 278, video manager menu PGCI unit table (VMGM_PGCI_UT) 248, title search pointer table (TT_SRPT) 279, and video title set attribute table (VTS_ATRT) 280 will be described with reference to FIGS. 18 to 32.

As shown in FIG. 18, written in the volume management information management table (VMGI_MAT) 278 are an identifier (VMG_ID) for the video manager 271, the size of video management information in the number of logical blocks (a single logical block contains 2048 bytes, as explained earlier), the version number (VERN) related to the standard for the optical disk, commonly known as a digital versatile disk (digital multipurpose disk, hereinafter, referred to as a DVD), and the category (VMG_CAT) of the video manger 271.

In the category (VMG_CAT) of the video manager 271, a flag indicating whether or not the DVD video directory inhibits copying is written. Further written in the table (VMGI_MAT) 278 are a volume set identifier (VLMS_ID), the number of video title sets (VTS_Ns), the identifier for a provider supplying the data to be recorded on the disk (PVR_ID), the start address (VMGM_VOBS_SA) of the video object set (VMGM_VOBS) 276 for a video manager menu, the end address (VMGI_MAT_EA) of a volume manager information management table (VMGI_MAT) 278, and the start address (TT_SRPT_SA) of a title search pointer table (TT_SRPT) 279. If the video object set (VMGM_VOBS) 295 for the VMG menu is absent, "00000000h" will be written in its start address (VMGM_VOBS_SA). The end address (VMGI_MAT_EA) of VMGI_MAT 278 and the start address (TT_SRPT_SA) of TT_SRPT 279 are represented by the number of logical blocks, relative to the first logical block.

Furthermore, in the table 278, the start address (VMGM PGCI_UT_SA) of the video manager menu PGCI unit table (VMGM_PGCI_UT) 248 and the start address (VTS_ATRT_SA) of the attribute table (VTS_ATRT) of video title sets 272 (VTS) are represented by the number of bytes, relative to the first byte in the VMGI manager table (VMGI_MAT) 71, and the video attribute (VMGM_V_ATR) of the video manager menu (VMGM) video object set 276 is written as well. Further written in the table 278 are the number (VMGM_AST_Ns) of audio streams in the video manager menu (VMGM), the attributes (VMGM_AST_ATR) of audio streams in the video manager menu (VMGM), the number (VMGM_SPST_Ns) of sub-picture streams in the video manager menu (VMGM), and the attributes (VMGM_SPST_ATR) of sub-picture streams in the video manager menu (VMGM). If the video manager menu (VMGM) is absent, "0000000h" will be written in the video manager menu PGI unit table (VMGM_PGCI_UT).

Explanation of the structure shown in FIG. 16 will be resumed. In the title search pointer table (TT_SRPT) 279 of FIG. 16, as shown in FIG. 19, the title search pointer table information (TSPTI) is first written and then as many title search pointers (TT_SRP) for input numbers 1 to n (n !e 99) as are needed are written consecutively. When only the playback data for a single title, for example, only the video data for a single title, is stored in a volume of the optical disk, only a single title search pointer (TT_SRP) 293 is written in the table (TT_SRPT) 279.

The title search pointer table information (TSPTI) 292 contains the number of entry program chains (EN_PGC_Ns) and the end address (TT_SRPT_EA) of the title search pointer (TT-SRP) 293 as shown in FIG. 20. The address (TT_SRPT_EA) is represented by the number of bytes, relative to the first byte in the title search pointer table (TT_SRPT) 279. Furthermore, as shown in FIG. 22, each title search pointer (TT_SRP) contains the video title set number (VTSN), the program chain number (PGCN), and the start address (VTS_SA) of the video title set 272.

The contents of the title search pointer (TT_SRP) 293 specifies a video title set (VTS) 272 to be reproduced and a program chain (PGC) as well as a location in which the video title set 272 is to be stored. The start address (VTS_SA) of the video title set 272 is represented by the number of logical blocks in connection with the title set specified by the video title set number (VTSN).

Figure 22:
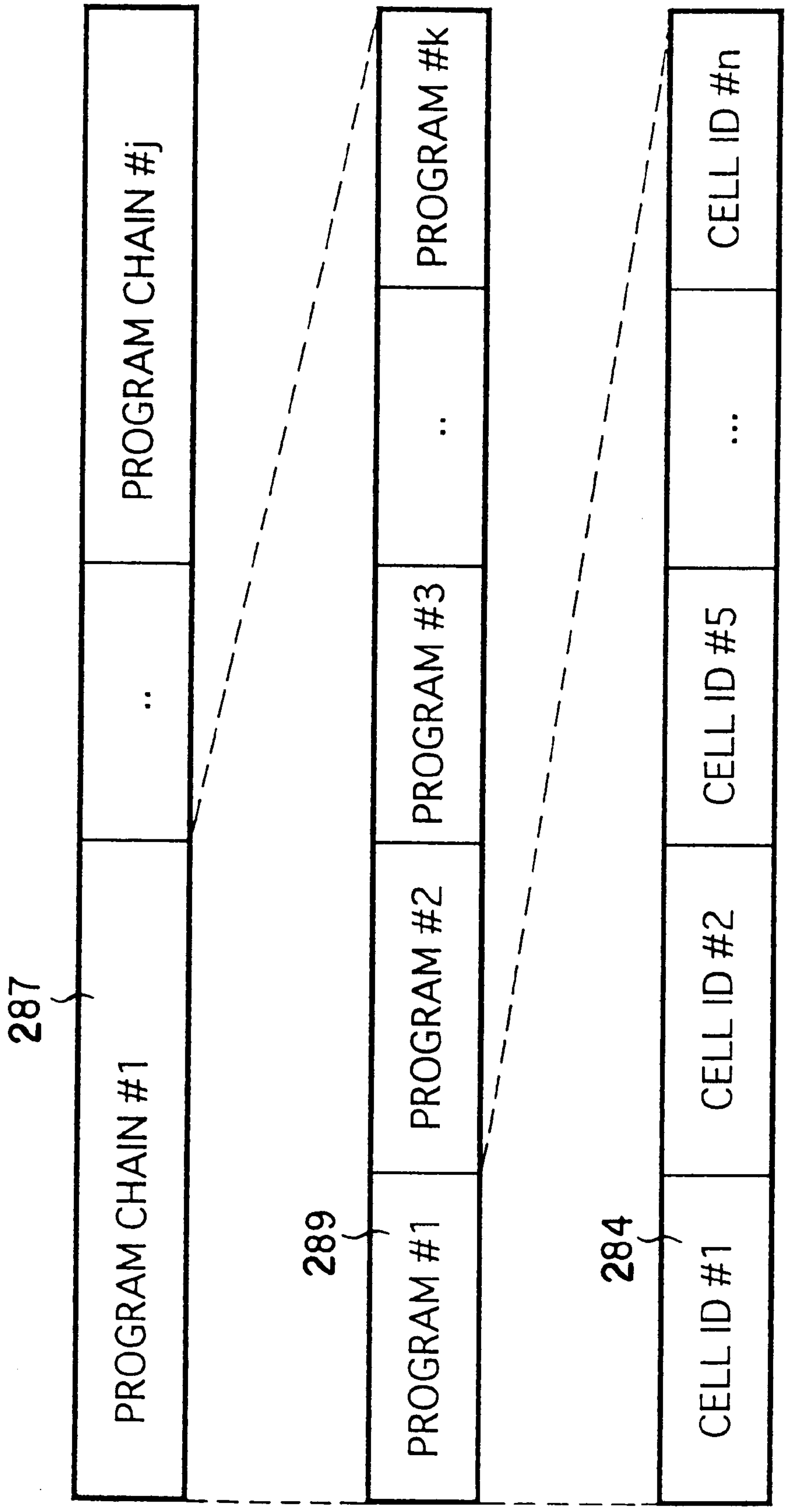
FIG. 22 is an explanatory diagram to help explain the structure of a program chain stored in a file.

Here, a program chain 287 is defined as a set of programs 289 that reproduce the story of a title as shown in FIG. 22. In the case of a program chain for a menu, still picture programs or moving picture programs are reproduced one as a page menu after another to complete a menu for a single title. In the case of a program chain for a title set, a program chain corresponds to a chapter in a story consisting of programs and the movie of a single title is completed by reproducing program chains consecutively. As shown in FIG. 22, each program 289 is defined as a set of aforementioned cells 284 arranged in the order in which they are to be reproduced. In the case of karaoke, if the title set 272 is a collection of hit songs in the 1960's, the program chain 287 is a set of titles of songs of a certain singer in the 1960's, that is, a collection of the programs 289 like the case of the video object 283. Therefore, a collection of hit songs in the 1960's can be specified by specifying the title set 272, a collection of karaoke songs of a certain singer in the 1960's can be specified by specifying the program chain 287, and the title of a concrete song can be specified by specifying the program 289.

Figures 23, 24, 25:
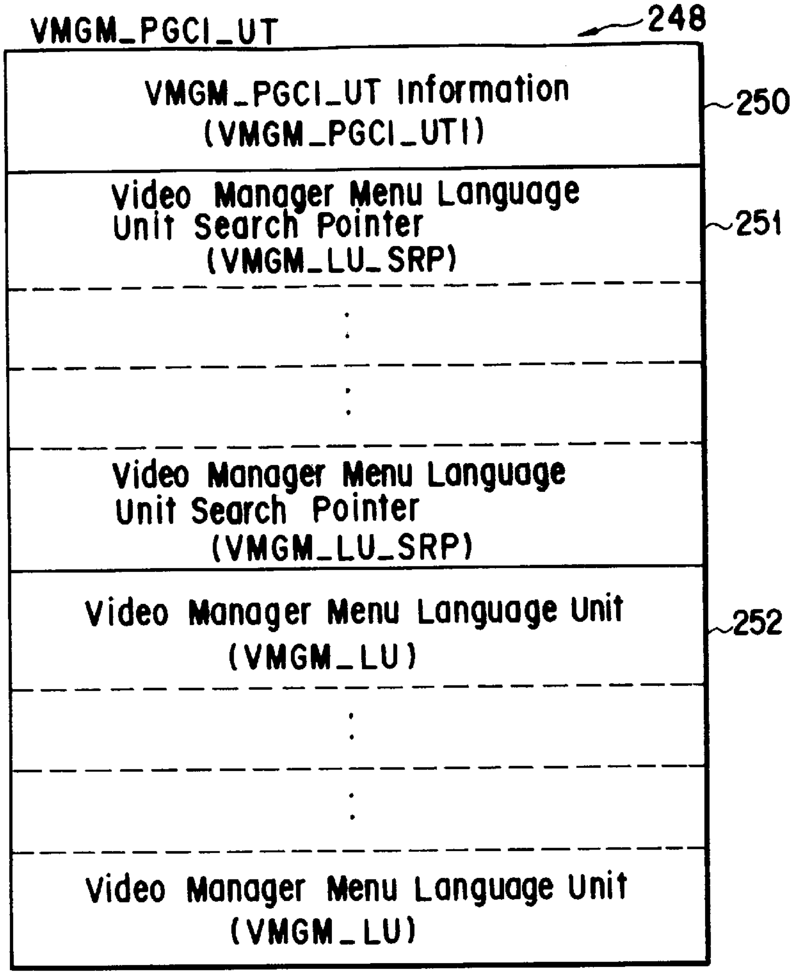
FIG. 23 shows the structure of a video manager menu PGCI unit table (VMGM_PGCI_UT) shown in FIG. 16.
FIG. 24 shows the contents and parameters of the VMGM_PGCI unit table information shown in FIG. 23.
FIG. 25 shows the contents and parameters of video manager menu language unit search pointer shown in FIG. 16.

In the video manager menu PGCI unit table (VMGM_PGCI_UT) 280 shown in FIG. 16, video manager menu PGCI unit table information (VMGM_PGCI_UTI) 250 is first described as shown in FIG. 23, then video manager menu language unit search pointers (VMGM_LU_SRP) 251 of a necessary number n corresponding to the number n of languages are successively described, and the video manager menu language unit (VMGM_LU) 252 searched for by the search pointer is described. In this case, it is supposed that the menu defined by the video manager menu language unit (VMGM_LU) must contain only one PGC.

In the video manager menu PGCI unit table information (VMGM_PGCI_UTI) 250, the number (VMGM_LU_Ns) of VMGM language units (VMGM_LU) and the end address (VMGM_PGCI_UT EA) of the VMGM_PGCI unit table (VMGM_PGCI_UT) 280 are described as shown in FIG. 24. In each of n video manager menu language unit search pointers (VMGM_LU_SRP) 251 prepared for respective languages, the language code (VMGM_LCD) of the video manager menu and the start address (VMGM_LU_SA) of the language unit (VMGM_LU) of the video manager menu (VMGM) are described as shown in FIG. 25. The end address (VMGM_PGCI_UT_EA) of the VMGM_PGCI_UT 280 and the start address (VMGM_LU_SA) of the VMGM_LU 252 are described by use of the logical block number from the head byte of the VMGM_PGCI unit table (VMGM_PGCI_UT) 280.

Figures 26, 27, 28:
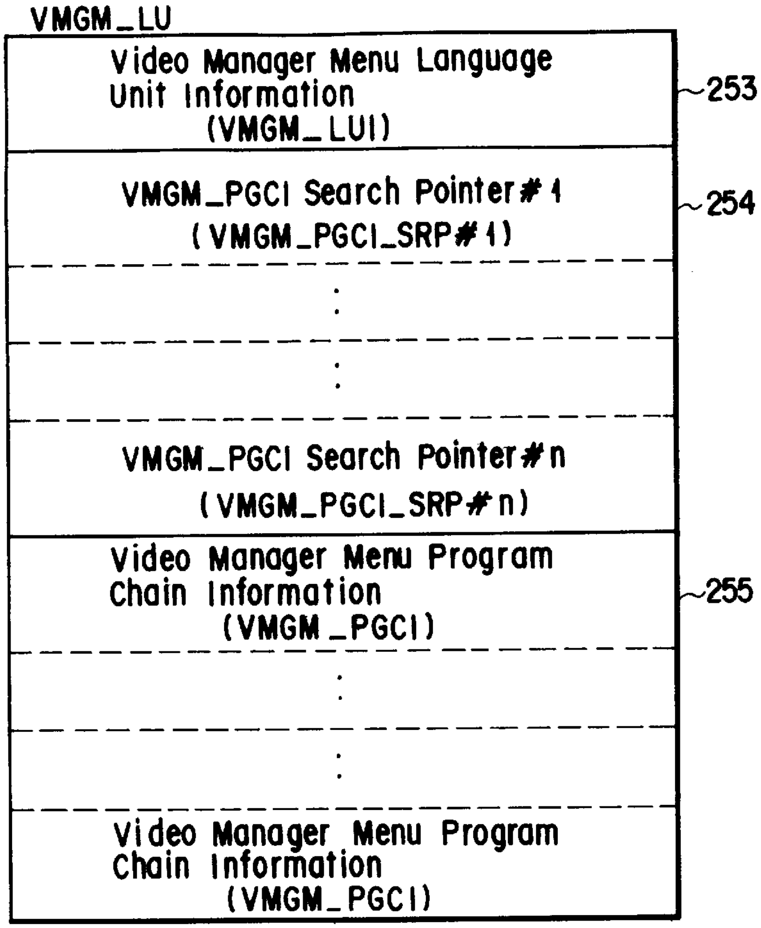
FIG. 26 shows the structure of a video manager menu language unit shown in FIG. 23.
FIG. 27 shows the contents and parameters of video manager menu language unit information shown in FIG. 26.
FIG. 28 shows the contents and parameters of video manager menu program chain information shown in FIG. 26.

In each of n VMGM language units (VMGM_LU) 252 prepared for the respective languages, the video manager menu language unit information (VMGM_LUI) 253 and VMGM_PGCI search pointers (VMGM_PGCI_SRP) of a number corresponding to the number of menu program chains are provided as shown in FIG. 26, and VMGM_PGC information items (VMGM_PGCI) 255 searched for by the search pointer and corresponding in number to the program chains for menu are provided.

In each language unit information (VMGM_LUI) 253, the number (VMGM_PGCI_Ns) of VMGM_PGCIs and the end address (VMGM_LUI_EA) of the language unit information (VMGM_LUI) are described as shown in FIG. 27. Further, in each VMGM_PGCI search pointer (VMGM_PGCI_SRP), the VMGM_PGC category (VMGM_PGC_CAT) and the start address (VMGM_PGCI_SA) of VMGM_PGCI are described as shown in FIG. 28. The end address (VMGM_LUI_EA) of VMGM_LUI and the start address (VMGM_PGCI_SA) of VMGM_PGCI are described by use of the relative logical block number from the head byte of VMGMLU. As the VMGM_PGC category (VMGM_PGC CAT), information indicating that the program chain is an entry program chain or title menu is described.

As shown in FIG. 16, the video title set attribute table (VTS_ATRT) 280 describing the attribute information on the video title set (VTS) 272 contains video title set attribute table information (VTS_ATRTI) 266, n video title set attribute search pointers (VTS_ATR_SRP) 267, and n video title set attributes (VTS_ARTR) 268, which are arranged in that order. The video title set attribute table information (VTS_ATRTI) 266 contains information on the table 280. In the video title set attribute search pointers (VTS_ATR_SRP) 267, description is made in the order corresponding to the title sets #1 to #n and similarly description is made of the pointers for searching for the video title set attributes (VTS_ATR) 268 written in the order corresponding to the title sets #1 to #n. In each of the video title set attributes (VTS_ATR) 268, the attribute of the corresponding title set (VTS) is written.

Figures 29, 30, 31, 32:
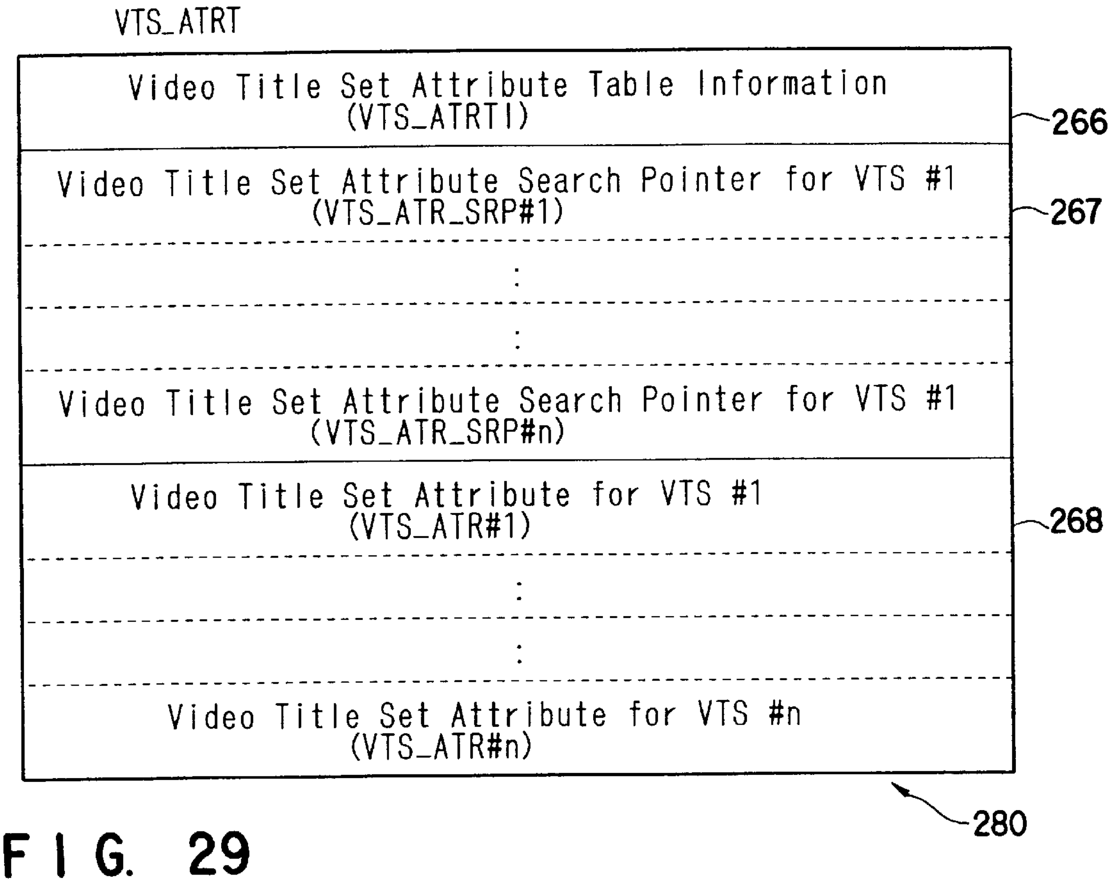
FIG. 29 shows the structure of a video title set attribute table shown in FIG. 16.
FIG. 30 shows the contents and parameters of video title set attribute table information shown in FIG. 29.
FIG. 31 shows the contents and parameters of video title set attribute search pointer shown in FIG. 29.
FIG. 32 shows the contents and parameters of video title set attribute shown in FIG. 29.

More specifically, the video title set attribute table information (VTS_ATRTI) 266 contains a parameter (VTS_Ns) for the number of video titles and a parameter (VTS_ATRT_EA) for the end address of the video title set attribute table (VTS_ART) 280 as shown in FIG. 30. As shown in FIG. 31, in each video title set attribute search pointer (VTS_ATR_SRP) 267, a parameter (VTS_ATR_SA) for the start address of the corresponding video title set attribute (VTS_ATR) 268 is written. As shown in FIG. 32, the video title set attribute (VTS_ATR) 268 contains a parameter (VTS_ATR_EA) for the end address of the video title set attribute (VTS_ATR) 268, a parameter (VTS_CAT) for the category of the corresponding video title set, and a parameter (VTS_ATRI) for attribute information on the corresponding video title set. Because the attribute information on the video title set contains the same contents of the attribute information on the video title set written in the video title set information management table (VTS_MAT), which will be explained later with reference to FIGS. 31 and 32, explanation of it will be omitted.

Now, the structure of the logic format of the video title set (VTS) 272 shown in FIG. 15 will be explained with reference to FIG. 31. In each video title set (VTS) 272, four items 294, 295, 296, 297 are written in the order shown in FIG. 33. Each video title set (VTS) 272 is made up of one or more video titles having common attributes. The video title set information (VTSI) contains the management information on the video titles 272, including information on playback of the video object set 296, information on playback of the title set menu (VTSM), and attribute information on the video object sets 272.

Each video title set (VTS) 272 includes the backup 297 of the video title set information (VTSI) 294. Between the video title set information (VTSI) 294 and the backup (VTSI_BUP) of the information, a video object set (VTSM_VOBS) 295 for video title set menus and a video object set (VTSTT_VOBS) 296 for video title set titles are arranged. Both of the video object sets (VTSM_VOBS and VTSTT_VOBS) have the structure shown in FIG. 17, as explained earlier.

The video title set information (VTSI) 294, the backup (VTSI_BUP) 297 of the information, and the video object set (VTSTT_VOBS) 296 for video title set titles are items indispensable to the video title sets 272. The video object set (VTSM_VOBS) 295 for video title set menus is an option provided as the need arises.

Figure 33:
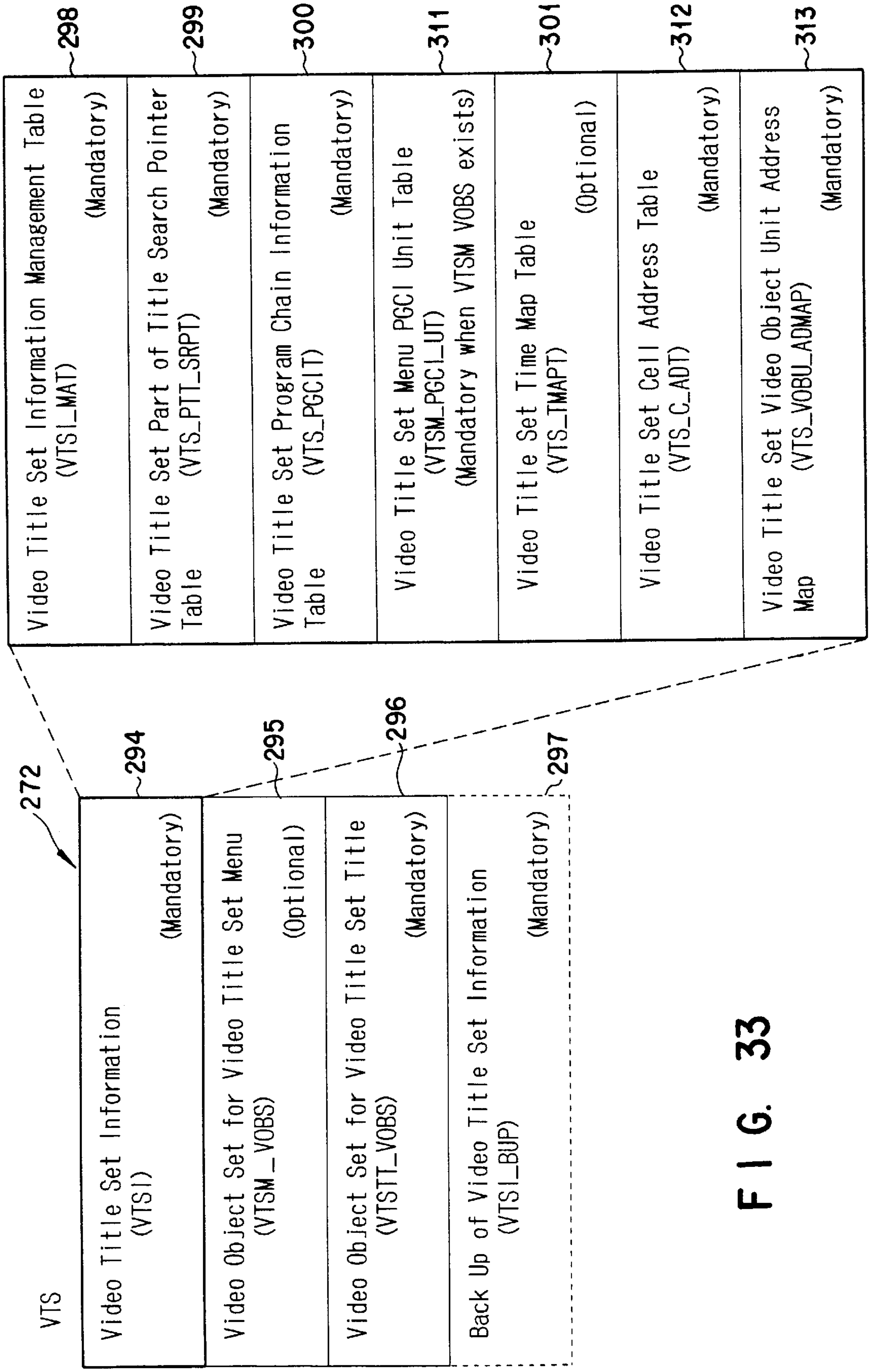
FIG. 33 shows the structure of the video title set shown in FIG. 16.

The video title set information (VTSI) 294 consists of seven tables 298, 299, 300, 301, 311, 312, 313 as shown in FIG. 33. These seven tables 298, 299, 300, 301, 311, 312, 313 are forced to align with the boundaries between logical sectors. The video title set information management table (VTSI_MAT) 298, a first table, is a mandatory table, in which the size of the video title set (VTS) 272, the start address of each piece of information in the video title set (VTS) 272, and the attributes of the video object sets (VOBS) 282 in the video title set (VTS) 272 are written.

The video title set part-of-title search pointer table (VTS_PTT_SRPT) 299, a second table, is mandatory table, in which part of the selectable video titles, that is, program chains (PGC) or programs (PG) contained in the selectable video title set 272, are written according to the number that the user has entered from the key/display section 4. Entering the desired one of the entry numbers listed in the pamphlet coming with the optical disk 10 from the key/display section 4, the user can watch the video, starting with the section in the story corresponding to the entered number. The part of the selectable video title can be arbitrarily determined by title suppliers.

The video title set program chain information table (VTS_PGCIT) 300, a third table, is a mandatory table, in which the VTS program chain information (VTS_PGCI), or information on VTS program chains, is written.

The video title set menu PGCI unit table (VTSM_PGCI_UT) 311, a fourth table, is a mandatory item, when the video object set (VTSM_VOBS) 295 for video title set menus is provided. In the table, information on program chains for reproducing the video title set menu (VTSM) provided for each language is written. By referring to the video title set menu PGCI unit table (VTSM_PGCI_UT) 311, a program chain for the specified language in the video object set (VTSM_VOBS) 295 can be acquired and reproduced as a menu.

The video title set time search map table (VTS_MAPT) 301, a fifth table, is an optional table provided as the need arises, in which information on the recording location of the video data in each program chain (PGC) in the title set 272 to which the map table (VTS_MAPT) 301 belongs is written for a specific period of time of playback display.

The video title set cell address table (VTS_C_ADT) 312, a sixth table, is a mandatory item, in which the address of each cell 284 constituting all the video objects 283 or the address of each cell piece constituting cells is written in the order in which the identification numbers of the video objects are arranged. Here, a cell piece is a piece constituting a cell. Cells undergo an interleaving process in cell pieces and are arranged in a video object 283.

The video object title set video object unit address map (VTS_VOBU_ADMAP) 313, a seventh table, is a mandatory item, in which the start addresses of all the video object units 285 in the video title set are written in the order of arrangement.

Next, the video title information manager table (VTSI_MAT) 298 and video title set program chain information table (VTS_PGCIT) 300 shown in FIG. 33 and a video title set menu PGI unit table (VTSMPGCI_UT) will be described with reference to FIGS. 34 to 50.

FIG. 34 shows the contents of the video title information manager table (VTSI_MAT) 298, in which the video title set identifier (VTS_ID), the size (VTS_SZ) of the video title set 272, the version number (VERN) of the DVD video specification, the category (VTS_CAT) of the video title set 272, and the end address (VTSI_MAT_EA) of the video title information manager table (VTSI_MAT) 298 are written in that order. In the category (VIS_CAT) of the video title set 272, the application field of the video title set 272 is written. If the application field is Karaoke, data to that effect will be written in the category.

Furthermore, in the table (VTSI_MAT) 298, the start address (VTSM_VOBS_SA) of the video object set part-of-title search pointer table (VTSM_VOBS) 295 for the VTS menu (VTSM) and the start address (VTSTT_VOB_SA) of the video object for the title in the video title set (VTS) are written. If the video object set (VTSM_BOBS) 295 for the VTS menu (VTSM) is absent, "00000000h" will be written in the start address (VTSM_VOBS_SA). The end address (VTSI_MAT_EA) of VTSI_MAT is expressed by the number of logical blocks, relative to the first byte in the video title set information management table (VTI_MAT) 294. The start address (VTSM_VOBS_SA) of VTSM_VOBS and the start address (VTSTT_VOB_SA) of VTSTT_VOB are expressed by logical blocks (RLBN) relative to the first logical block in the video title set (VTS) 272.

Furthermore, in the table (VTSI_MAT) 298, the start address (VTS_PTT_SRPT_SA) of the video title set information part-of-title search pointer table (VTS_PTT_SRPT) 299 is represented by the number of blocks, relative to the first byte in the video title set information (VTSI) 294. Furthermore, in the table (VTSI_MAT) 298, the start address (VTS_PGCIT_SA) of the video title set program chain information table (VTS_PGCIT) 300 and the start address (VTS_PGCI_UT_SA) of the PGCI unit table (VTS_PGCI_UT) 311 of video title set menus are represented by the number of blocks, relative to the first byte in the video title set information (VTSI) 294, and the start address (VTS_MAPT_SA) of the time search map table (VTS_MAPT) 301 in the video title set (VTS) is represented by sectors, relative to the first logical sector in the video title set (VTS) 272. Similarly, the VTS address table (VTS_C_ADT) 312 and the address map (VTS_VOBU_ADMAP) 313 for VTS_VOBU are written in logical sectors, relative to the first logical sector in the video title set (VTS) 272.

Written in the table (VTSI_MAT) 298 are the video attribute (VTSM_V_ATR) of the video object set (VTSM_VOBS) 295 for the video title set menu (VTSM) in the video title set (VTS) 272, the number of audio streams (VTSM_AST_Ns), the attributes (VTSM_AST_ATR) of the audio streams, the number of sub-picture streams (VTSM_SPST_Ns), and the attributes (VTSM_SPST_ATR) of the sub-picture streams. Similarly, further written in the table (VTSI_MAT) 298 are the video attribute (VTS_V_ATR) of the video object set (VTSM_VOBS) 296 for the video title (VTSTT) for the video title (VTS) in the video title set (VTS) 272, the number of audio streams (VTS_AST_Ns), the attributes (VTS_AST_ATR) of the audio streams, the number of sub-picture streams (VTS_SPST_Ns), and the attributes (VTS_SPST_ATR) of the sub-picture streams. Additionally, the attribute (VTS_MU_AST_ATR) of the multichannel audio stream in the video title set (VTS) is written in the table (VTSI_MAT) 298.

A maximum of eight streams are prepared for the audio stream, and a maximum of 32 streams are prepared for the sub-picture stream. The attribute for each stream is described. In the sub-picture stream attribute (VTS_SPST_ATR), information indicating that the type of the sub-picture is a language or not is described. If the category (VTS_CAT) of the video title set 272 is karaoke, streams of lyric lines of various languages such as English, Japanese or other language can be prepared as the sub-picture stream. Generally, if the category (VTS_CAT) is karaoke, information indicating that the type of the sub-picture is a language is described in the sub-picture stream attribute (VTS_SPST_ATR).

Next, the audio stream attribute is explained with reference to FIG. 35. In the audio stream attribute (VTSM_AST_ATR) of the video object set (VTSM_VOBS) 295 for VTSM and the audio stream attribute (VTS_AST_ATR) of the video object set (VTST_VOBS) 296 for the video title set title (VTSTT), almost the same attribute information as the audio stream attribute (VMGM_AST_ATR) of the video object (VMGM_VOBS) for the video manager menu is written. Specifically, in the attribute (VTSM_AST_ATR) of the audio stream in the VTS menu video object set (VTSM_VOBS) 295, as shown in FIG. 35, bit number b63 to bit number b48 are allocated to the audio coding mode, reservation, audio type, audio application ID, quantization, sampling frequency, reservation, and the number of audio channels, and bit number b47 to bit number b0 are left empty for reservation for later use. In the attribute (VTS_AST_ATR) for the audio stream for the video title set title (VTST), as shown in FIG. 35, bit number b63 to bit number b48 are allocated to the audio coding mode, expansion of multichannel, audio type, audio application ID, quantization, sampling frequency, reservation, and the number of audio channels, and bit number b47 to bit number b40 and bit number b39 to bit number b32 are allocated to specific codes; bit number b31 to bit number b24 are for reservation for specific codes; bit number b23 to bit number b8 are left empty for reservation for later use; and bit number b8 to b0 are allocated to application information. Here, if the VTS menu video object set (VTSM_VOBS) 295 is absent, or if no audio stream is present in the video object set, "0" will be written in each bit, starting at bit number b63 down to bit number b0.

In both of the attributes (VTSM_AST_ATR, VTS_AST_ATR) of the audio streams for VTSM and VTST, bit numbers b63, b62, b61 are allocated to the audio coding mode. When "000" is written for the audio coding mode, this means that the audio data has been coded according to Dolby AC-3 (a trademark of Dolby Laboratories Licensing Corporation). When "010" is written for the audio coding mode, this means that the audio data is compressed without any expanded bit stream under MPEG-1 or MPEG-2. When "011" is written for the audio coding mode, this means that the audio data is compressed with an expanded bit stream under MPEG-2. When "100" is written for the audio coding mode, this means that the audio data is coded by linear PCM. For the audio data, the other numbers are for reservation for later use.

At a frame rate (which is written in VTSM_V_ATR and VTS_V_ATR) at which a single frame is drawn at a horizontal frequency of 60 Hz using 525 scanning lines, in the video data attribute, Dolby AC-3 ("000" in bit numbers b63, b62, b61) or linear PCM ("100" in bit numbers b63, b62, b61) is to be set. At a frame rate (which is written in VTSM_V_ATR and VTS_V_ATR) at which a single frame is drawn at a horizontal frequency of 50 Hz using 625 scanning lines, in the video data attribute, MPEG-1 or MPEG-2 ("010" or "011" in bit numbers b63, b62, b61) or linear PCM ("100" in bit numbers b63, b62, b61) is to be set. In the audio coding mode of the VTST audio stream attribute (VTS_AST_ATR), expansion of multichannel is written in bit number b60. When bit number b60 contains "0", this means that the multichannel audio stream attribute (VTS_MU_AST_ATR) of VTS related to audio streams is invalid. When bit number b60 contains "1", this means linking to the multichannel audio stream attribute (VTS_MU_AST_ATR) of VTS related to audio streams.

The audio type is written in bit numbers b59 and b58. When the audio type is not specified, "00" will be written in these bit numbers. When a language, or speech, is specified, "01" will be written in these bit numbers. The other numbers are for reservation. The ID of an audio application field is written in bit numbers b57 and b56. When the ID is not specified, "00" will be written in these bit numbers; when karaoke is specified, "01" is written in these bit numbers; when surround is specified, "10" is written in these bit numbers; and the other numbers are for reservation.

The quantization of audio data is written in bit numbers b55 and b54. When bit numbers b55, b54 contain "00", this means the audio data quantized in 16 bits; when bit numbers b55, b54 contain "01", this means the audio data quantized in 20 bits; when bit numbers b55, b54 contain "10", this means the audio data quantized in 24 bits; and when bit numbers b55, b54 contain "11", this means that the quantization is not specified. Here, when the audio coding mode is set to linear PCM ("100" in bit numbers b63, b62, b61), no specification of quantization ("11" in bit numbers b55, b54) is written. The audio data sampling frequency Fs is written in bit numbers b53 and b52. When the sampling frequency Fs is 48 kHz, "00" is written in these bit numbers; when the sampling frequency Fs is 96 kHz, "01" is written in these bit numbers; and the other numbers are for reservation.

The number of audio channels is written in bit numbers b66 to b64. When bit numbers b50, b49, 48 contain "000", this means a single channel (monaural); when bit numbers b50, b49, 48 contain "001", this means two channels (stereo); when bit numbers b50, b49, 48 contain "010", this means three channels; when bit numbers b50, b49, 48 contain "011", this means four channels; when bit numbers b50, b49, 48 contain "100", this means five channels; when bit numbers b50, b49, 48 contain "101", this means six channels; when bit numbers b50, b49, 48 contain "110", this means seven channels; and when bit numbers b50, b49, 48 contain "111", this means eight channels.

Specific codes are to be written in b47 to b40 and b39 to b32. When the type of audio stream is language, or speech, the code for the language determined in ISO-639 is written in these bit locations in the form of a language symbol. When the type of audio stream is not language or speech, the locations are for reservation.

The number (VTS_AST_Ns) of VTS audio streams is set in the range of 0 to 8. Thus, eight VTS audio stream attributes (VTS_AST_ATR) are prepared in accordance with the number of streams that can be set. Specifically, areas for the VTS audio stream attributes (VTS_AST_Ns) of VTS audio stream #0 to VTS audio stream #7 are provided. When the number of VTS audio streams is less than 8 and some attributes have no corresponding audio streams, the VTS audio stream attributes (VTS_AST_Ns) corresponding to the absent audio streams shown in FIG. 35 have "0" in all bits.

The audio application field from the bit number b7 to the bit number b0 is used as a reservation area which is not particularly specified, but if "01" is described in the bit numbers b73 and b72 and it is clear that ID of the audio application field is karaoke, the number of channels is limited to a maximum number of five channels and the channel assignment mode is described. The channel assignment mode is different for respective coding modes (AC_3, MPEG-1, MPEG-2, linear PCM) described in the bit numbers b63, b62, b61 and the assignment is determined for each assignment mode. Further, in the audio application field, information indicating that it is an audio stream containing introduction by a master of ceremonies or not, or information indicating solo or duet is described.

In the attribute (VTS_MU_AST_ATR) of the multichannel audio stream of the video title set (VTS), the attributes of multichannel audio stream #0 to multichannel audio stream #7 are written. In each multichannel audio stream attribute (VTS_MU_AST_ATR), the contents (e.g., karaoke or surround) of the audio channel, an audio mixing scheme, etc are written.

The VTS program chain information table (VTS_PGCIT) 300 of FIG. 33 has a structure as shown in FIG. 36. In the information table (VTS_PGCIT) 300, information (VTS-PGCIT) on the VTS program chains (VTS_PGC) is written, the first item of which is information (VTS_PGCIT_I) 302 on the information table (VTS_PGCIT) 300 of VTS program chains (VTS_PGC). In the information table (VTS_PGCIT) 300, the information (VTS_PGCIT_I) 302 is followed by as many VTS_PGCI search pointers (VTS_PGCIT_SRP) 303 used to search for VTS program chains (VTS_PGC) as the number (from #1 to #n) of VTS program chains in the information table (VTS_PGCIT) 300. At the end of the table, there are provided as many pieces of information (VTS_PGCI) 304 on the respective VTS program chains (VTS_PGC) as the number (from #1 to #n) of VTS program chains (VTS_PGC).

The information (VTS_PGCIT_I) 302 in the VTS program chain information table (VTS_PGCIT) 300, as shown in FIG. 37, contains the number (VTS_PGC_Ns) of VTS program chains (VTS_PGC) and the end address (VTS_PGCIT_EA) of the table information (VTS_PGCIT_I) 302 expressed by the number of bytes, relative to the first byte of the information table (VTS_PGCIT) 300.

Furthermore, as shown in FIG. 38, the VTS_PGCIT search pointer (VTS_PGCIT_SRP) 303 contains the category (VTS_PGC_CAT) of the program chains (VTS_PGC) in the video title set (VTS) 272 and the start address (VTS_PGCI_SA) of the VTS_PGC information (VTS_PGCI) expressed by the number of bytes, relative to the first byte of the VTS_PGC information table (VTS_PGCIT) 300. Here, the VTS_PGC category (VTS_PGC_CAT) contains, for example, data indicating whether an entry program chain (Entry PGC) is the first one to be reproduced or the type of the application field of program chains. Usually, an entry program chain (PGC) is written before program chains (PGC) that are not entry program chains (PGC). Additionally, Karaoke has been written as the type of the application field of the program claims.

The PGC information (VTS_PGCI) 304 in the video title set contains four items as shown in FIG. 39. In the PGC information (VTS_PGCI) 304, program chain general information (PGC_GI) 305, a mandatory item, is first arranged, followed by at least three items 306, 307, 308, that are made mandatory only when there is an video object. Specifically, contained as the three items in the PGC information (VTS_PGCI) 304 are a program chain program map (PGC_PGMAP) 306, a cell playback information table (C_PBIT) 307, and a cell position information table (C_POSIT) 308.

As shown in FIG. 40, the program chain general information (PGC_GI) 305 contains the category (PGCI_CAT) of program chains (PGC), the contents (PGC_CNT) of program chains (PGC), and the playback time (PGC_PB_TIME) of program chains (PGC). Written in the category (PGCI_CAT) of PGC are whether the PGC can be copied or not and whether the programs in the PGC are played back continuously or at random and the type of the application field of program chains. If the application field of the program chains is Karaoke, data indicating Karaoke will be written as the type.

The contents (PGC_CNT) of PGC contain the description of the program chain structure, that is, the number of programs, the number of cells, etc. The playback time (PGC_PB_TIME) of PGC contains the total playback time of the programs in the PGC. The playback time is the time required to continuously play back the programs in the PGC, regardless of the playback procedure.

Furthermore, the program chain general information (PGC_GI) 305 contains PGC sub-picture stream control (PGC_SPST_CTL), PGC audio stream control (PGC_AST_CTL), and PGC sub-picture pallet (PGC_SP_PLT). The PGC sub-picture stream control (PGC_SPST_CTL) contains the number of sub-pictures usable in the PGC. The PGC audio stream control (PGC_AST_CTL) likewise contains the number of audio streams usable in the PGC. The PGC sub-picture pallet (PGC_SP PLT) contains a set of a specific number of color pallets used in all of the sub-picture streams in the PGC.

Furthermore, the PGC general information (PGC_GI) 305 contains the start address (PGC_PGMAP_SA_SA) of the PGC program map (PGC_PGMAP_SA), the start address (C_PBIT_SA) of the cell playback information table (C_PBIT) 307 and the start address (C_POSIT_SA) of the cell position information table (C_POSIT) 308. Both of the start addresses (C_PBIT_SA and C_POSIT SA) are represented by the number of logical blocks, relative to the first byte in the VTS_PGC information (VTS_PGCI).

The program chain program map (PGC_PGMAP) 306 is a map showing the arrangement of the programs in the PGC of FIG. 41. In the map (PGC_PGMAP) 306, the entry cell numbers (ECELLN), the start cell numbers of the individual programs, are written in ascending order as shown in FIGS. 41 and 42. In addition, program numbers are allocated, starting at 1, in the order in which the entry cell numbers are written. Consequently, the first entry number in the map (PGC_PGMAP) 306 must be #1.

The cell playback information table (C_PBIT) 307 defines the order in which the cells in the PGC are played back. In the cell playback information table (C_PBIT) 307, pieces of the cell playback information (C_PBIT) are written consecutively as shown in FIG. 43. Basically, cells are played back in the order of cell number. The cell playback information (C_PBIT) contains a cell category (C_CAT) as playback information (P_PBI) as shown in FIG. 42. Written in the cell category (C_CAT) are a cell block mode indicating whether the cell is one in the block and if it is, whether the cell is the first one, a cell block type indicating whether the cell is not part of the block or is one in an angle block, and an STC discontinuity flag indicating whether the system time clock (STC) must be set again. Here, a cell block is defined as a set of cells with a specific angle. The change of the angle is realized by changing the cell block. Taking baseball as example, the changing from an angle block of shooting scenes from the infield to an angle block of shooting scenes from the outfield corresponds to the change of the angle.

Further written in the cell category (C_CAT) are a cell playback mode indicating whether the contents of the cell are played back continuously or made still at one video object unit (VOBU) to another in the cell, and cell navigation control indicating whether the picture is made still after the playback of the cell or indicating the rest time.

As shown in FIG. 42, the playback information (P_PBI) in the cell playback information table (C_PBIT) 307 contains the cell playback time (C_PBTM) representing the total playback time of the PGC. When the PGC has an angle cell block, the playback time of the angle cell number 1 represents the playback time of the angle block, Further written in the cell playback information table (C_PBIT) 307 are the start address (C_FVOBU_SA) of the first video object unit (VOBU) 285 in the cell expressed by the number of logical blocks, relative to the first logical block in the video object unit (VOBU) 285 in which the cell is recorded and the start address (C_LVOBU_SA) of the end video object unit (VOBU) 285 in the cell expressed by the number of logical blocks, relative to the first logical block in the video object unit (VOBU) 285 in which the cell is recorded.

The cell position information table (C_POSI) 308 specifies the identification numbers (VOB_ID) of the video objects (VOB) in the cell used in the PGC and the cell identification number (C_ID). In the cell position information table (C_POSI), pieces of cell position information (C_POSI) corresponding to the cell numbers written in the cell playback information table (C_PBIT) 307 as shown in FIG. 43 are written in the same order as in the cell playback information table (C_PBIT). The cell position information (C_POSI) contains the identification numbers (C_VOB_IDN) of the video object units (VOBS) 285 in the cell and the cell identification number (C_IDN) as shown in FIG. 46.

Further, the structure of the video title set PGCI unit table (VTSM_PGCI_UT) 311 shown in FIG. 33 is explained with reference to FIGS. 47 to 52. The video title set PGCI unit table (VTSM_PGCI_UT) 311 has substantially the same structure as the VMGM_PGCI unit table 280 shown in FIG. 23. That is, in the VMGM_PGCI unit table (VTSM_PGCI_UT) 311, VTS menu PGCI unit table information (VTSM_PGCI_UTI) 350 is first described as shown in FIG. 47, then VTS menu language unit search pointers (VMGM_LU_SRP) 351 of a necessary number n corresponding to the number n of languages are successively described, and the VTS menu language unit (VTSM_LU) 352 searched for by the search pointer is described.

Figures 47, 48, 49:
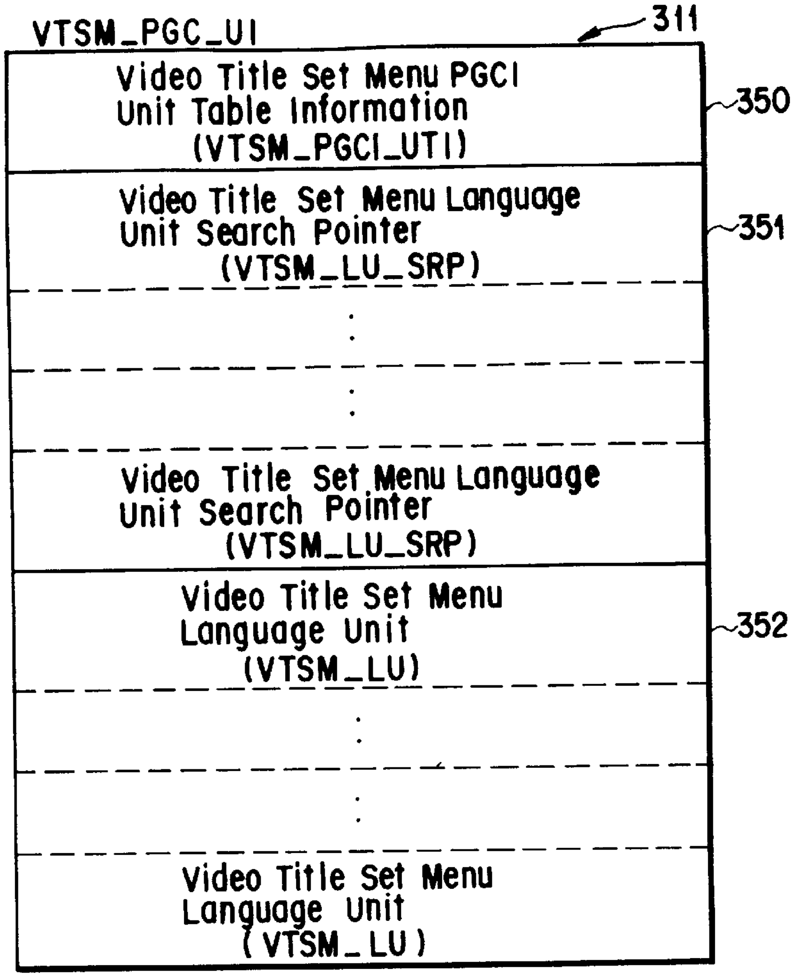
FIG. 47 shows the structure of a video title set menu PGC unit table shown in FIG. 33.
FIG. 48 shows the contents and parameters of video title set PGCI unit table information shown in FIG. 47.
FIG. 49 shows the contents and parameters of a video title set language search pointer shown in FIG. 47.

In the VTS menu PGCI unit table information (VTSM_PGCI_UTI) 350, the number (VTSM_LU_Ns) of VTSM language units (VTSM_LU) and the end address (VTSM PGCI_UT_EA) of the VTSM_PGCI unit table (VMGM_PGCI_UT) 311 are described as shown in FIG. 48. In each of n video manager menu language unit search pointers (VTSM_LU_SRP) 351 prepared for respective languages, the language code (VTSM_LCD) of the VTS menu and the start address (VTSM_LU_SA) of the VTS menu (VTSM) language unit (VTSM_LU) 252 are described as shown in FIG. 47. The end address (VTSM_PGCI_UT_EA) of VTSM_PGCI_UT 280 and the start address (VTSM_LU_SA) of VTSM_LU 352 are described by use of the logical block number from the first block of the VTSM_PGCI unit table (VTSM_PGCI_UT) 311.

Figures 50, 51, 52:
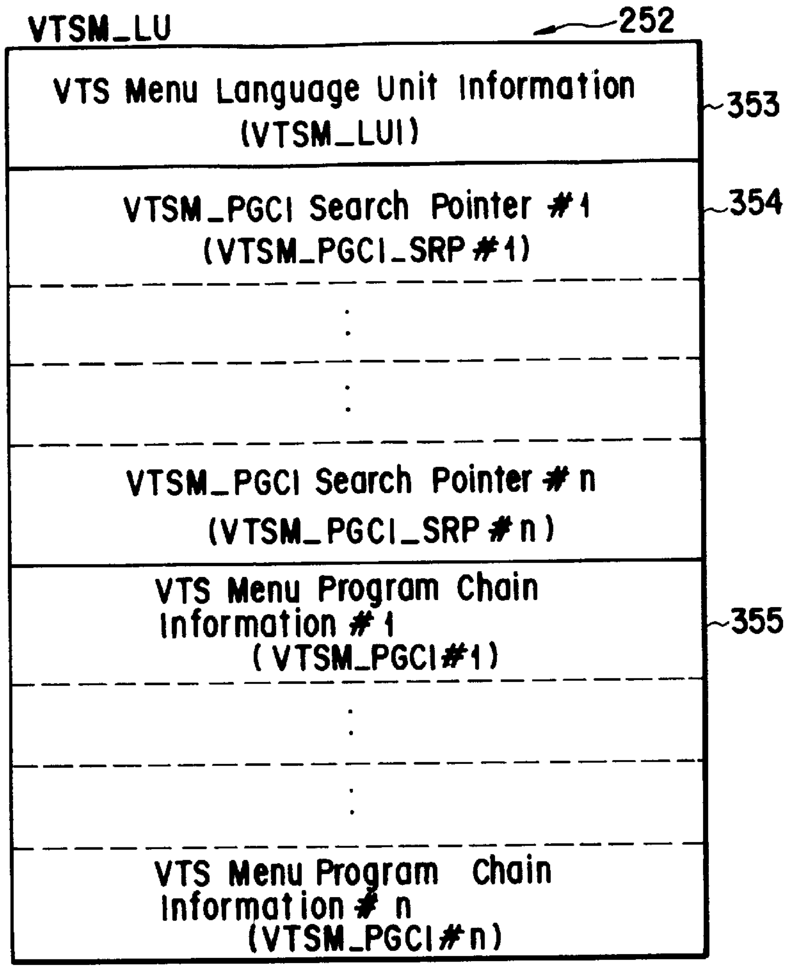
FIG. 50 shows the structure of a video title set language unit shown in FIG. 47.
FIG. 51 shows the contents and parameters of video title set menu language unit information shown in FIG. 50.
FIG. 52 shows the contents and parameters of a video title set PGCI search pointer shown in FIG. 50.

In each of n VTSM language units (VTSM_LU) 352 prepared for respective languages, VTSM menu language unit information (VTSM_LUI) 353 and VTSM_PGCI search pointers (VTSM_PGCI_SRP) 354 of a number corresponding to the number of menu program chains are provided as shown in FIG. 50, and VTSM_PGC information items (VTSM_PGCI) 355 searched for by the search pointers and corresponding in number to the menu program chains are provided as shown in FIG. 50.

In each language unit information (VTSM_LUI) 353, the number (VMGM_PGCI_Ns) of VMGM_PGCIs and the end address (VTSM_LUI_EA) of the language unit information (VTSM_LUI) are described as shown in FIG. 51. Further, in the VTSM_PGCI search pointer (VTSM_PGCI_SRP), the VTSM_PGC category (VTSM_PGC_CAT) and the start address (VTSM_PGCI_SA) of VTSM_PGCI are described as shown in FIG. 52. The end address (VTSM_LUI_EA) of VTSM_LUI and the start address (VTSM_PGCI SA) of VTSM_PGCI are described by the relative logical block number from the head byte of VTSM_LU. As the VTSM_PGC category (VTSM_PGC_CAT), information indicating that the program chain is an entry program chain or title menu is described.

Figure 53:
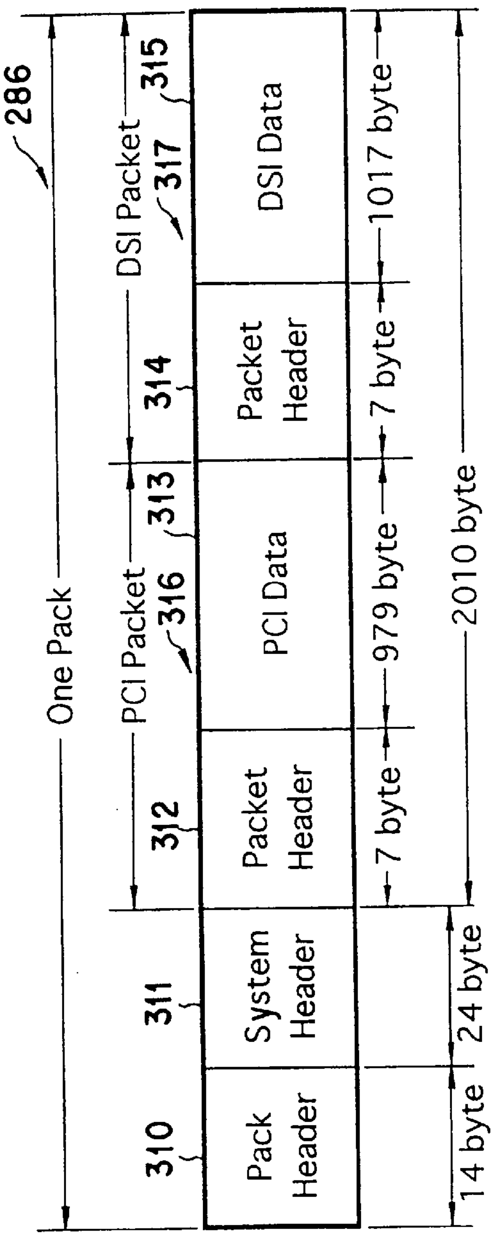
FIG. 53 shows the structure of the navigation pack of FIG. 17.

As explained with reference to FIG. 17, a cell 284 is a set of video object units (VOBU) 285. A video object unit (VOBU) 285 is defined as a pack train starting with a navigation (NV) pack 286. Therefore, the start address (C_FVOBU_SA) of the first video object unit (VOBU) 285 in a cell 284 is the start address of the NV pack 286. As shown in FIG. 53, the NV pack 286 consists of a pack header 310, a system header 311, and two packets of navigation data—a presentation control information (PCI) packet 116 and a data search information (DSI) packet 117. As many bytes as shown in FIG. 53 are allocated to the respective sections so that one pack may contain 2048 bytes corresponding to one logical sector. The NV pack is placed immediately in front of the video pack containing the first data item in the group of pictures (GOP). Even when the object unit 285 contains no video pack, an NV pack is placed at the head of the object unit containing audio packs or/and sub-picture packs. As with an object unit containing video packs, even with an object unit containing no video pack, the playback time of the object unit is determined on the basis of the unit in which video is reproduced.

Here, GOP is determined in the MPEG standard and is defined as a data train constituting a plurality of screens as explained earlier. Specifically, GOP corresponds to compressed data. Expanding the compressed data enables the reproduction of a plurality of frames of image data to reproduce moving pictures. The pack header 310 and system header 311 are defined in the MPEG 2 system layer. The pack header 310 contains a pack start code, a system clock reference (SCR), and a multiplex rate. The system header 311 contains a bit rate and a stream ID. The packet header 112, 114 of each of the PCI packet 116 and DSI packet 117 contains a packet start code, a packet length, and a stream ID as determined in the MPEG2 system layer.

Figure 54:
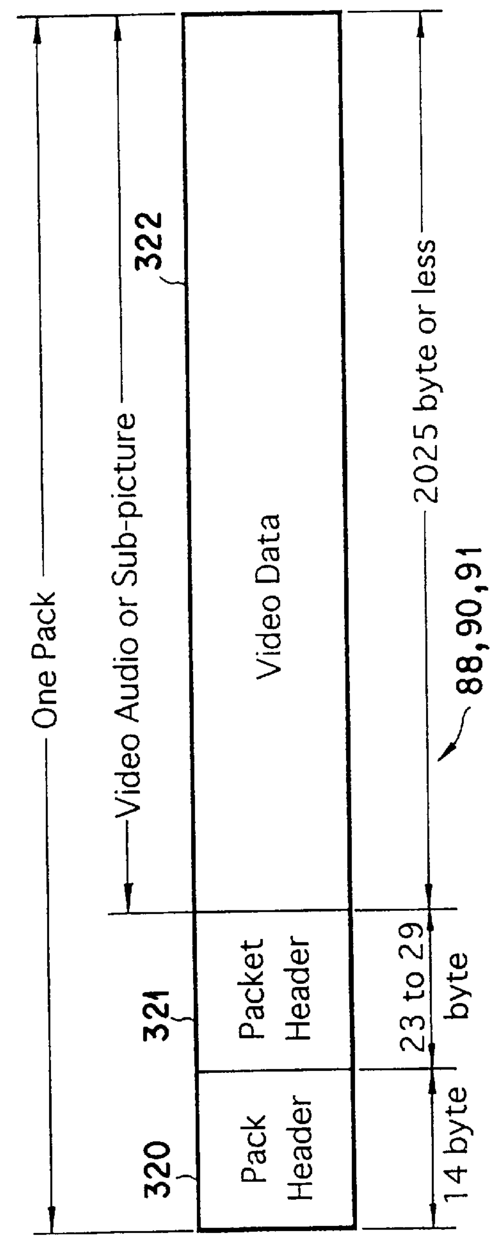
FIG. 54 shows the structure of the video, audio, or sub-picture pack of FIG. 17.

As shown in FIG. 54, another video, audio, or sub-picture pack 288, 289, 280, or 291 consists of a pack header 120, packet header 121, and a packet 122 containing the corresponding data as determined in the MPEG2 system layer. Its pack length is determined to be 2048 bytes. Each of these packs is aligned with the boundaries between logical blocks.

The PCI data (PCI) 313 in the PCI packet 316 is navigation data used to make a presentation, or to change the contents of the display, in synchronization with the playback of the video data in the VOB unit (VOBU) 285. Specifically, as shown in FIG. 55, the PCI data (PCI) 313 contains PCI general information (PCI_GI) as information on the entire PCI and angle information (NSMLS_ANGLI) as each piece of jump destination angle information in angle change. The PCI general information (PCI_GI) contains the address (NV_PCK_LBN) of the NV pack (NV_PCK) 286 in which the PCI 313 is recorded as shown in FIG. 56, the address being expressed in the number of blocks, relative to the logical sector of VOBU 285 in which the PCI 313 is recorded. The PCI general information (PCI_GI) contains the category (VOBU_CAT) of VOBU 285, the start playback time (VOBU_S_PTM) of VOBU 285, and the end playback time (VOBU_EPTM) of VOBU 285. Here, the start PTS (VOBU_SPTS) of VOBU 285 indicates the playback start time (start presentation time) of the video data in the VOBU 285 containing the PCI 313. The playback start time is the first playback start time in the VOBU 285. Normally, the first picture corresponds to the playback start time of I picture (intra-picture) in the MPEG standard. The end PTS (VOBU_EPTS) in the VOBU 285 indicates the playback end time (end presentation time) of the VOBU 285 containing the PCI 313.

DSI data (DSI) 315 in the DSI packet 317 shown in FIG. 53 is navigation data used to search for the VOB unit (VOBU) 285. The DSI data (DSI) 315 contains DSI general information (DSI_GI), seamless information (SML_PBI), angle information (SML_AGLI), address information (NV_PCK_ADI) on a navigation pack, and synchronizing playback information (SYNCI) as shown in FIG. 57.

The DSI general information (DSI_GI) contains information about the entire DSI 315. Specifically, as shown in FIG. 58, the DSI general information (DSI_GI) contains the system clock reference (NV_PCK_SCR) for the NV pack 286. The system clock reference (NV_PCK_SCR) is stored in the system time clock (STC) built in each section of FIG. 1. On the basis of the STC, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NV pack (NV_PCK) 286 containing the DSI 315 expressed by the number of logical sectors (RLSN), relative to the first logical sector in the VOB set (VOBS) 282 containing the DSI 315, and the address (VOBU_EA) of the last pack in the VOB unit (VOBU) 285 containing the DSI 315 expressed by the number of logical sectors (RLSN), relative to the first logical sector in the VOB unit (VOBU).

Furthermore, the DSI general information (DSI_GI) contains the end address (VOBU_IP_EA) of the V pack (V_PCK) 288 containing the last address of the first I picture in the VOBU expressed by the number of logical sectors (RLSN), relative to the first logical sector in the VOB unit (VOBU) containing the DSI 315, and the identification number (VOBU_IP_IDN) of the VOBU 283 containing the DSI 315 and the identification number (VOBU_C_IDN) of the cell in which the DSI 315 is recorded.

The navigation pack address information of DSI contains the addresses of a specified number of navigation packs. Video fast-forward etc. are effected, referring to the addresses. The synchronizing information (SYNCI) includes address information on the sub-pictures and audio data reproduced in synchronization with the playback start time of the video data in the VOB unit (VOBU) containing DSI 315. Specifically, as shown in FIG. 59, the start address (A_SYNCA) of the target audio pack (A_PCK) 291 is expressed by the number of logical sectors (RLSN), relative to the NV pack (NV_PCK) 286 in which DSI 315 is recorded. When there are more than one audio stream (8 audio streams maximum), as many pieces of synchronizing information (SYNCI) as there are audio streams are written. Furthermore, the synchronizing information (SYNCI) includes the address (SP_SYNCA) of the NV pack (NV_PCK) 286 of the VOB unit (VOBU) 285 containing the target audio pack (SP_PCK) 291, the address being expressed by the number of logical sectors (RLSN), relative to the NV pack (NV_PCK) 286 in which DSI 315 is recorded. When there are more than one sub-picture stream (32 sub-picture streams maximum), as many pieces of synchronizing information (SYNCI) as there are sub-picture streams are written.

Hereinafter, the operation of reproducing the movie data for Karaoke from the optical disk 10 with the logic formats shown in FIGS. 15 to 59 will be explained with reference to FIG. 1. In FIG. 1, the solid-line arrows between blocks indicate data buses and the broken-line arrows between blocks represent control buses.

With the optical disk apparatus of FIG. 1, when the power supply is turned on and an optical disk 10 is loaded, the system CPU section 50 reads the initial operation program from the system ROM/RAM 52 and operates the disk drive section 30. Then, the disk drive section 30 starts to read the data from the lead-in area 27 and then from the volume and file structure area 70 next to the lead-in area 27 determining a volume structure and a file structure in accordance with ISO-9660. Specifically, to read the data from the volume and file structure area 270 located in a specific position on the optical disk 10 set in the disk drive section 30, the system CPU section 50 gives a read instruction to the disk drive section 30 to read the contents of the volume and file structure area 270, and stores the data temporarily in the data RAM section 56 via the system processor section 54. The system CPU section 50 extracts information about the recording position and recording size of each file and management information necessary for other managing actions via the path table and directory record stored in the data RAM section 56, and transfers and stores these pieces of information in specific locations in the system ROM/RAM section 52.

Then, the system CPU section 50 acquires a video manager 271 composed of files, starting with file number 0, by reference to the information about the recording position and recording capacity of each file in the system ROM/RAM section 52. Specifically, referring to the recording position and recording capacity of each file acquired from the system ROM/RAM section 52, the system CPU section 50 gives a read instruction to the disk drive section 30, acquires the positions and sizes of a plurality of files constituting the video manager 271 existing on the root directory, reads the video manager 271, and stores it in the data RAM section 56 via the system processor section 54.

Figure 60:
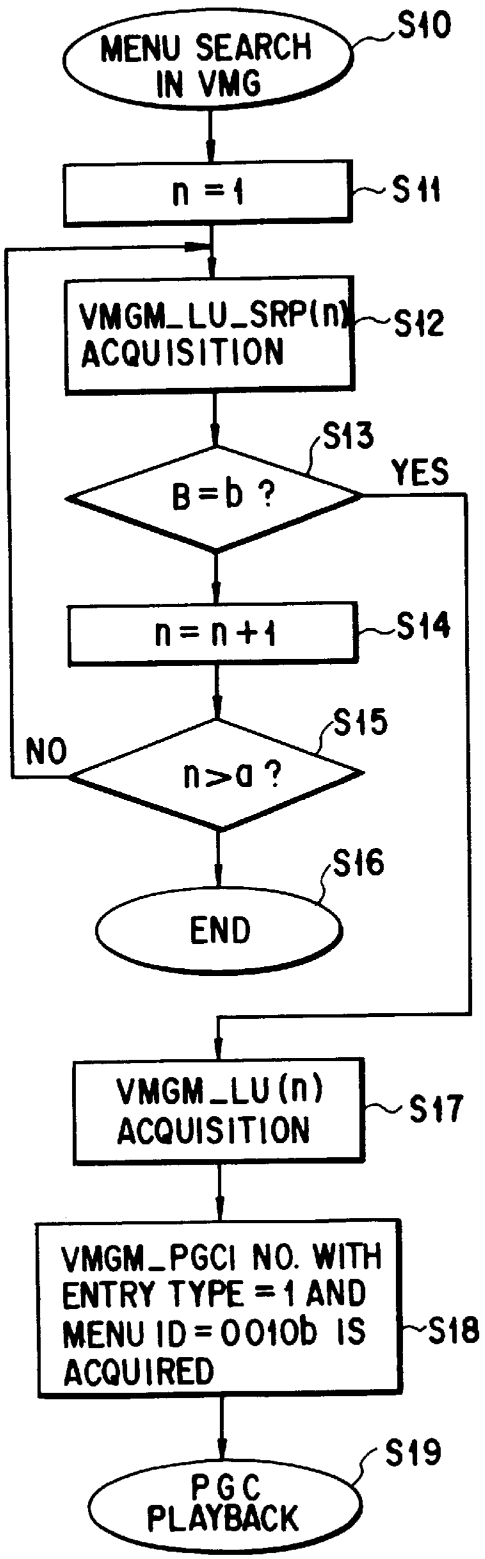
FIG. 60 is a flowchart for illustrating the retrieving operation of the video manager menu.

Now, the operation effected until the video manager menu for selection of karaoke is displayed is explained with reference to FIG. 60. When the menu search process is started as shown in the step S10, the volume manager information management table (VMGI_MAT) 278 which is the first table of the video manager 271 is searched. By the searching operation, the start address (VMGM_PGCI_UT_SA) of the VMGM_PGCI unit table (VMGM_PGCI_UT) 280 for the video manager menu (VMGM) is acquired. The VMGM_PGCI unit table 280 is acquired, the number (a) of language units (VMGM_LU_Ns) of the video manager is derived from the table information (VMGM_PGCI_UTI) of the table (VMGM_PGCI_UT) 280, and as shown in the step S11, acquisition of the search pointer (VMGM_LU_SRP) of the first #1 (n=1) VMGM_LU is determined. Then, the search pointer (VMGM_LU_SRP) of VMGM_LU is acquired. Next, it is determined in the step S13 whether the language code (=b) (VMGM_LCD) described in the search pointer (VMGM_LU_SRP) of VMGM_LU coincides with the language code (=B) specified in the reproducing apparatus, that is, the default language code. If the language codes do not coincide with each other, the number of the search pointer is incremented (n=n+1) as shown in the step S12 and whether the incremented number n exceeds the number (a) of the language units (VMGM_LU_Ns) of the video manager menu or not is determined. When the number n is set larger than the number (a) of the language units (VMGM_LU_Ns) of the video manager menu, the retrieving operation for the video manager menu (VMGM) is terminated as shown in the step S16. When the number n is smaller than the number (a) of the language units (VMGM_LU_Ns) of the video manager menu, the process returns to the step S12, then the n-th VMGM_LU search pointer (VMGM_LU_SRP) is acquired and the steps S13 to S15 are effected again.

If it is determined in the step S13 that the language code (=b) (VMGM_LCD) described in the search pointer (VMGM_LU_SRP) of VMGM_LU coincides with the language code (=B) specified in the reproducing apparatus, that is, the default language code, a VMGM language unit (VMGM_LU) 252 corresponding to the language code described in the search pointer (VMGM_LU_SRP) of VMGM_LU is acquired as shown in the step S17. The number (VMGM_PGCI_Ns) of VMGM_PGCIs is derived from VMGM language unit information (VMGM_LUI). Next, the VMGM_PGC category (VMGM_PGC_CAT) is acquired from the VMGM_PGCI search pointer (VMGM_PGCI_SRP) 254 as shown in the step S18. Therefore, the VMGM_PGC number corresponding to the menu ID (="0010") and corresponding to the entry type (=1) is acquired from the VMGM_PGC category (VMGM_PGC_CAT). The menu ID (="0001") corresponds to the VMGM title menu. The VMGM_PGC start address corresponding to the acquired VMGM_PGC number is acquired from the VMGM_PGCI search pointer (VMGM_PGCI_SRP), and corresponding PGC is acquired from the VMGM video object set (VMGM_VOBS) 276 and PGC is reproduced as shown in the step S19.

Therefore, a VMG menu shown in FIG. 61 is displayed as one example. With the above menu, one of the video title set containing collections of hit songs sung by singers, in this example, Beatles hit song collection and Elvis Presley hit song collection (1-a, 1-b) and the video title set corresponding to the karaoke thereof, in this example, Beatles karaoke hit song collection and Elvis Presley karaoke hit song collection (2-a, 2-b) can be selected. When the karaoke hit song collections (by singers) are selected by operating a corresponding key on the key operating and displaying section 4 according to the menu, the menu of the video title set for karaoke is reproduced according to the flowchart shown in FIG. 62.

At the time of reproduction of the video manager menu, the system CPU section 50 acquires the stream numbers of video, audio, sub-picture for volume menu described in the information management table (VMGI_MAT) 78 of the volume manager (VMGI) 75 and attribute information items thereof and parameters for reproduction of the video manager menu are set into the video decoder section 58, audio decoder section 60 and sub-picture decoder section 62 based on the attribute information. Further, the video processing section 201, audio processing section 202, audio mixing section 203 and sub-picture reproduction processing section 207 in the D/A and reproduction processing section 64 are set according to the attribute information.

Figure 62:
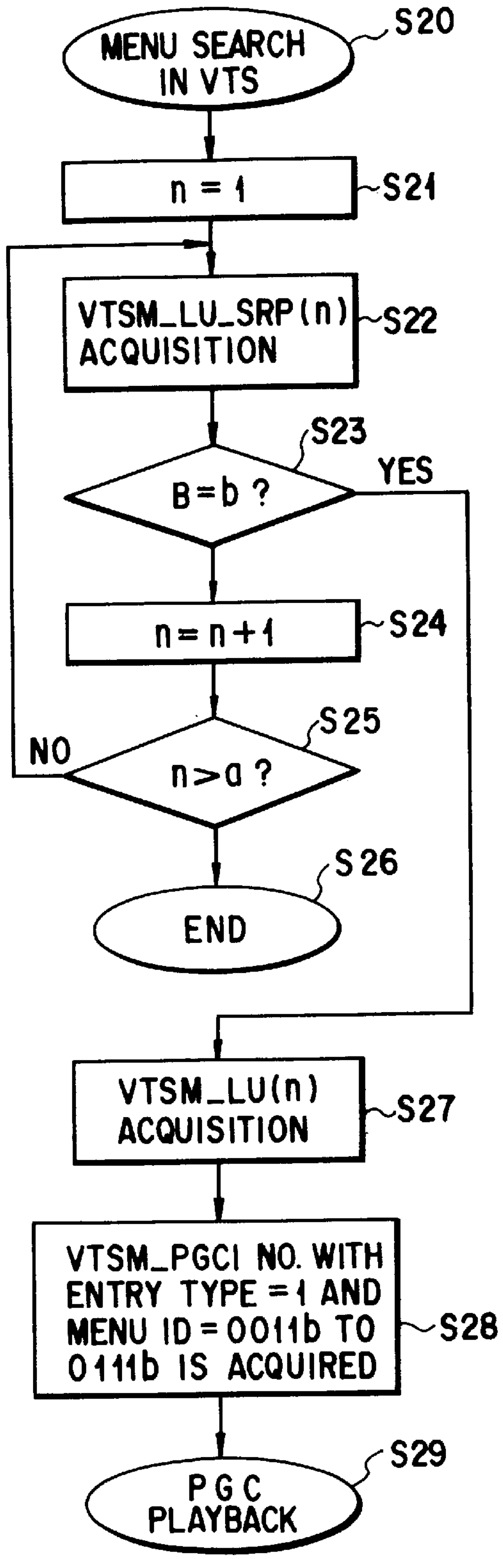
FIG. 62 is a flowchart for illustrating the retrieving operation of the video title set menu.

When the searching operation for the video title set menu is started as shown in the step S20 of FIG. 62, the title set search pointer table (TT_SRPT) 279 is transferred to a preset location of the system ROM & RAM section 52 and stored therein by the above searching operation. Next, the system CPU section 50 acquires the end address of the title search pointer table (TT_SRPT) 279 from the title search pointer table information (TSPTI) 292 and acquires a video title set number (VTSN), program chain number (PGCN) corresponding to an entry number and the start address (VTS_SA) of the video title set from the title search pointer (TT_SRP) 293 corresponding to the entry number from the key operating and displaying section 4. The system CPU section 50 acquires a target title set from the start address (VTS_SA) of the title set.

Next, as shown in FIG. 33, video title set information (VTSI) 294 of the title set is acquired from the start address (VTS SA) of the video title set 272 shown in FIG. 21. The end address (VTSI_MAT_EA) of the video title set information management table (VTSI_MAT) 298 shown in FIG. 34 is acquired from the management table (VTSI_MAT) 298 of video title set information of the video title set information (VTSI) 294. Further, based on the stream numbers (VTS_AST_Ns, VTS_SPST_Ns) of audio and sub-picture data and attribute information items (VTS_V_ATR, VTS_A_ATR, VTS_SPST_ATR) of video, audio and sub-picture data, the respective portions of the reproducing apparatus shown in FIG. 1 are set according to the attributes thereof. That is, the video processing section 201, audio processing section 202, audio mixing section 203 and sub-picture reproduction processing section 207 in the D/A and reproduction processing section 64 are set according to the attribute information thereof. Further, it is determined that the video title set is karaoke based on the VTS category (VTS_CAT) and the respective portions of the reproducing apparatus are set for karaoke reproduction. That is, the respective portions of the reproducing apparatus are set for karaoke reproduction in the same manner as in the case of the operation explained with reference to FIGS. 12 and 13.

The start address (VTSM_PGCI_UT_SA) of the VTSM_PGCI unit table (VTS_PGCI_UT) 300 for the video title set menu (VTSM) is acquired from the video title set information management table (VTSI_MAT) 298 by the searching operation. Therefore, the VTSM_PGCI unit table 300 is acquired and the number (a) of video title menu language units (VTSM_LU_Ns) is acquired from the table information (VTS_PGCI_UTI) 300, and acquisition of the first #1 (n=1) VTSM_LU search pointer (VTSM_LU_SRP) 351 is determined as shown in the step S21. The search pointer (VMGM_LU_SRP) 351 of VMGM_LU 352 is acquired as shown in the step S22. Whether the language code (=b) (VTSM_LCD) described in the search pointer (VMGM_LU_SRP) 351 of VMGM_LU 352 coincides with the language code (=B) specified in the reproducing apparatus, that is, the default language code or not is determined as shown in the step S23. If the language codes do not coincide with each other, the number of the search pointer is incremented (n=n+1) as shown in the step S24 and whether the incremented number n exceeds the number (a) of the language units (VTSM_LU_Ns) of the video title set menu or not is determined. When the number n is set larger than the number (a) of the language units (VTSM_LU_Ns) of the video title set menu, the retrieving operation for the video title set menu (VTSM) is terminated as shown in the step S26. When the number n is smaller than the number (a) of the language units (VTSM_LU_Ns) of the video title set menu, the process returns to the step S22, then the n-th VTSM_LU search pointer (VTSM_LU_SRP) 351 is acquired and the steps S23 to S25 are effected again.

If it is determined in the step S23 that the language code (=b) (VTSM_LCD) described in the search pointer (VMGM_LU_SRP) 351 of VTSM_LU coincides with the language code (=B) specified in the reproducing apparatus, that is, the default language code, the VTSM language unit (VTSM_LU) 352 corresponding to the language code described in the search pointer (VMGM_LU_SRP) 351 of VTSM_LU is acquired as shown in the step S27. Then, the number (VTSM_PGCI_Ns) of VTSM_PGCIs is acquired from the VTSM language unit information (VTSM_LUI). Next, as shown in the step S28, a VTSM_PGC category (VTSM_PGC_CAT) is acquired from the VTSM_PGCI search pointer (VTSM_PGCI_SRP) 354. Therefore, a VTSM_PGC number corresponding to the menu ID (="0010") and corresponding to the entry type (=1) is acquired from the VTSM_PGC category (VTSM_PGC_CAT). The menu ID (="0011" to "0111") corresponds to the VTSM audio language menu for selecting an audio language, VTSM program menu for selecting a program or another menus. The start address (VTSM_PGC_SA) of VTSM_PGC corresponding to the acquired VTSM_PGC number is acquired from the VTSM_PGCI search pointer (VTSM_PGCI_SRP), and corresponding PGC is acquired from the VTSM video object set (VTSM_VOBS) 276 and PGC is reproduced as shown in the step S29.

Therefore, a VTS menu shown in FIG. 63 is displayed as one example. The above menu provides a video title set, in this example, a video title set corresponding to an Elvis Presley karaoke hit song collection and one of the program chains (PGCs) of the first to n-th hit songs can be selected. When a karaoke song is selected by operating a corresponding key on the key operating and displaying section 4 according to the menu, a sub-menu, for example, a menu for selecting lyric lines as shown in FIG. 64 is displayed. That is, since 32 sub-picture streams are prepared as the sub-picture as explained before, the karaoke provider can prepare lyric lines of various languages such as English, Japanese, German, French and display the sub-picture of corresponding language in synchronism with the music by use of synchronizing information (SYNCI) shown in FIG. 59. Further, a menu for selecting one of the eight audio streams can be prepared as another sub-menu. That is, the audio stream containing only the musical performance, the audio stream containing the musical performance to which a guide melody is attached, or the audio stream containing the musical performance together with the partner's voice of a duet can be selected. When one of the selectable items is selected from the menu, a program chain corresponding to the selected song is reproduced.

When the menu (VTSM) for the video title set (VTS) is simple in structure, the start address (VTSM_VOB_SA) of the video object set (VTSM_VOB) 295 for menu of the video title set is acquired from the video title set information management table (VTSI_MAT) 298 shown in FIG. 34 and the menu of the video title set is displayed by the video object set (VTSM_VOB) 295.

The sub-picture stream and audio stream are changed according to the flowchart shown in FIG. 65. First, selection of the sub-picture stream or audio stream or change thereof is specified on the menu as shown in the step S30. In this example, it is supposed that the X-th stream is specified. After the specification, the number (n) of audio streams or the number (n) of sub-picture streams is acquired from VTS_AST_Ns or VTS_SPST_Ns of the VTS management table (VTS_MAT) 298 in the video title set which is now selected as shown in the step S31. Whether the selected X-th stream is smaller than the number (n) of the streams is determined as shown in the step S32. If the number X of the selected stream is larger than the number n of the streams, it is determined that a corresponding stream is not present and the stream selecting operation is interrupted. If the number X of the selected stream is smaller than the number n of the streams, PGCI_AST_CTL or PGCI_SPST_CTL is acquired as audio or sub-picture stream control information on a stream which is available in the selected PGC from the PGCI general information (PGCI_GI) 305 corresponding to the selected PGC as shown in the step S33. If the selected stream of the number X is not contained in the m available streams as shown in the step S34, it is determined that a corresponding stream is not present and the stream selecting operation is interrupted. If the selected stream of the number X is contained in the m available streams as shown in the step S34, the audio stream attribute (VTS_AST_SPST) or sub-picture stream attribute (VTS_SPST_SPST) of the selected stream of the number X is acquired as shown in the step S35. According to the acquired attribute, attribute parameters are set as shown in the step S36. Next, the stream number X is set as a system parameter as shown in the step S37. If the stream number is thus specified, the operation of selecting and reproducing a specific stream is terminated as shown in the step S38.

When a program chain, that is, a concrete song is specified on the key operating and displaying section 4, a target program chain is searched for according to the following procedure. The searching procedure for the program chain is not limited to the program chain for the titles in the video title set and the same procedure can be used for searching for the program chain for the menu in a case where the menu is constructed by the program chains in a relatively complicated form. The start address of the program chain information table (VTS_PGCIT) 300 in the video title set (VTS) shown in FIG. 34 which is described in the management table (VTSI_MAT) 298 of the video title set information (VTSI) 294 is acquired and information (VTS_PGCIT_I) 302 of the VTS program chain information table shown in FIG. 36 is fetched. The number (VTS_PGC_Ns) of the program chains shown in FIG. 37 and the end address (VTS_PGCIT_EA) of the table 300 are acquired from the information (VTS_PGCIT_I) 302.

When the number of the program chain is specified by means of the key operating and displaying section 4, the category (VTS_PGCIT_CAT) of the program chain shown in FIG. 38 and the start address of the VTS_PGC information 104 corresponding to the search pointer (VTS_PGCIT_SRP) 303 are acquired from the VTS_PGCIT search pointer (VTS_PGCIT_SRP) 303 shown in FIG. 36 and corresponding to the specified number. Based on the category of the program chain, it is determined that a corresponding program chain is karaoke. Further, the program chain general information (PGC_GI) shown in FIG. 39 is read out by use of the start address (VTS_PGCI_SA). The category of the program chain (PGC) is also acquired by use of the general information (PGC_GI). Further, reproduction time (PGC_CAT, PGC_PB_TIME) is acquired by use of the general information (PGC_GI), and the start addresses (C_PBIT_SA, C_POSIT_SA) of the cell reproducing information table (C_PBIT) and cell position information table (C_POSIT) 108 described in the general information (PGC_GI) are acquired. Further, an identifier (C_VOB_IDN) for the video object and a cell identifier number (C_IDN)s shown in FIG. 46 are acquired as cell position information (C_POSI) shown in FIG. 45 from the start address (C_PBIT_SA).

Further, cell reproducing information (C_PBI) shown in FIG. 44 is acquired from the start address (C_POSIT_SA), and the start address (C_FVOBU_SA) of the first VOBU 85 and the start address (C_LVOBU_SA) of the last VOBU in the cell of FIG. 42 described in the reproduction information (C_PBI) are acquired and a target cell is searched for. The cell reproducing order is set by sequentially determining the reproducing cells 284 by referring to the map of programs of FIG. 41 in the PGC program map (PGC_PGMAP) 306 shown in FIG. 39. The thus determined data cells 284 of the program chain are sequentially read out from the video object set 296 and input to the data RAM section 56 via the system processor section 54. The data cell 284 is supplied to and decoded by the video decoder section 58, audio decoder section 60 and sub-picture decoder section 62, subjected to the signal conversion by the D/A and reproduction processing section 64, and an image is reproduced on the monitor section 6 and sounds are reproduced from the speaker sections 8, 9.

The karaoke reproducing operation may be understood by referring to the description already explained with reference to FIGS. 12, 13, and 14A to 14F for reproduction of karaoke from the optical disk for the initial version. In the explanation for FIGS. 12, 13 and 14A to 14F, the sequence is replaced by the program chain.

In the above explanation, it is supposed that audio data with voice corresponds to a certain title set and karaoke corresponds to another title set, but it should be understood that all of the title sets may be provided for karaoke.

Further, the following karaoke songs can be prepared for respective title sets or for respective program chains. For example, collections of songs classified by generations may be prepared for respective title sets or for respective program chains. For example, hit song collections in the 1960's and 1980's may be prepared for respective title sets or for respective program chains. Further, songs classified by singers may be prepared for respective title sets or for respective program chains. For example, title sets or program chains for Beatles hit song collections and Elvis Presley hit song collections may be prepared. In addition, songs classified by genre, for example, country song collections, songs classified by singing mode, for example, song collections for solo or duet may be prepared for respective title sets or for respective program chains.

In a case where the collection of songs is specified by the program chain, each program corresponds to a karaoke song.

Referring to FIGS. 66 to 71, explained next will be a method of recording data on the optical disk 10 on and from which the video data is recorded and reproduced in the logic formats shown in FIGS. 15 to 59 and a recording system to which the recording method is applied.

Figure 66:
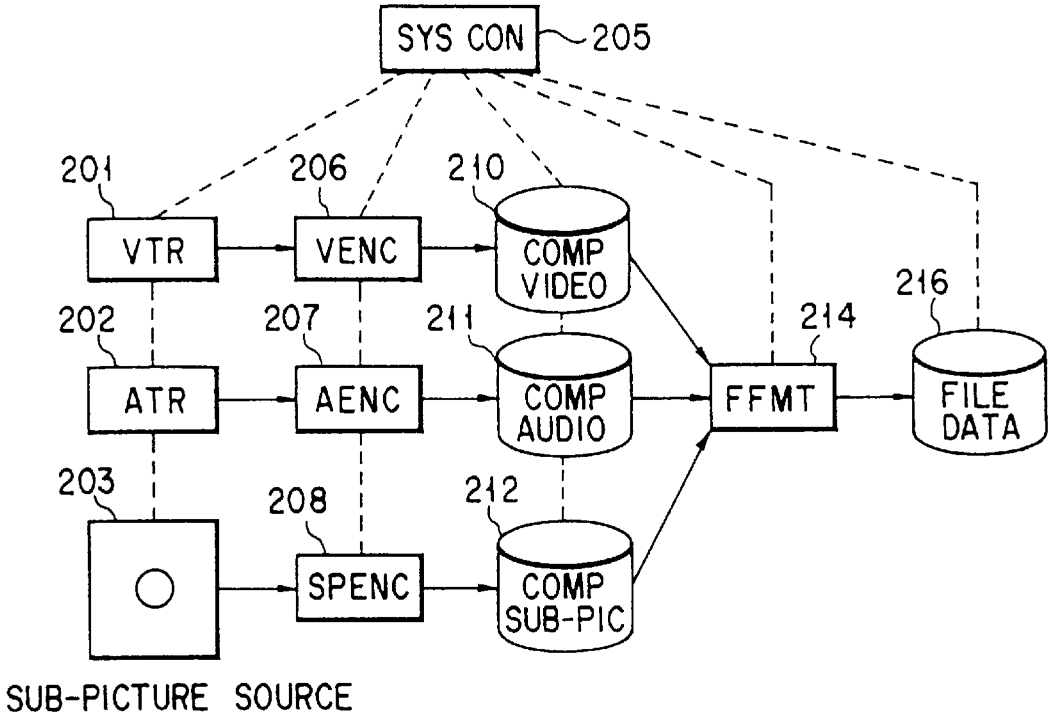
FIG. 66 is a block diagram of an encoder system that creates video files by encoding the video data.

FIG. 66 shows an encoder system that creates a video file 88 of a title set 84 whose video data is encoded. In the system of FIG. 66, for example, a videotape recorder (VTR) 201, an audiotape recorder (ATR) 202, and a sub-picture source 203 are used as sources of the main video data, audio data, and sup-picture data. Under the control of a system controller (Sys con) 205, they create the main video data, audio data, and sup-picture data, which are supplied to a video encoder (VENC) 206, an audio encoder (AENC) 207, and a sub-picture encoder (SPENC) 208, respectively. Under the control of the system controller (Sys con) 205, these encoders 206, 207, and 208 perform A/D conversion of the main video data, audio data, and sup-picture data and encode them by the respective compression schemes. The encoded main video data, audio data, and sub-picture data (Comp Video, Comp Audio, Comp Sub-pict) are stored in memories 210, 211, and 212. The main video data, audio data, and sub-picture data (Comp Video, Comp Audio, Comp Sub-pict) are outputted to a file formatter (FFMT) 214 under the control of the system controller (Sys con) 205, which converts them so that they may have a file structure of video data for the system as explained earlier. Then, under the control of the system controller (Sys con) 205, the setting conditions for each data item and the management information including attributes are stored in a memory 216 in the form of files.

Explained next will be a standard flow of an encoding process in the system controller (Sys con) 205 that creates a file from video data.

According to the flow of FIG. 67, the main video data and audio data are encoded and the encoded main video data and audio data (Comp Video, Comp Audio) are supplied. Specifically, when the encoding process is started, as shown in step S70 of FIG. 67, the parameters necessary for encoding the main video data and audio data are set. Part of the set parameters are stored in the system controller (Sys con) 205 and at the same time, are used at the file formatter (FFMT) 214. As shown in step S271, the main video data is pre-encoded using the parameters and the optimum distribution of the amount of codes is calculated. Then, on the basis of the code amount distribution obtained in the pre-encoding, the main video data is encoded as shown in step S272. At the same time, the audio data is also encoded at step S272. As shown in step in S273, if necessary, the main video data is partially encoded again and the reencoded portion of the main video data is replaced with the old one. Through the series of steps, the main video data and audio data are encoded. Furthermore, as shown in steps S274 and S275, the sub-picture data is encoded and the encoded sub-picture data (Comp Sub-pict) is supplied. Namely, the parameters necessary for encoding the sub-picture data are set. As shown in step S274, part of the parameters are stored in the system controller (Sys con) 205 and used in the file formatter (FFMT) 214. On the basis of the parameters, the sub-picture data is encoded. By the process, the sup-picture data is encoded.

Figure 68:
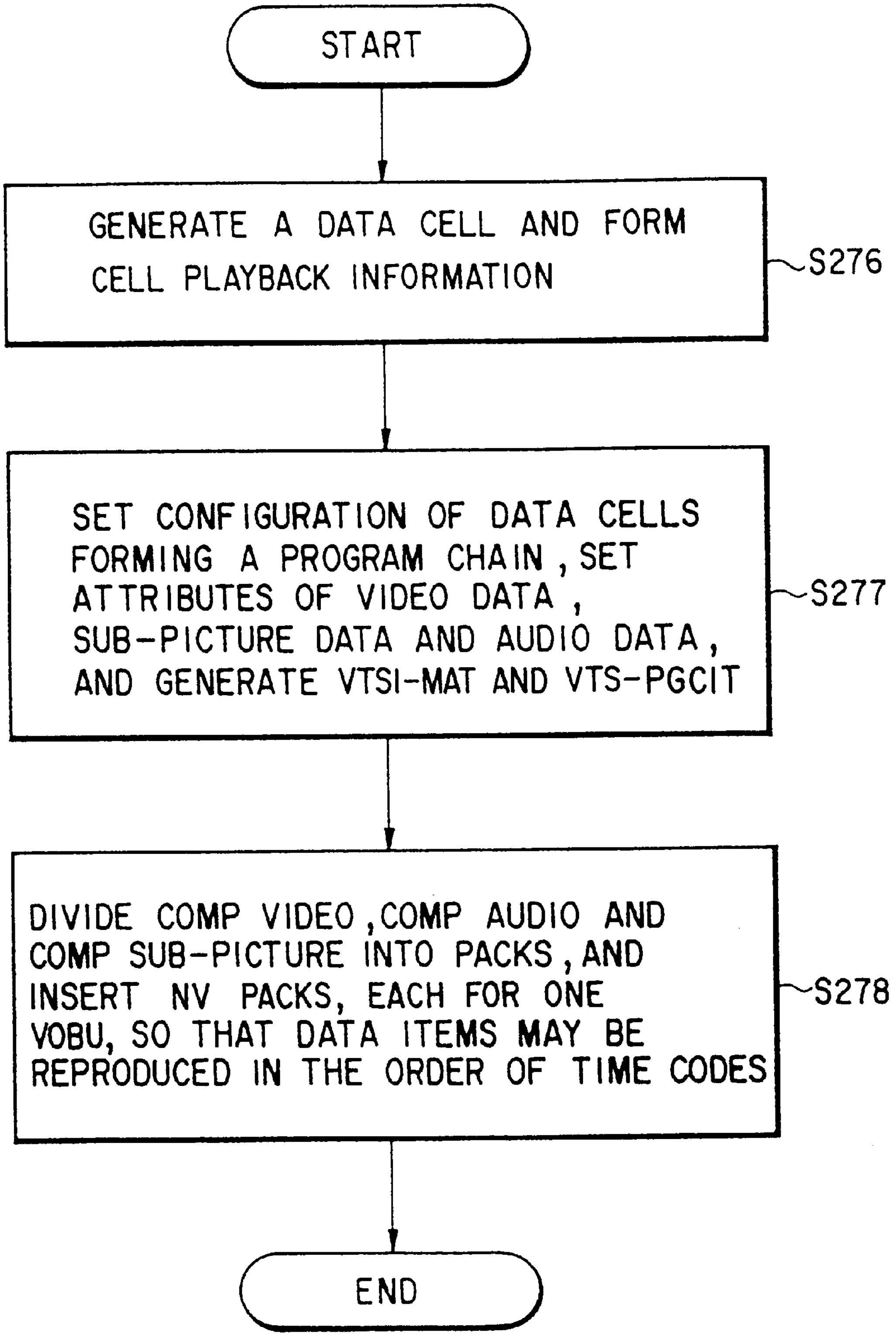
FIG. 68 is a flowchart for combining the main video data, audio data, and sub-picture data that have been encoded in the flow of FIG. 67 and creating a video data file.

According to the flow of FIG. 68, the encoded main video data, audio data, and sup-picture data (Com Video, Com Audio, Comp Sub-pict) are combined and converted so as to form a video data title set structure as explained in FIGS. 15 and 59.

Specifically, as shown in step S276, a cell is set as the smallest unit of the video data and cell playback information on the cell (C_PBI) is created. Then, as shown in step S277, the structure of the cells constituting a program chain and the main video, sub-picture, and audio attributes (the information obtained in encoding the respective data items are used part of these attributes) are set. Then, as shown in FIG. 33, video title set information management table information (VTSI_MAT) 278 including information on program chains and a video title set program chain table (VTS_PGCIT) 300 are created. At this time, as the need arises, a video title set direct access pointer table (VTS_DAPT) is also created. The encoded main video data, audio data, and sup-picture data (Com Video, Comp Audio, Comp Sub-pict) are subdivided into specific packs. An NV pack is placed at the head of each VOBU so that playback can be effected in the order of time code of each data item. With the NV packs arranged this way, each data cell is positioned so that a video object (VOB) may be composed of a plurality of cells as shown in FIG. 6. A set of such video objects is formatted into the title set structure.

In the flow of FIG. 68, the program chain information (PGI) is obtained in the process of step S277 by using the database in the system controller (Sys con) 205 or entering data again as the need arises.

Figure 69:
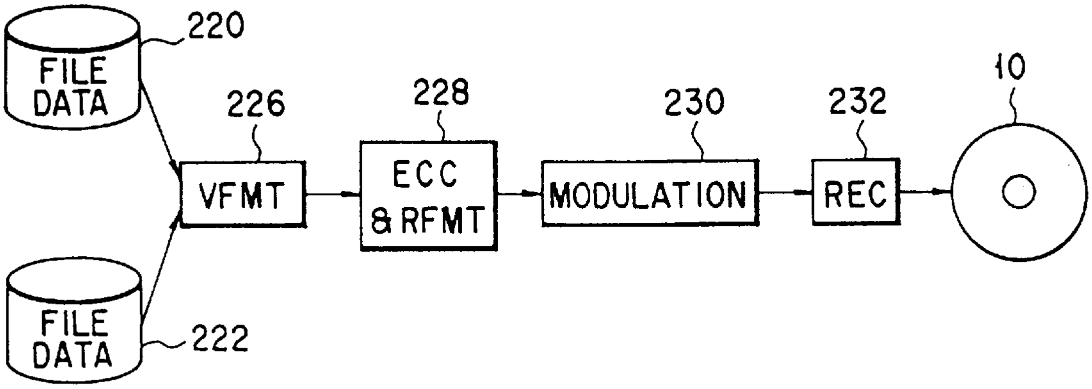
FIG. 69 is a block diagram of a disk formatter system used to record a formatted video file on an optical disk.

FIG. 69 shows a disk formatter system that records on an optical disk the title set formatted as described above. In the disk formatter system of FIG. 69, the memories 220, 222 in which the created title set is stored supply these file data items to a volume formatter (VFMT) 226. The volume formatter (VFMT) 226 extracts the management information from the title sets 284, 286, produces a video manager 71, and create the logic data to be recorded on the disk 10 in the arrangement of FIG. 15. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

A standard flow for creating the aforementioned disk will be described by reference to FIGS. 70 and 71. FIG. 70 shows the flow of creating the logic data to be recorded on the disk 10. Specifically, as shown in step S280, parameter data items, including the number of video data files, their arrangement, and the size of each video data file, are set first. Next, as shown in step S281, a video manager 71 is created from the set parameters and the video title set information 281 in each video title set 72. Thereafter, as shown in step S282, the video manager 71 and video title set 72 are arranged in that order according to the corresponding logical block number, thereby creating the logic data to be recorded on the disk 10.

Thereafter, the flow of creating the physical data to be recorded on the disk as shown in FIG. 71 is executed. Specifically, as shown in step S283, the logic data is divided into units of a specific number of bytes, thereby forming error correction data. Next, as shown in step S284, the logic data divided into units of a specific number of bytes are combined with the created error correction data to form physical sectors. Thereafter, as shown in step S285, physical data is created by combining physical sectors. In this way, the modulating process based on certain rules is performed on the physical data created in the flow of FIG. 71, thereby forming the recording data. Thereafter, the recording data is recorded on the disk 10.

In the above embodiment, the optical disk of high-density recording type is explained as the recording medium, but this invention can be applied to another recording medium other than the optical disk, for example, this invention can also be applied to a magnetic disk or another type of recording medium on which data can be recorded with physically high recording density.

According to this invention, a system suitable for a high-density disk formed on the assumption that it is used for karaoke can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for reproducing video data from a recording medium which includes a reproduction data area storing reproduction data containing video data, first audio data and sub-picture data, and a reproduction information area in which management information relating to the stored reproduction data itself and reproduction information relating to the reproducing order of reproduction data are described and which is to be retrieved prior to reproduction of reproduction data, the management information containing information which indicates that the category of the first audio data relates to karaoke, comprising the steps of:

retrieving video data and reproduction management information from the reproduction information area;

acquiring category information from the retrieved management information;

converting the video data and sub-picture data into a video signal, and converting the retrieved audio data into an audio signal according to the acquired category; and reproducing the converted video signal and audio signal.

2. A method according to claim 1, wherein the sub-picture data contains a plurality of sub-picture data streams having different languages stored therein, and the management information contains selection information for selecting a desired sub-picture data stream.

3. A method according to claim 1, wherein the reproduction data contains second audio data, and the management information contains information indicating that the category of the second audio data relates to audio other than karaoke.

4. A method according to claim 1, wherein the first video data contains a plurality of audio data streams in which karaoke data items of different musical compositions are stored, and the management information contains information for selecting a desired audio data stream.

5. A method according to claim 1, wherein the reproduction data contains synchronizing information relating to reproduction of sub-picture data and audio data reproduced together with video data.

6. A method according to claim 1, wherein the management information contains attribute information relating to a reproducing system for the audio.

7. A method according to claim 1, wherein the reproduction data contains menu video data for displaying a menu in which information relating to one of titles of musical compositions and classifications of karaoke which can be selected is displayed.

8. A method according to claim 1, wherein the reproduction data contains management menu video data for displaying a management menu in which information for selection of karaoke or another application is displayed.

9. An apparatus for reproducing video data from a recording medium which includes a reproduction data area storing reproduction data containing video data, first audio data and sub-picture data, and a reproduction information area in which management information relating to the stored reproduction data itself and reproduction information relating to the reproducing order of reproduction data are described and which is to be retrieved prior to reproduction of reproduction data, the management information containing information which indicates that the category of the first audio data relates to karaoke, comprising:

retrieving means for retrieving video data and reproduction management information from the reproduction information area;

acquisition means for acquiring category information from the retrieved management information;

converting means for converting the video data and sub-picture data into a video signal, and converting the retrieved audio data into an audio signal according to the acquired category; and reproducing means for reproducing the converted video signal and audio signal.

10. An apparatus according to claim 9, wherein the sub-picture data contains a plurality of sub-picture data streams having different languages stored therein, and the management information contains selection information for selecting a desired sub-picture data stream.

11. An apparatus according to claim 9, wherein the reproduction data contains second audio data, and the management information contains information indicating that the category of the second audio data relates to audio other than karaoke.

12. An apparatus according to claim 9, wherein the first video data contains a plurality of audio data streams in which karaoke data items of different musical compositions are stored, and the management information contains selection information for selecting a desired audio data stream.

13. An apparatus according to claim 9, wherein the reproduction data contains synchronizing information relating to reproduction of sub-picture data and audio data reproduced together with video data.

14. An apparatus according to claim 9, wherein the management information contains attribute information relating to a reproducing system for the audio.

15. An apparatus according to claim 9, wherein the reproduction data contains menu video data for displaying a menu in which information relating to one of titles of musical compositions and classifications of karaoke which can be selected is displayed.

16. An apparatus according to claim 9, wherein the reproduction data contains management menu video data for displaying a management menu in which information for selection of karaoke or another application is displayed.

* * * * *